US007602782B2

(12) United States Patent
Doviak et al.

(10) Patent No.: US 7,602,782 B2
(45) Date of Patent: Oct. 13, 2009

(54) APPARATUS AND METHOD FOR INTELLIGENT ROUTING OF DATA BETWEEN A REMOTE DEVICE AND A HOST SYSTEM

(75) Inventors: William Doviak, Pottstown, PA (US); David L. Whitmore, Bethlehem, PA (US); Flex Houvig, Wayne, PA (US)

(73) Assignee: Padcom Holdings, Inc., Bethlehem, PA (US)

( * ) Notice: Subject to any disclaimer, the term of this patent is extended or adjusted under 35 U.S.C. 154(b) by 330 days.

(21) Appl. No.: 11/743,313

(22) Filed: May 2, 2007

(65) Prior Publication Data

US 2007/0206591 A1    Sep. 6, 2007

Related U.S. Application Data

(63) Continuation of application No. 11/170,077, filed on Jun. 30, 2005, which is a continuation of application No. 10/898,283, filed on Jul. 26, 2004, now abandoned, which is a continuation of application No. 10/164,581, filed on Jun. 10, 2002, now Pat. No. 6,826,405, which is a continuation of application No. 08/932,532, filed on Sep. 17, 1997, now Pat. No. 6,418,324.

(51) Int. Cl.
*H04L 12/28* (2006.01)
(52) U.S. Cl. ..................................... 370/389; 455/277.1
(58) Field of Classification Search .................. 370/259, 370/335, 350, 338; 455/277, 557, 405, 67, 455/552, 556
See application file for complete search history.

(56) References Cited

U.S. PATENT DOCUMENTS 4,697,281 A    9/1987   O'Sullivan 4,799,253 A    1/1989   Stern et al.
(Continued)

FOREIGN PATENT DOCUMENTS

CA    2303987    3/1999

(Continued)

OTHER PUBLICATIONS

Defendant and Counterclaim Plaintiff NetMotion Wireless Inc.'s Motion to Amend Answer to Second Amended Complaint and Counterclaim, dated Aug. 3, 2005.

(Continued)

*Primary Examiner*—Thong H Vu
(74) *Attorney, Agent, or Firm*—Greenblum & Bernstein, P.L.C.

(57) ABSTRACT

An apparatus and method is provided for transparent communication between a remote or mobile device and a fixed communication host network. The apparatus and method may include a remote network controller that logically resides between the host network and the existing infrastructure(s) that are used to provide communications network contact with one or more remote devices. The remote network controller is connected to the host communication network as a protocol-appropriate communications controller so that remote devices are indistinguishable to the host network from the locally-attached devices. Each remote device may be provided with an asynchronous serial data interface to communicate with a mobile data controller. The mobile data controller, in combination with the remote network controller, provides end-to-end data communication such that incompatible protocols are transparent to the remote device and host communication network. A router may be provided which selects a communications network in accordance with user configured parameters. The router communicates over a plurality of incompatible networks and is capable of using a variety of different protocols. Switching between the plurality of incompatible networks is transparent to the remote device and host communication network.

3 Claims, 38 Drawing Sheets

U.S. PATENT DOCUMENTS

| | | |
|---|---|---|
| 4,833,701 A | 5/1989 | Comroe et al. |
| 4,837,800 A | 6/1989 | Freeburg et al. |
| 4,893,327 A | 1/1990 | Stern et al. |
| 4,912,756 A | 3/1990 | Hop |
| 4,969,184 A | 11/1990 | Gordon et al. |
| 4,972,457 A | 11/1990 | O'Sullivan |
| 4,989,230 A | 1/1991 | Gillig et al. |
| 4,991,204 A | 2/1991 | Yamamoto et al. |
| 5,042,082 A | 8/1991 | Dahlin |
| 5,109,528 A | 4/1992 | Uddenfeldt |
| 5,127,041 A | 6/1992 | O'Sullivan |
| 5,159,592 A | 10/1992 | Perkins |
| 5,159,912 A | 11/1992 | Kelin et al. |
| 5,166,931 A | 11/1992 | Riddle |
| 5,173,933 A | 12/1992 | Jabs et al. |
| 5,181,200 A | 1/1993 | Harrison |
| 5,212,684 A | 5/1993 | MacNamee et al. |
| 5,212,724 A | 5/1993 | Nazarenko et al. |
| 5,212,806 A | 5/1993 | Natarajan |
| 5,224,098 A | 6/1993 | Bird et al. |
| 5,249,218 A | 9/1993 | Sainton |
| 5,257,401 A | 10/1993 | Dahlin et al. |
| 5,260,988 A | 11/1993 | Schellinger et al. |
| 5,276,680 A | 1/1994 | Messenger |
| 5,291,544 A | 3/1994 | Hecker |
| 5,305,317 A | 4/1994 | Szczepanek |
| 5,307,490 A | 4/1994 | Davidson et al. |
| 5,310,997 A | 5/1994 | Roach et al. |
| 5,325,361 A | 6/1994 | Lederer et al. |
| 5,325,362 A | 6/1994 | Aziz |
| 5,327,577 A | 7/1994 | Uddenfeldt |
| 5,349,678 A | 9/1994 | Morris et al. |
| 5,353,334 A | 10/1994 | O'Sullivan |
| 5,367,563 A | 11/1994 | Sainton |
| 5,379,448 A | 1/1995 | Ames et al. |
| 5,404,392 A | 4/1995 | Miller et al. |
| 5,410,543 A | 4/1995 | Seitz et al. |
| 5,412,375 A | 5/1995 | Wood |
| 5,412,654 A | 5/1995 | Perkins |
| 5,420,574 A | 5/1995 | Erickson et al. |
| 5,426,637 A | 6/1995 | Derby et al. |
| 5,434,863 A | 7/1995 | Onishi et al. |
| 5,442,633 A | 8/1995 | Vilander et al. |
| 5,442,791 A | 8/1995 | Wrabetz et al. |
| 5,446,736 A | 8/1995 | Gleeson et al. |
| 5,448,619 A | 9/1995 | Evans et al. |
| 5,452,471 A | 9/1995 | Leopold et al. |
| 5,457,680 A | 10/1995 | Kamm |
| 5,475,819 A | 12/1995 | Miller et al. |
| 5,479,480 A | 12/1995 | Scott |
| 5,481,535 A | 1/1996 | Hershey |
| 5,488,649 A | 1/1996 | Schellinger |
| 5,490,139 A | 2/1996 | Baker et al. |
| 5,491,800 A | 2/1996 | Goldsmith et al. |
| 5,497,373 A * | 3/1996 | Hulen et al. ............... 370/259 |
| 5,499,343 A | 3/1996 | Pettus |
| 5,504,746 A | 4/1996 | Meier |
| 5,504,935 A | 4/1996 | Vercauteren |
| 5,515,508 A | 5/1996 | Pettus et al. |
| 5,530,945 A | 6/1996 | Chavez, Jr. et al. |
| 5,530,963 A | 6/1996 | Moore et al. |
| 5,537,220 A | 7/1996 | Ezumi et al. |
| 5,548,723 A | 8/1996 | Pettus |
| 5,550,893 A | 8/1996 | Heidari |
| 5,555,553 A | 9/1996 | Jonsson |
| 5,559,800 A | 9/1996 | Mousseau et al. |
| 5,559,860 A | 9/1996 | Mizikovsky |
| 5,564,070 A | 10/1996 | Want et al. |
| 5,564,077 A | 10/1996 | Obayashi et al. |
| 5,566,225 A | 10/1996 | Haas |
| 5,566,236 A | 10/1996 | MeLampy et al. |
| 5,568,645 A | 10/1996 | Morris et al. |
| 5,572,528 A | 11/1996 | Shuen |
| 5,574,774 A | 11/1996 | Ahlberg et al. |
| 5,594,731 A | 1/1997 | Reissner |
| 5,598,412 A | 1/1997 | Griffith et al. |
| 5,602,843 A | 2/1997 | Gray |
| 5,602,916 A | 2/1997 | Grube et al. |
| 5,610,595 A | 3/1997 | Garrabrant et al. |
| 5,610,905 A | 3/1997 | Murthy et al. |
| 5,610,974 A | 3/1997 | Lantto |
| 5,623,601 A | 4/1997 | Vu |
| 5,625,673 A | 4/1997 | Grewe et al. |
| 5,633,868 A | 5/1997 | Baldwin et al. |
| 5,633,873 A | 5/1997 | Kay et al. |
| 5,657,390 A | 8/1997 | Elgamal et al. |
| 5,659,596 A | 8/1997 | Dunn |
| 5,664,007 A | 9/1997 | Samadi et al. |
| 5,666,653 A | 9/1997 | Ahi |
| 5,668,837 A | 9/1997 | Dent |
| 5,673,268 A | 9/1997 | Sharma et al. |
| 5,673,322 A | 9/1997 | Pepe et al. |
| 5,682,534 A | 10/1997 | Kapoor et al. |
| 5,697,055 A | 12/1997 | Gilhousen et al. |
| 5,710,986 A | 1/1998 | Obayashi et al. |
| 5,717,737 A | 2/1998 | Doviak et al. |
| 5,721,818 A | 2/1998 | Hanif et al. |
| 5,724,346 A | 3/1998 | Kobayashi et al. |
| 5,732,074 A | 3/1998 | Spaur et al. |
| 5,732,076 A | 3/1998 | Ketseoglou et al. |
| 5,732,359 A | 3/1998 | Baranowsky, II et al. |
| 5,745,850 A | 4/1998 | Aldermeshian et al. |
| 5,748,897 A | 5/1998 | Katiyar et al. |
| 5,752,168 A * | 5/1998 | Monot et al. ............. 455/67.13 |
| 5,752,185 A | 5/1998 | Ahuja |
| 5,754,552 A | 5/1998 | Allmond et al. |
| 5,754,774 A | 5/1998 | Bittinger et al. |
| 5,754,961 A | 5/1998 | Serizawa et al. |
| 5,758,186 A | 5/1998 | Hamil |
| 5,761,623 A | 6/1998 | Lupien et al. |
| 5,768,525 A | 6/1998 | Kralowetz et al. |
| 5,771,459 A | 6/1998 | Demery et al. |
| 5,784,643 A | 7/1998 | Shields |
| 5,790,536 A * | 8/1998 | Mahany et al. ............. 370/338 |
| 5,790,554 A | 8/1998 | Pitcher et al. |
| 5,793,843 A | 8/1998 | Morris |
| 5,796,727 A | 8/1998 | Harrison et al. |
| 5,802,483 A | 9/1998 | Morris |
| 5,812,819 A | 9/1998 | Rodwin et al. |
| 5,825,775 A | 10/1998 | Chin et al. |
| 5,826,188 A | 10/1998 | Tayloe et al. |
| 5,828,659 A | 10/1998 | Teder et al. |
| 5,835,725 A | 11/1998 | Chiang et al. |
| 5,839,075 A | 11/1998 | Haartsen et al. |
| 5,848,064 A | 12/1998 | Cowan |
| 5,856,974 A | 1/1999 | Gervais et al. |
| 5,861,881 A * | 1/1999 | Freeman et al. ............. 715/201 |
| RE36,078 E | 2/1999 | Uddenfeldt et al. |
| 5,870,673 A | 2/1999 | Haartsen |
| 5,878,036 A * | 3/1999 | Spartz et al. ................ 370/335 |
| 5,878,344 A | 3/1999 | Zicker |
| 5,889,816 A | 3/1999 | Agrawal et al. |
| 5,890,054 A | 3/1999 | Logsdon et al. |
| 5,894,595 A * | 4/1999 | Foladare et al. .......... 455/556.2 |
| 5,901,352 A | 5/1999 | Pierre et al. |
| 5,909,431 A | 6/1999 | Kuthyar et al. |
| 5,910,951 A | 6/1999 | Pearce et al. |
| 5,915,214 A | 6/1999 | Reece et al. |
| 5,918,016 A | 6/1999 | Brewer et al. |
| 5,935,212 A | 8/1999 | Kalajan et al. |
| 5,941,956 A | 8/1999 | Shirakihara et al. |
| 5,943,333 A | 8/1999 | Whinnett et al. |
| 5,956,331 A | 9/1999 | Rautiola et al. |
| 5,956,640 A | 9/1999 | Eaton et al. |

| | | | |
|---|---|---|---|
| 5,968,176 A | 10/1999 | Nessett et al. | |
| 5,978,679 A | 11/1999 | Agre | |
| 5,987,011 A | 11/1999 | Toh | |
| 5,987,334 A | 11/1999 | Kaku | |
| 5,987,611 A | 11/1999 | Freund | |
| 6,002,352 A * | 12/1999 | El-Ghoroury et al. | 341/139 |
| 6,006,090 A | 12/1999 | Coleman et al. | |
| 6,028,914 A | 2/2000 | Lin et al. | |
| 6,032,042 A | 2/2000 | Kauppi | |
| 6,038,230 A | 3/2000 | Ofek | |
| 6,041,166 A | 3/2000 | Hart et al. | |
| 6,052,725 A | 4/2000 | McCann et al. | |
| 6,078,575 A | 6/2000 | Domety et al. | |
| 6,081,715 A | 6/2000 | LaPorta et al. | |
| 6,085,076 A * | 7/2000 | Lindsay et al. | 455/277.1 |
| 6,091,951 A | 7/2000 | Sturniolo et al. | |
| 6,094,421 A * | 7/2000 | Scott | 370/280 |
| 6,112,085 A | 8/2000 | Garner et al. | |
| 6,122,514 A | 9/2000 | Spaur et al. | |
| 6,130,892 A | 10/2000 | Shote et al. | |
| 6,131,121 A | 10/2000 | Mattaway et al. | |
| 6,137,802 A | 10/2000 | Jones et al. | |
| 6,147,986 A | 11/2000 | Orsic | |
| 6,154,461 A | 11/2000 | Sturniolo et al. | |
| 6,161,123 A | 12/2000 | Renouard et al. | |
| 6,167,513 A | 12/2000 | Inoue et al. | |
| 6,170,057 B1 | 1/2001 | Inoue et al. | |
| 6,185,184 B1 | 2/2001 | Mattaway et al. | |
| 6,185,413 B1* | 2/2001 | Mueller et al. | 455/405 |
| 6,195,705 B1 | 2/2001 | Leung | |
| 6,201,962 B1 | 3/2001 | Sturniolo et al. | |
| 6,212,563 B1 | 4/2001 | Beser | |
| 6,230,004 B1 | 5/2001 | Hall et al. | |
| 6,233,318 B1* | 5/2001 | Picard et al. | 379/88.17 |
| 6,233,616 B1 | 5/2001 | Reid | |
| 6,233,617 B1 | 5/2001 | Rothwein et al. | |
| 6,233,619 B1 | 5/2001 | Narisi et al. | |
| 6,236,652 B1 | 5/2001 | Preston et al. | |
| 6,240,514 B1 | 5/2001 | Inoue et al. | |
| 6,243,372 B1* | 6/2001 | Petch et al. | 370/350 |
| 6,243,749 B1 | 6/2001 | Sitaraman et al. | |
| 6,243,753 B1 | 6/2001 | Machn et al. | |
| 6,249,818 B1 | 6/2001 | Sharma | |
| 6,252,884 B1 | 6/2001 | Hunter | |
| 6,256,300 B1 | 7/2001 | Ahmed et al. | |
| 6,256,739 B1 | 7/2001 | Skopp et al. | |
| 6,259,405 B1 | 7/2001 | Stewart et al. | |
| 6,263,213 B1 | 7/2001 | Kovacs | |
| 6,286,052 B1 | 9/2001 | McCloghrie et al. | |
| 6,308,273 B1 | 10/2001 | Goertzel et al. | |
| 6,308,281 B1 | 10/2001 | Hall, Jr. et al. | |
| 6,336,135 B1 | 1/2002 | Niblett et al. | |
| 6,347,340 B1 | 2/2002 | Coelho et al. | |
| 6,412,025 B1 | 6/2002 | Cheston et al. | |
| 6,415,329 B1 | 7/2002 | Gelman et al. | |
| 6,421,781 B1 | 7/2002 | Fox et al. | |
| 6,438,594 B1 | 8/2002 | Bowman-Amuah | |
| 6,446,200 B1 | 9/2002 | Ball et al. | |
| 6,449,259 B1 | 9/2002 | Allain et al. | |
| 6,456,594 B1* | 9/2002 | Kaplan et al. | 370/238 |
| 6,477,543 B1 | 11/2002 | Huang et al. | |
| 6,484,261 B1 | 11/2002 | Wiegel | |
| 6,501,767 B1 | 12/2002 | Inoue et al. | |
| 6,510,153 B1 | 1/2003 | Inoue et al. | |
| 6,546,425 B1 | 4/2003 | Hanson et al. | |
| 6,597,671 B1 | 7/2003 | Ahmadi et al. | |
| 6,611,864 B2 | 8/2003 | Putzolu et al. | |
| 6,614,774 B1 | 9/2003 | Wang | |
| 6,615,267 B1 | 9/2003 | Whalen et al. | |
| 6,621,793 B2 | 9/2003 | Widegren et al. | |
| 6,636,502 B1 | 10/2003 | Lager et al. | |
| 6,661,780 B2 | 12/2003 | Li | |
| 6,694,366 B1 | 2/2004 | Gernert et al. | |
| 6,701,155 B2 | 3/2004 | Sarkkinen et al. | |
| 6,714,515 B1 | 3/2004 | Marchand | |
| 6,714,987 B1 | 3/2004 | Amin et al. | |
| 6,732,177 B1 | 5/2004 | Roy | |
| 6,769,000 B1 | 7/2004 | Akhtar et al. | |
| 6,798,757 B2 | 9/2004 | Mizutari | |
| 6,804,720 B1 | 10/2004 | Vilander et al. | |
| 6,854,014 B1 | 2/2005 | Amin et al. | |
| 6,856,676 B1 | 2/2005 | Pirot et al. | |
| 6,934,558 B1* | 8/2005 | Sainton et al. | 455/552.1 |
| 6,999,774 B2 | 2/2006 | Idani et al. | |
| 7,065,047 B2 | 6/2006 | Boxall et al. | |
| 7,139,591 B2* | 11/2006 | Callaghan et al. | 455/557 |
| 2001/0009025 A1 | 7/2001 | Ahonen | |
| 2001/0042201 A1 | 11/2001 | Yamaguchi et al. | |
| 2001/0047474 A1 | 11/2001 | Takagi et al. | |
| 2001/0052081 A1 | 12/2001 | McKibben et al. | |
| 2002/0066036 A1 | 5/2002 | Makineni et al. | |
| 2002/0069278 A1 | 6/2002 | Forsi | |
| 2002/0075812 A1 | 6/2002 | Corwin | |
| 2002/0091855 A1 | 7/2002 | Yemini et al. | |
| 2002/0093956 A1 | 7/2002 | Gurin | |
| 2002/0098840 A1 | 7/2002 | Hanson et al. | |
| 2002/0147843 A1 | 10/2002 | Rao | |
| 2002/0167922 A1 | 11/2002 | Inoue et al. | |
| 2002/0176383 A1 | 11/2002 | Inoue et al. | |
| 2003/0028612 A1 | 2/2003 | Lin et al. | |
| 2003/0061384 A1 | 3/2003 | Nakatani | |
| 2003/0120811 A1 | 6/2003 | Hanson et al. | |
| 2003/0163567 A1 | 8/2003 | McMorris et al. | |
| 2003/0191848 A1 | 10/2003 | Hesselink et al. | |
| 2003/0222819 A1* | 12/2003 | Karr et al. | 342/457 |
| 2003/0223439 A1 | 12/2003 | O'Neill | |
| 2003/0228874 A1 | 12/2003 | Mallette | |
| 2005/0073966 A1 | 4/2005 | Kim et al. | |
| 2005/0085232 A1 | 4/2005 | Laitinen et al. | |
| 2006/0025158 A1* | 2/2006 | Leblanc et al. | 455/456.2 |

FOREIGN PATENT DOCUMENTS

| | | |
|---|---|---|
| EP | 0766490 | 4/1997 |
| EP | 0793395 | 9/1997 |
| EP | 0898430 | 2/1999 |
| EP | 0998094 | 5/2000 |
| EP | 1089494 | 4/2001 |
| EP | 1150521 | 10/2001 |
| JP | 63-224422 | 9/1988 |
| JP | 3-32125 | 2/1991 |
| JP | 09-512364 | 5/1997 |
| JP | 09-507986 | 8/1997 |
| JP | 09-233555 | 9/1997 |
| WO | 94/13069 | 6/1994 |
| WO | 96/23369 | 8/1996 |
| WO | 96/28947 | 9/1996 |
| WO | 97/15160 | 4/1997 |
| WO | 98/29975 | 7/1998 |
| WO | 00/33189 | 6/2000 |
| WO | 01/28185 | 4/2001 |
| WO | 01/31472 | 5/2001 |
| WO | 02/23362 | 3/2002 |
| WO | 03/061188 | 7/2003 |

OTHER PUBLICATIONS

Defendant and Counterclaim Plaintiff NetMotion Wireless Inc.'s Brief In Support of It's Motion to Amend Answer to Second Amended Complaint and Counterclaim, dated Aug. 3, 2005.

Padcom Inc.'s Answering Brief in Opposition to Defendant and Counterclaim Plaintiff NetMotion Wireless Inc.'s Motion to Amend Answer to Second Amended Complaint and Counterclaim (sealed), dated Aug. 17, 2005.

NetMotion Wireless Inc.'s Reply Brief In Further Support of Its Motion to Amend Its Answer to Second Amended Complaint and Counterclaim, dated Aug. 24, 2005.

Joint Claim Construction Statement (DI 265), Sep. 15, 2005.
Plaintiff Padcom Inc.'s Opening Brief In Support of Its Proposed Claim Construction (DI 261), Sep. 15, 2005.
Declaration of Edward W. Knightly for Padcom, Ph.D. (DI 262), Sep. 15, 2005.
NetMotion Wireless Inc.'s Markman Brief (DI 266), Sep. 15, 2005.
Declaration of David B. Johnson, Ph.D., regarding Markman Brief for NetMotion (DI 268), dated Sep. 15, 2005.
Defendant NetMotion Wireless, Inc.'s Opening Brief In Support of Its Motion for Summary Judgment of Invalidity Under U.S. Patent No. 6,826,405 Under 35 U.S.C. §112 (sealed) (DI 276), dated Sep. 29, 2005.
Defendant NetMotion Wireless, Inc.'s Opening Brief In Support of Its Motion for Summary Judgment of Invalidity of U.S. Patent Nos. 6,418,324, 6,198,920, and 6,826,405 Under 35 U.S.C. §102 (DI 279), dated Sep. 29, 2005.
Padcom Inc.'s Opening Brief In Support of Motion for Summary Judgment of No. Invalidity Under 35 U.S.C. §§102, 103 (with attached Declaration of Edward W. Knightly, Ph.D. In Support of Padcom's Motion for Summary Judgment of No. Validity Under 35 U.S.C. §§102, 103), dated Sep. 29, 2005.
Padcom Inc.'s Opening Brief In Support of Motion for Partial Summary Judgment of No. Invalidity Under 35 U.S.C. §112, dated Sep. 29, 2005.
Padcom Inc.'s Answering Brief to NetMotion Wireless Inc.'s Markman Brief (with attached Supplemental Declaration of Edward W. Knightly, Ph.D. In Support of Padcom's Proposed Claim Construction) (DI 328), dated Oct. 13, 2005.
Defendant NetMotion Wireless Inc.'s Answering Claim Construction Brief, dated Oct. 13, 2005.
Declaration of David B. Johnson, Ph.D. In Support of NetMotion's Answering Claim Construction Brief, dated Oct. 13, 2005 (sealed).
Padcom Inc.'s Answering Brief In Opposition to Defendant's Motion for Summary Judgment of Invalidity of U.S. Patent No. 6,826,405 Under 35 U.S.C. §112 (with attached Second Declaration of Edward W. Knightly, Ph.D. Regarding Prior Art) (DI 343), dated Oct. 14, 2005.
Padcom Inc.'s Answering Brief in Opposition to NetMotion Wireless Inc.'s Motion for Summary Judgment of Invalidity Under 35 U.S.C. §102 (with attached Second Declaration of Edward W. Knightly, Ph.D. Regarding Prior Art) (DI 344), dated Oct. 14, 2005.
Defendant NetMotion Wireless Inc.'s Answering Brief to Plaintiff Padcom's Motion For Partial Summary Judgment of No Invalidity Under 35 U.S.C. §112 (DI 345), dated Oct. 14, 2005.
Defendant NetMotion Wireless, Inc.'s Answering Brief to Plaintiff Padcom's Motion For Partial Summary Judgment of No Invalidity Under 35 U.S.C. §§ 102 and 103 (DI 351), dated Oct. 14, 2005.
Declaration of David B. Johnson, Ph.D. In Support of Defendant NetMotion Wireless Inc.'s Answering Brief to Padcom's Motion For Partial Summary Judgment of No Invalidity Under 35 U.S.C. §§ 102 and 103 (DI 352), dated Oct. 14, 2005.
Padcom Inc.'s Reply Memorandum In Further Support of Its Motion for Summary Judgment of No Invalidity Under 35 U.S.C. §§ 102, 103 (with attached Second Declaration of Edward W. Knightly, Ph.D. Regarding Prior Art and Third Declaration of Edward W. Knightly, Ph.D. Regarding Invalidity) (DI 363), dated Oct. 21, 2005.
Padcom Inc.'s Reply to NetMotion Wireless Inc.'s Answering Brief to Padcom's Motion for Partial Summary Judgment of No Invalidity Under 35 U.S.C. § 112 (with attached Second Declaration of Edward W. Knightly, Ph.D. Regarding Prior Art and Third Declaration of Edward W. Knightly, Ph.D. Regarding Invalidity) (DI 364), dated Oct. 21, 2005.
Defendant NetMotion Wireless Inc.'s Reply Brief In Support of Its Motion for Summary Judgment of Invalidity of U.S. Patent Nos. 6,418,324, 6,198,920 and 6,826,405 Under 35 U.S.C. §102 (DI 366), dated Oct. 21, 2005.
Defendant NetMotion Wireless Inc.'s Reply Brief In Support of Its Motion for Summary Judgment of Invalidity of U.S. Patent No. 6,826,405 Under 35 U.S.C. §112 (DI 367), dated Oct. 21, 2005.
Transcript of Markman Hearing (DI 416), dated Dec. 6, 2005.
Joint Statement In Response to Court Order Dated Jan. 18, 2006 Regarding Terms of Art, dated Jan. 25, 2006.

Declaration of Edward W. Knightly, Ph.D. On Behalf of Padcom In Further Response to Order Dated Jan. 18, 2006 Regarding Terms of Art (DI 430), dated Jan. 26, 2006.
NetMotion Wireless, Inc.'s Notice Pursuant to 35 U.S.C. §282, dated Feb. 13, 2006.
Padcom's Email to Judge Robinson Regarding NetMotion Wireless Inc.'s Reconsideration of the Court's Construction of Disputed Claim Terms "dissimilar networks", dated Feb. 27, 2006.
NetMotion Wireless Inc.'s Email to Judge Robinson Regarding Reply to Padcom's Email Regarding Claim Terms "dissimilar networks", dated Feb. 27, 2006.
Plaintiff Padcom Inc.'s Motion For Clarification of the Court's Memorandum Markman Order (DI 463), dated Mar. 6, 2006.
Memorandum Opinion regarding Padcom's Partial Summary Judgment of No Invalidity Under 35 U.S.C. § 112 and Summary Judgment of Invalidity Under 35 U.S.C. § 112 (DI 448), dated Feb. 22, 2006.
Order regarding Padcom's Partial Summary Judgment of No Invalidity Under 35 U.S.C. § 112 and NetMotion's Motion for Summary Judgment of Invalidity of U.S. Patent No. 6,826,405 Under 35 U.S.C. § 112 (DI 449), dated Feb. 22, 2006.
Order regarding Padcom's Partial Summary Judgment of No Invalidity Under 35 U.S.C. § 102 and 103 (denied) (DI 447), dated Feb. 22, 2006.
Memorandum Opinion regarding NetMotion Wireless Inc.'s Summary Judgment of Invalidity of U.S. Patent Nos. 6,418,324, 6,198,920 and 6,826,405 Under 35 U.S.C. § 102 (DI 452), dated Feb. 22, 2006.
Order regarding NetMotion Wireless Inc.'s Summary Judgment of Invalidity of U.S. Patent Nos. 6,418,324, 6,198,920 and 6,826,405 Under 35 U.S.C. § 102 (denied) (DI 453), dated Feb. 22, 2006.
Memorandum Order regarding Claim Construction (Markman) (DI 454), dated Feb. 22, 2006.
Memorandum Order granting Plaintiff Padcom's Motion for Reconsideration and Various Requests for Clarification (DI 467), dated Mar. 8, 2006.
Stipulation and Order regarding U.S. Patent No. 6,198,920 (DI 475), dated Mar. 15, 2006.
Charge to the Jury (DI 485), Mar. 24, 2006.
Jury Verdict (DI 486), Mar. 28, 2006.
Stipulated Entry of Final Judgment in favor of Padcom Inc. and against NetMotion Wireless Inc.—Case Closed (DI 512), Jul. 12, 2006.
Defendant NetMotion Wireless Inc.'s Response to Plaintiff's First Set of Interrogatories, dated Aug. 27, 2004.
Defendant NetMotion Wireless Inc.'Second Supplemental Response to Plaintiff's Second Set of Interrogatories (No. 16), dated Dec. 16, 2004.
Defendant NetMotion Wireless Inc.'s Third Supplemental Response to Plaintiff's Second Set of Interrogatories (No. 16), including Claim Charts, dated Jan. 14, 2005.
Defendant NetMotion Wireless Inc.'s Fourth Supplemental Response to Plaintiff's Second Set of Interrogatories (No. 16), including Claim Charts, dated Jan. 31, 2005.
Defendant NetMotion Wireless Inc.'s Fifth Supplemental Response to Plaintiff's Second Set of Interrogatories (No. 16), including two sets of Claim Charts, dated Mar. 22, 2005.
Defendant NetMotion Wireless Inc.'s Supplemental Responses to Certain Interrogatory Nos. 1-34 Previously Served by Plaintiff Padcom Inc., dated May 27, 2005.
Plaintiff's First Supplemental Responses and Objections to Defendant's First Set of Interrogatories, dated Dec. 17, 2004.
Plaintiff's First Supplemental Responses and Objections to Defendant's Third Set of Interrogatories, dated Apr. 5, 2005.
Padcom's Objections and Responses to Defendant and Counter-Claimant NetMotion Wireless Inc.'s Fifth Set of Interrogatories [Nos. 48-60], dated May 27, 2005.
Plaintiff's Second Supplemental Responses and Objections to Defendant's Third Set of Interrogatories [No. 41], May 27, 2005.
Padcom Inc.'s Rebuttal Expert Witness Report of Edward W. Knightly, Ph.D., dated Aug. 9, 2005.
Declaration of Edward W. Knightly, Ph.D. On Behalf of Padcom In Further Response to Order Dated Jan. 18, 2006 Regarding Terms of Art, dated Jan. 26, 2006.

Expert Report of NetMotion's Expert David B. Johnson, dated Jun. 13, 2005.

Supplemental Expert Report of NetMotion Wireless Inc.'s Expert David B. Johnson, Ph.D., dated Jul. 22, 2005.

Second Supplemental Expert Report of NetMotion Wireless Inc.'s Expert David B. Johnson, Ph.D., dated Feb. 10, 2006.

CD-ROM marked "Padcom Trial Transcript", including trial transcripts from Mar. 15-17, 2006, and from Mar. 20-24, 2006, in the United States District Court for the District of Delaware.

CD-ROM marked "Doviak Deposition", including the deposition of Inventor William Doviak, on Apr. 12, 2005.

CD-ROM marked "Houvig Deposition", including the deposition of Inventor Flex Houvig, on Mar. 28, 2005.

CD-ROM marked "Whitmore Deposition", including the deposition of Inventor David Whitmore, on Mar. 21, 2005.

CD-ROM marked "Barwan Video 1" (unable to ascertain a date).

CD-ROM marked "Barwan Video 2", and Declaration of Randy Katz regarding date.

Opinion Letter from Robert Faris to Robert Colliton, dated Jan. 8, 2004.

Opinion Letter from Robert Faris to Robert Hunsberger, dated Mar. 31, 2005.

"KeyWareTM—A Wireless Distributed Computing Environment", Racotek White Paper, Racotek, Inc., Minneapolis, MN, 1995.

"Mavric 2000: Integrated Data and Voice Communications System", Mavric 2000 Performance Specifications Brochure, Metric Systems Corp., Acton, MA, 1991.

"RacoNet: Mobile Data Communication Services Product Catalog," Rev. 1.03, Racotek, Inc., Minneapolis, MN, 1993.

"Racotek: Design Considerations for Mobile Data Applications", Racotek 400-0054-00, Racotek, Inc., Minneapolis, MN, Jan. 1993.

"RacoNet: Mobile Data Communications Services Price List", Rev. 1.03, Racotek, Inc., Minneapolis, MN, 1993.

"MPS II System Component: Mobile System Printer", Racotek Sales Brochure, Racotek, Inc., Minneapolis, MN, Feb. 1990.

"MPS II System Component: Mobile System Data Terminal", Racotek Sales Brochure, Racotek, Inc., Minneapolis, MN, Feb. 1990.

"MPS II System Component: Adaptive Network Modem", Racotek Sales Brochure, Racotek, Inc., Minneapolis, MN, Feb. 1990.

"Racotek Overview", Racotek, Inc., Minneapolis, MN, 1993.

"Unify Your Mobile Data Communications with RacoNet", Racotek Sales Brochure, Racotek, Inc., Minneapolis, MN, 1992.

*Datalines*, vol. 5, No. 2, Racotek, Inc., Minneapolis, MN, Apr. 1993.

*Datalines*, vol. 5, No. 3, Racotek, Inc., Minneapolis, MN, Sep. 1993.

*Datalines*, vol. 6, No. 1, Racotek, Inc., Minneapolis, MN, Feb. 1994.

"Racotek/HDC: Operations Booklet for Mobile Data Terminals", Racotek, Inc., Minneapolis, MN, 1993.

I. Shpancer et al., "Open Data-On-Voice Systems for SMR's", Racotek—Radio Computer Technologies, presented at NABER's 1990 Annual Meeting, May 9-12, Tampa, FL, 1990.

Robert J. Fraser, "The MTS-Part II", *Communications*, pp. 52-55, Aug. 1991.

"Wireless Data Communications and RAM Mobile Data", RAM Mobile Data Sales Brochure, RAM Mobile Data U.S.A., 1992.

"RAM Mobile Data: Field Service", RAM Mobile Data Sales Brochure, RAM Mobile Data U.S.A., 1992.

*On the Air*, a quarterly publication of ARDIS, Lincolnshire, IL, vol. 3, Spring 1993.

*On the Air*, a quarterly publication of ARDIS, Lincolnshire, IL, vol. 4, Jul. 1993.

*On the Air*, a quarterly publication of ARDIS, Lincolnshire, IL, vol. 5, Fall 1993.

Robert B. Euler, "Making the Mobile Communications Connection", *MSM Magazine*, Jun. 1990.

"ARDIS Marks First Birthday of Network Operation", ARDIS News Release, ARDIS, Lincolnshire, IL, Apr. 1991.

"ARDIS Extends its Reach into Canada", ARDIS News Release, ARDIS, Lincolnshire, IL, Feb. 1992.

"ARDIS Focuses on Sales Force Automation", ARDIS News Release, ARDIS, Lincolnshire, IL, Oct. 1993.

Form S-1 Registration Statement of Racotek Inc. (with exhibits), as filed with the Securities and Exchange Commission on Oct. 22, 1993.

Amendment No. 1 to Form S-1 Registration Statement of Racotek Inc., as filed with the Securities and Exchange Commission on Nov. 4, 1993.

Ericsson GE, "Mobile Data Questions & Answers", dated Mar. 3, 1994.

Motorola Private Systems Division Land Mobile Products Sector, "VRM 100 Vehicular Radio Modem For Integrated Voice and Data Operation on Smartnet and SmartZone Trunked Radio Systems and Conventional Radio Systems—Product Description", Apr. 5, 1994.

Motorola Mobile Data Division, "RPM Native Mode Interface R1.1 Reference Manual", published Sep. 1992.

Johnson, David B. et al., "Protocols for Adaptive Wireless and Mobile Networking", *IEEE Personal Communications*, vol. 3, No. 1, pp. 34-42, Feb. 1996.

Hills, Alex et al., "A Wireless Data Network Infrastructure at Carnegie Mellon University", *IEEE Personal Communications*, vol. 3, No. 1, pp. 56-63, Feb. 1996.

Johnson, David B., "Scalable Support for Transparent Mobile Host Internetworking", *Wireless Networks*, vol. 1, No. 3, pp. 311-321 (1995).

Johnson, David B., "Scalable and Robust Internetwork Routing for Mobile Hosts", 14th International Conference on Distributed Computing Systems, Jun. 21-24, 1994, Pozman, Poland.

Johnson, David B., "Ubiquitous Mobile Host Internetworking", *Proceedings of the Fourth Workshop on Workstation Operating Systems*, IEEE Computer Society, Oct. 1993.

English language Abstract of JP 63-224422.

English language Abstract of JP 3-32125.

Perkins, Charles et al., "IMHP: A Mobile Host Protocol for the Internet", *Computer Networks and ISDN Systems*, vol. 27, No. 3, pp. 479-491 (1994).

Johnson, David B., "Mobile Host Internetworking Using IP Loose Source Routing", Carnegie Mellon University, School of Computer Science (1993).

Perkins, Charles et al., "Mobility Support in IPv6", *Proceedings of the Second Annual International Conference on Mobile Computing and Networking (MobiCom '96)*, Nov. 10-12, 1996.

Solomon, J., "Applicability Statement for IP Mobility Support", The Internet Engineering Taskforce, RFC 2005, Oct. 1996.

Thyfault, M., "Wireless has a Support Act—Carriers at Comdex Tout Applications for Cellular Digital Packet Data," *Information Week* (1993). Available from Dialog Corporation.

Wexler, J., "CDPD Spec Could Embrace Analog Nets," *Network World* vol. 12, No. 13 (Mar. 1995): pp. 17, 24. Available from Dialog Corporation.

"Hybrid Cellular Data Technology in Works,"*Telecommunications Alert* vol. 12, No. 222 (Nov. 1995). Available from Lexis.

Schwartz, J., "GTE Mobilnet Retrofits CDPD Network to Connect with Analog Cellular," *Communications Week* (1996): p. 53. Available from Dialog Corporation.

"GTE Closer to Installing Circuit Switched-CDPD Gateway; Plans to Offer National 'CDPD Access' via '800' Number Service," *Wireless Data News*, vol. 4, Issue 6 (Mar. 1996). Available from Dialog Corporation.

Washburn, B., "CDPD: The Tower of Power," *America's Network* (Aug. 1996): p. 42. Available from Lexis.

Steward, S., "A Circuitous Route to CDPD Expansion; Cellular Digital Packet Data," *Cellular Business* vol. 13, No. 9 (Sep. 1996): p. 102. Available from Lexis.

"Sierra Wireless Adds CS-CDPD," *Business Wire* (Jan. 1997), Available from World Wide Web:.(http://www.sierrawireless.com/news/cdpd.html), downloaded Mar. 12, 2002.

Sukow, R., "GTE Wireless's CS-CDPD Technology Will Be Commercially Available Feb. 3," *Communications Today* (Jan. 1997). Available from Dialog Corporation.

"Wireless: GTE, Hughes Network Systems and PCSI Join to Provide Nationwide Wireless Access for 'Super Phones,' Other Intelligent Devices," *EDGE, on & about AT&T* (Feb. 1997). Available from DIALOG Corporation.

Pate, K., "CS-CCPD May Solve Wireless Data User Problem with Coverage (Circuit Switched-Cellular Digital Packet Data Is Launched to Allow Data Users to Access CDPD Functionality Across an Entire Network)," *RCR Radio Communications Report* vol. 16, No. 5 (Feb. 1997): p. 2. Available from Dialog Corporation.

"GTE Wireless Launches Long-Anticipated CS-CDPD Service; Other Cellular Carriers Continue to Reject Hybrid Approach," *Wireless Data News*, vol. 5, Issue 3 (Feb. 1997). Available from Dialog Corporation.

"Industry News: CS-CDPD Goes Nationwide," *Advanced Transportation Industry Review*. (May 1997). Available from Dialog Corporation.

"Dueling Realities: Cellular Data Developers Struggle to Build Business, Yet Foresee Future Consumer, Ad-Supported Market," *Wireless Data News*, vol. 5, Issue 11 (May 1997). Available from Dialog Corporation.

"GTE Wireless Offers National Access for 'Super Phones'," *Cellular Business*(Jun. 1997). Available from Dialog Corporation.

Morris, J., "Guide to Wireless Data Networks," Sierra Wireless, (Jul. 1997), available on the World Wide Web: (http://www.ofb.net/~heath/ardis/2110152.pdf).

"GTE, Sierra Announce CDPD Solution (GTE Wireless and Sierra Wireless Introduced a Circuit Switched Cellular Digital Packet Data Solution)," *RCR Radio Communications Report* (Jun. 1998): p. 8. Available from Dialog Corporation.

"GTE, Sierra Wireless Bring Circuit-Switched CDPD to Indiana Law Enforcement," *Wireless Data News*, vol. 6, Issue 15 (Jul. 1998). Available from Dialog Corporation.

"Sierra Modem Adds Coverage (Indiana State Police Department is the First in US to Use New Circuit-Switched CDPD Modem from Sierra Wireless," *Wireless Week* (Jul. 1998): p. 14. Available from Dialog Corporation.

"GTE and Sierra Wireless Extend Reach of Cellular Digital Packet Data N etworks Nationwide," Available from World Wide Web: (http://www.sierrawireless.com/news/gte&swi.html), downloaded Mar. 12, 2002.

"MP215: The First Ever CS-CDPD 3W Modem. (End-to-end wireless IP anywhere—Automatically)," Tri-M Systems, Coquitlam, B.C., Canada.

"CS-CDPD," Available from World Wide Web: (http://www.sierrawireless.com/alliance/nettech_cscdpd.asp.), downloaded Mar. 12, 2002.

"Circuit Switch Cellular Digital Packet Data," Available from World Wide Web: (http://www.leapforum.org/published/internetworkMobility/split/node91.html), downloaded Mar. 18, 2002.

"MP215 Modem Installation, Configuration, and User's Guide," Revision 1.0, Part No. 2110036, Sierra Wireless, Jun. 1998.

"Where There's Voice, There's Now Cost-effective Data with Lucent Technologies' New Circuit Switched CDPD Capability," Lucent Technologies, Jun. 1996.

Hunt, Craig, "TCP/IP Network Administration" O'Reilly & Associates, Inc., pp. 28-35 (1992).

Baker, M., "Changing Communication Environments in MosquitoNet," Proceedings of the IEEE Workshop on Mobile Computing Systems and Applications, Dec. 1994.

Cheshire, S. et al., "Internet Mobility 4×4", Proceedings of SIGCOMM '96, Stanford California, Aug. 1996.

Cheshire, M. et al., "Experiences with a Wireless Network in MosquitoNet", Proceedings of the IEEE Hot Interconnects Symposium '95, Aug. 1995.

Zhao, X. et al., "Flexible Network Support For Mobility," Proceedings of the Fourth Annual ACM/IEEE International Conference on Mobile Computing and Networking (MobiCom 1998), Dallas Texas, Oct. 1998.

Baker, M. et al., "Supporting Mobility In MosquitoNet," Proceedings of the 1996 Usenix Technical Conference, San Diego, California, Jan. 1996.

Chen J.B. et al., "Moss: A Mobile Operating System Substrate", Harvard University Division of Applied Sciences, May 1995.

Acampora, A.S. et al., "An Architecture and Methodology for Mobile-Executed Handoff in Cellular ATM Networks", IEEE Journal on Selected Areas in Communications, vol. 12, No. 8, Oct. 1994, pp. 1365- 1375.

Amir, E. et al., "An Application Level Video Gateway", Proceedings ACM Multimedia 1995, 1995, 11 pages.

Amir, E. et al., "An Application Level Video Gateway", ACM Multimedia 95—Electronic Proceedings, San Francisco, CA, Nov. 5-9, 1995, pp. 1-18.

Amir, E. et al., "Efficient TCP over Networks with Wireless Links", Proc. Fifth IEEE Workshop on Hot Topics in Operating Systems, May 1995, 6 pages.

Balakrishnan, B. et al., "Improving TCP/IP Performance over Wireless Networks", Mobicom '95, Berkeley, CA, 1995, pp. 2-11.

Balakrishnan, H. et al., "A Comparison of Mechanisms for Improving TCP Performance over Wireless Links", Proc. ACM SIGCOMM 1996, Stanford, CA, Aug. 1996, pp. 1-14.

Balakrishnan, H. et al., "A Comparison of Mechanisms for Improving TCP Performance over Wireless Links", IEEE/ACM Transactions on Networking, Dec. 1997, pp. 1-25.

Balakrishnan, H. et al., "Analyzing Stability in Wide-Area Network Performance", Proc. ACM SIGMETRICS Conference on Measurement and Modeling of Computer Systems, Jun. 1997, 11 pages.

Balakrishnan, H. et al., "Improving Reliable Transport and Handoff Performance in Cellular Wireless Networks", ACM Wireless Networks, vol. 1, No. 4, Dec. 1995, 19 pages.

Balakrishnan, H. et al., "Improving TCP/IP Performance over Wireless Networks", Proceedings of the $1^{st}$ ACM International Conference on Mobile Computing and Networking (Mobicom), Nov. 1995, 10 pages.

Balakrishnan, H. et al., "TCP Behavior of a Busy Internet Server: Analysis and Improvements", Technical Report, University of California at Berkeley, 1997, 11 pages.

Balakrishnan, H. et al., "TCP Improvements for Heterogeneous Networks: The Daedalus Approach", Proceedings of the 35th Annual Allerton Conference on Communication, Control, and Computing, 1997, 10 pages.

Balakrishnan, H. et al., "The Effects of Asymmetry on TCP Performance", Proc. $3^{rd}$ ACM/IEEE International Conference on Mobile Computing and Networking (MobiCom), Budapest, Hungary, Sep. 1997, 13 pages.

Balakrishnan, H., "Challenges to Reliable Data Transport over Heterogeneous Wireless Networks", PhD Dissertation, University of California at Berkeley, 1998, 17 pages.

Brewer, E.A. et al., "A Network Architecture for Heterogeneous Mobile Computing", IEEE Personal Communications Magazine, Oct. 1998, 24 pages.

Caceres, R. et al., "Fast and Scalable Handoffs for Wireless Internetworks", International Conference on Mobile Computing and Networking, Proceedings of the 2nd Annual International Conference on Mobile Computing and Networking, 1996, 11 pages.

Chawathe, Y. et al., "System Support for Scalable and Fault Tolerant Internet Services", IFIP International Conference on Distributed Systems Platforms and Open Distributed Processing (Middleware '98), Lake District, UK, Sep. 1998, 18 pages.

Dasilva, J.S. et al., "Addressing the Needs of the European Community—The European Research Program for Advanced Mobile Systems", IEEE Personal Communications, Feb. 1995, pp. 14-19.

Ferrari, D., "Client Requirements for Real-Time Communication Services", IEEE Communications Magazine, Nov. 1990, pp. 65-72.

Floyd, S. et al., "Link-Sharing and Resource Management Models for Packet Networks", IEEE/ACM Transactions on Networking, vol. 3, No. 4, Aug. 1995, pp. 365-386.

Fox, A. et al., "Adapting to Network and Client Variability via On-Demand Dynamic Distillation", Proceedings of ASPLOS-VII, Oct. 1996, pp. 1-11.

Fox, A. et al., "Adapting to Network and Client Variation Using Infrastructural Proxies: Lessons and Perspectives", 15 pages.

Fox, A. et al., "Cluster-Based Scalable Network Services", Proceedings of SOSP '97, Oct. 1997, 14 pages.

Fox, A. et al., "Experience with Top Gun Wingman: A Proxy-Based Graphical Web Browser for the 3Com PalmPilot", IFIP International Conference on Distributed Systems Platforms and Open Distributed Processing (Middleware '98), Lake District, UK, Sep. 15-18 1998, 18 pages.

Fox, A. et al., "Orthogonal Extensions to the WWW User Interface Using Client-Side Technologies", User Interface Software and Technology (UIST) 97, Bann, Canada, Oct. 1997, 1 page.

Fox, A. et al., "Reducing WWW Latency and Bandwidth Requirements by Real-Time Distillation", Fifth International World Wide Web Conference, Paris, France, May 1996, 9 pages.

Fox, A. et al., "Reducing WWW Latency and Bandwidth Requirements by Real-Time Distillation", Computer Networks and ISDN Systems, vol. 28, No. 711, May 1996, 12 pages.

Fox, A. et al., "Security on the Move: Indirect Authentication Using Kerberos", Proc. Second International Conference on Wireless Networking and Mobile Computing (MoboCom '96), Rye, NY, Nov. 1996, pp. 1-10.

GloMop and Daedalus Groups, "GloMop QoS Preferences and Chunk Scheduling", Jan. 14, 1996, 5 pages.

GloMop and Daedalus Groups, "GloMop Session-layer Preferences and Chunk Scheduling", Jan. 14, 1996, 4 pages.

GloMop Group, "GloMop Client API v1.0", Jan. 14, 1996, 7 pages.

GloMop Group, "GloMop Client API v1.0", Jan. 14, 1996, 7 pages; Applicants note that these two documents are not identical, despite having the same title.

GloMop Group, "The GloMop Client-Side Architecture", Jan. 14, 1996, pp. 1-6.

Henderson, T.R. et al., "On Improving the Fairness of TCP Congestion Avoidance", IEEE Infocom '98, 6 pages.

Henderson, T.R. et al., "Satellite Transport Protocol (STP): An SSCOP-based Transport Protocol for Datagram Satellite Networks", Proceedings of 2 ANDWorkshop on Satellite-Based Information Systems (WOSBIS '97), 1997, 12 pages.

Hodes, T.D. et al., "Composable Ad hoc Location-based Services for Heterogeneous Mobile Clients", ACM Wireless Networks, Special issue on Mobile Computing, May 5, 1998, 16 pages.

Hodes, T.D. et al., "Composable Ad-hoc Mobile Services for Universal Interaction", Proceedings of the Third ACM/IEEE International Conference on Mobile Computing, Budapest, Hungary, Aug. 1997, 12 pages.

Ioannidis, J. et al., "IP-Based Protocols for Mobile Internetworking", Proc. Of ACM SIGCOMM '91, 1991, pp. 235-245.

Jubin, J. et al., "The DARPA Packet Radio Network Protocols", Proceedings of the IEEE, vol. 75, No. 1, Jan. 1987, pp. 21-32.

Kahn, J.M. et al., "A Medium with Advantages over Radio . . . and Some Drawbacks—Non-Directed Infrared Links for High-Capacity Wireless LANs", IEEE Personal Communications, Second Quarter 1994, pp. 12-25.

Kahn, R.E. et al., "Advances in Packet Radio Technology", Proceedings of the IEEE, vol. 66, No. 11, Nov. 1978, pp. 1468-1496.

Kahn, R.E., "The Organization of Computer Resources into a Packet Radio Network", IEEE Transactions on Communications, vol. COM-25, No. 1, Jan. 1977, pp. 169-178.

Katz, R.H. et al., "The Bay Area Research Wireless Access Network (BARWAN)", Proc. Of the Spring COMPCON Conference, 1996, 6 pages.

Keeton, K. et al., "Providing Connection-Oriented Network Services to Mobile Hosts", Proceedings of the USENIX Symposium on Mobile and Location-Independent Computing, Cambridge, MA, Aug. 1993, pp. 1-20.

Le, M.T. et al., "Software Architecture of the Infopad System", Proceedings of the Mobidata Workshop on Mobile and Wireless Information Systems, Rutgers, New Jersey, Nov. 1994, pp. 1-1.

Leiner, B.M. et al., "Issues in Packet Radio Network Design", Proceedings of the IEEE, vol. 75, No. 1, Jan. 1987, pp. 6-20.

Mah, B.A. et al., "Providing Network Video Service to Mobile Clients", Proceedings of the Fourth Workshop on Workstation Operating Systems, IEEE, Oct. 1993, 7 pages.

Mitola, J., "The Software Radio Architecture", IEEE Communications Magazine, May 1995, pp. 26-38.

Myles, A. et al., Comparing Four IP Based Mobile Host Protocols, Computer Networks and ISDN Systems, vol. 26, 1993, pp. 349-355.

Nguyen, G.T. et al., "A Trace-Based Approach for Modeling Wireless Channel Behavior", Proc. Winter Simulation Conference, Dec 1996, 9 pages.

Noble, B.D. et al., "Trace-Based Mobile Network Emulation", Proceedings of ACM SIGCOMM 1997, Cannes, France, Sep. 1997, 11 pages.

Padmanabhan, V.N. et al., "Improving HTTP Latency", Computer Networks and ISDN Systems, vol. 28, No. 1, Dec. 1995, 13 pages.

Padmanabhan, V.N. et al., "Networking Using Direct Broadcast Satellite", Proc. Workshop on Satellite- Based Information Systems, Nov. 1996, 11 pages.

Padmanabhan, V.N. et al., "TCP Fast Start: A Technique for Speeding Up Web Transfers", In Proc. IEEE Globecom 1998 Internet Mini-Conference, Sydney, Australia, Nov. 1998, 6 pages.

Padmanabhan, V.N. et al., "Using Predictive Prefetching to Improve World Wide Web Latency", ACM SIGCOMM Computer Communication Review, Jul. 1996, 15 pages.

Pahlavan, K. et al., "Wireless Data Communications", Proceedings of the IEEE, vol. 82, No. 9, Sep. 1994, pp. 1398-1430.

Perkins, C., "Providing Continuous Network Access to Mobile Hosts Using TCP/IP", Computer Networks and ISDN Systems, vol. 26, 1993, pp. 357-369.

Seshan, S. et al., "Handoffs in Cellular Wireless Networks: The Daedalus Implementation and Experience", Kluwer International Journal on Wireless Personal Communication Systems, 1996, 1 page.

Seshan, S. et al., "SPAND: Shared Passive Network Performance Discovery", Proceedings of the USENIX Symposium on Internet Technologies and Systems, 1997, 13 pageS.

Stemm, M. et al., "Measuring and Reducing Energy Consumption of Network Interfaces in Hand-Held Devices", Institute of Electronics, Information, and Communication Engineers Transactions on Communications, E80B (8), Aug. 1997, pp. 1-7.

Stemm, M. et al., "Reducing Power Consumption of Network Interfaces in Hand-Held Devices (Extended Abstract)", Proc. Of the Third Workshop on Mobile Multimedia Communications (MoMuC-3), Sep. 1996, pp. 1-6.

Request for Comments (RFC 1812), "Requirements for IP Version 4 Routers", Jun. 1995.

Braden, R. et al., Request for Comments (RFC 1009), "Requirements for Internet Gateways", Jun. 1987.

A NetMotion's Second Supplemental Response to Second Set of Interrogatories (No. 16), dated Dec. 16, 2004, mentioned in Section III(C).

Katz, R.H. et al., "The Case for Wireless Overlay Networks", Proc. of the SPIE Multimedia and Networking Conference (MMNC '96), San Jose, CA, Jan. 1996, 12 pages.

WRQ, "TCP Connection Stacks up as #1 in *Info World* Comparison", WRQ Quarterly, No. 30, Quarter 4, 1994, p. 1.

WRQ,"How WRQ's TCP Connection Reduces Costs and Improves Reliability in Mobile/Wireless Computing", 1995, 4 pages.

WRQ, "WRQ's Reflection Network Series Supports New Wireless Mobile Computing; McCaw Dubs WRQ's TCP Well-suited for Cellular", WRQ Reflection, Oct. 1994, 2 pages.

WRQ, "Questions and Answers on TCP/IP for CDPD Wireless Communications", 1994, 2 pages.

WRQ, "Advantages of WRQ's TCP", WRQ Presentation, Aug. 1994, 7 pages.

Request for Comment (RFC) 1122, "Requirements for Internet Hosts—Communications Layers", IETF 1989.

Almquist, T.P. et al., Request for Comment (RFC) 1716, "Towards Requirements for IP Routers", 1994.

Perkins, C., Request for Comment (RFC) 2002, "IP Mobility Support", IETF, Oct. 1996.

Perkins, C., Request for Comment (RFC) 2003, "IP Encapsulation Within IP", IETF, Oct. 1996.

Castinetra, I. et al., Request for Comment (RFC) 1992, "The Nimrod Routing Architecture", IETF Aug. 1996.

Ramanathan, R. "Nimrod Mobility Support", Nimrod Working Group, Internet Draft, Jul. 1994, 16 pages.

Taylor, M., Request for Comment (RFC) 1674, "A Cellular Industry View of IPng", IETF Aug. 1994.

Almquist, P., "Ruminations on the Next-Hop", Mar. 1993.

Katz, D., "Transmission of IP and ARP over FDDI Networks", Internet Draft, Sep. 1992.

Ohta, M. et al., "Conventional IP over ATM", Internet Draft, Mar. 1995.

Ranch, C., "Transmitting IP Traffic over LocalTalk Networks", Internet Draft, Jul. 1992.

Stevenson, H. et al., "A Method for the Transmission of IP Datagrams Over SNA Networks Using LU6.2 Conversations", Internet Draft, May 1992.

CS CDPD Working Group, "Circuit Switched Cellular Digital Packet Data Implementor Guidelines", Release 1.4, Apr. 21, 1995.
Cerf, V., Request for Comment (RFC) 829, "Packet Satellite Technology Reference Sources", 1982.
www.ka9q.net/code/ka9qnos, printed on Mar. 3, 2005.
Tuch, B., "Development of WaveLAN, an ISM Band Wireless LAN", AT&T Technical Journal, Jul./Aug. 1993, pp. 27-37.
Portable Computer and Communications Association (PCCA), "Extensions to NDIS for Wireless WANs", Version 1.1, 1996.
Maguire, G.Q. Jr., "A Multiport Mobile Internet-Router", IEEE, 1994.
A NetMotion's Response to Plaintiff's First Set of Interrogatories (No. 16), dated Aug. 27, 2004.
Stemm, M. et al., "Vertical Handoffs in Wireless Overlay Networks", ACM Mobile Networking (MONET), Special Issue on Mobile Networking in the Internet, Spring 1998, 18 pages.
Fasbender, A. et al., "Any Network, Any Terminal, Anywhere", IEEE Personal Communications, Apr. 1999, pp. 22-30.
Klements, A. et al., "Mint—A Mobile Internet Router", Proc. IEEE VTC '93, Secaucus, NJ, U.S.A., 1993.
Valko, A.G. et al., "Cellular IP: A New Approach to Internet Host Mobility", ACM Computer Communication Review, Jan. 1999.
Kidston, D. et al., "Transparent Communication Management in Wireless Networks", The Seventh Workshop on Hot Topics in Operating Systems, Mar. 1999, Rio Rico, Arizona.
Golding, L.S., "Satellite Communications Systems Move into the Twenty-First Century", Wireless Networks, vol. 4, 1998, pp. 101-107.
Jing, J. et al., "Client-Server Computing in Mobile Environments", ACM Computing Surveys, vol. 31, No. 2, Jun. 1999.
Inouye, J. et al., Dynamic Network Reconfiguration Support for Mobile Computers, Proceedings of the Third Annual ACM/IEEE International Conference on Mobile Computing and Networking, 1997.
Katz, R.H., "Adaptation and Mobility in Wireless Information Systems", IEEE Personal Communications Magazine, vol. 1, No. 1, 1995, 19 pages.
Seshan, S., "Low-Latency Handoff for Cellular Data Networks", Ph.D. Dissertation, 1996, 173 pages.
Katz, R.H. et al., The Bay Area Research Wireless Access Network (BARWAN), Daedalus/BARWAN Retreat, Jun. 1997, Lake Tahoe, CA, 67 pages.
Katz, R.H. et al., The Bay Area Research Wireless Access Network (BARWAN), Daedalus/BARWAN Retreat, Jun. 1998, Lake Tahoe, CA, 60 pages.
Katz, R.H. et al., The Bay Area Research Wireless Access Network (BARWAN), Daedalus/BARWAN Retreat, Jan. 1998, Lake Tahoe, CA, 69 pages.
Katz, R.H., "Bay Area Research Wireless Access Network (BARWAN) Project Overview", Apr. 21, 1995, 2 pages.
Balakrishnan, H., "Berkeley Snoop Protocol Software", from http://daedalus.cs.Berkeley.edu/software/pub/snoop/snoopv2-bsdi3.0/, 3 pages., including a date thereon of Jun. 15, 2004.
Padmanabhan, V.N., "Direct Broadcast Satellite: Architecture and Evaluation", Daedalus Retreat, Jun. 1996, 14 pages.
Fifth International World Wide Web Conference, Paris, France, May 6-10, 1996, 3 pages.
Nguyen, G., "Wireless Network Simulator (WiNS)", Daedalus/BARWAN Retreat, Jun. 1997, Lake Tahoe, CA, 18 pages.
Nguyen, G., "A Trace-based Approach to Modeling Wireless Channels", Daedalus/BARWAN Retreat, Jan. 1997, Monterey, CA, 21 pages.
Nguyen, G., "Channel Dependent Class Based Queuing", Daedalus/BARWAN Retreat, Jun. 1997, Lake Tahoe, CA, 17 pages.
Nguyen, G., "Improving Quality of Service in Shared Access Networks", Daedalus/BARWAN Retreat, Jun. 1998, Lake Tahoe, CA, 18 pages.
Fox, A. et al., "GloMop Update", Daedalus Retreat, Jun. 1996, 22 pages.
Hodes, T. et al., "Mobility-Enhanced Network Services", Daedalus/BARWAN Retreat, Jan. 1998, Lake Tahoe, CA, 36 pages.
Hodes, T.D. et al., "Composable Ad-hoc Location-based Services", Daedalus/BARWAN Retreat, Jun. 1997, Lake Tahoe, CA, 11 pages.

Joseph, A.D., "Iceberg: From POTS to PANS", Daedalus/BARWAN Retreat, Jun. 11, 1998, 16 pages.
"Index of /software/pub/glomop", from http://daedalus.cs.Berkeley.edu/software/pub/glomop, 2 pages, including a date thereon of Jun. 15, 2004.
Amir, E. et al., "Performance of the Metricom Ricochet Wireless Network", Daedalus Retreat, Jun. 1996, 10 pages.
Katz, R.H. et al., "The Bay Area Research Wireless Access Network: Towards a Wireless Overlay Internetworking Architecture", Daedalus Retreat, Jun. 1996, 57 pages.
Mogul, J., from http://www.research.Compaq.com/wrl/people/mogul/bio.html, 2 pages, including a date thereon of Jun. 15, 2004.
Fox, A. et al., "The Scalable Proxy: Architecture, Evaluation, Evolution", Daedalus/BARWAN Retreat, Jan. 1997, Monterey, CA, 24 pages.
Joseph, A.D., "The Rover Toolkit", Daedalus/BARWAN Retreat, Jan. 15, 1998, 20 pages.
Chawathe, Y., "Systems Issues for Scalable, Fault Tolerant Internet Services", http://www.cs.Berkeley.edu/~yatin/papers/sns-crc.ps, Daedalus/BARWAN Retreat, Jun. 1998, Lake Tahoe, CA, 18 pages.
"Summer 1997 Daedalus/BARWAN Retreat Materials", Jun. 1997, Lake Tahoe, CA, 2 pages.
Fox, A., "TACC Update", Daedalus/BARWAN Winter Retreat, Jan. 1998, Lake Tahoe, CA, 21 pages.
Fox, A., "TACC Retrospective: Contributions, Non-Contributions, and What We Really Learned", Daedalus/BARWAN Retreat, Jun. 1998, Lake Tahoe, CA, 32 pages.
"Index of /software/web-tcp/asym", from http://daedalus.cs.Berkeley.edu/software/web-tcp/asym/, 2 pages, including a date thereon of Jun. 15, 2004.
"The UC Berkeley BARWAN Research Project CDROM ", 1998, 17 pages.
Balakrishnan, H. et al., "A Comparison of Mechanisms for Improving TCP Performance over Wireless Links", Aug. 1996, 36 pages.
"UIST2004", Oct. 24-27, Sante Fe, NM, 2 pages.
Padmanabhan, V.N., "Venkata N. Padmanabhan's Ph.D. Thesis Addressing the Challenges of Web Data Transport", Sep. 1998, abstract only, 3 pages.
Stemm, M. et al., "Vertical Handoffs in Wireless Overlay Networks", Jun. 24, 1996, 17 pages.
Gribble, S. et al., "Daedalus/GloMop Architectural Walkthrough", Jun. 1996, Lake Tahoe, CA, 73 pages.
"Winter 1998 Daedalus/BARWAN Retreat Materials", Jan. 1998, 2 pages.
Balakrishnan, H., "Three Challenges to Reliable Data Transport over Heterogeneous Wireless Networks", Daedalus/BARWAN Retreat, Jun. 1998, Lake Tahoe, CA, 76 pages.
Padmanabhan, V.N., "Direct Broadcast Satellite: Architecture and Evaluation", Jun. 1996,Daedalus Retreat, 14 pages.
Nguyen, G.T., "A Trace-Based Approach to Evaluating Wireless Networks", 27 pages.
"Proxy Architecture", Jan. 1996, 8 pages.
"Example Scenarios of GloMop/Proxy Interaction", Spring 1996, 9 pages.
"Daedalus Glossary", Jan. 13, 1996, 2 pages.
Henderson, T. et al., "Networking over Next-Generation Satellite Systems", Daedalus/BARWAN Retreat, Jun. 1997, 22 pages.
Henderson, T., "On Improving Fairness of TCP Congestion Avoidance", Daedalus/BARWAN Retreat, Jun. 1997, 22 pages.
Henderson, T. et al., "Transport Protocols for Datagram Satellite Networks", Jan. 14, 1997, Daedalus/BARWAN Retreat, 7 pages.
Henderson, T. et al., "Networking over Next-Generation Satellite Systems", Daedalus/BARWAN Retreat, Jun. 1998, 4 pages.
Hodes, T. et al., "Wide-Area Roaming Support", Jan. 1996, Daedalus Retreat, 12 pages.
Daedalus Group, "Network Monitoring and Handoff in Daedalus", Jan. 1996, 10 pages.
Gribble, S. et al., "Daedalus/GloMop Architectural Walkthrough", Jun. 1996, Daedalus Retreat, Lake Tahoe, CA, 73 pages.
Balakrishnan, H., "Hari Balakrishnan's Doctoral Dissertation", Aug. 14, 1998, 2 pages.

Balakrishnan, H., "Challenges to Reliable Data Transport over Heterogeneous Wireless Networks", Ph.D. Dissertation, 1998, 221 pages.
Zhao, X. et al., "Flexible Network Support for Mobility", Proceedings of the 4$^{th}$ Annual ACM/IEEE International Conference on Mobile Computing and Networking, Oct. 25, 1998, pp. 145-156.
Kravets, R. et al., "A Cooperative Approach to User Mobility", Computer Communication Review, vol. 31, No. 5, Oct. 2001, pp. 57-69.
A NetMotion's Fifth Supplemental Response to Second Set of Interrogatories (No. 16), dated Mar. 22, 2005.
Katz, R.H. et al., "The Bay Area Research Wireless Access Network (BARWAN)", IEEE Proceedings of COMPCON '96, Feb. 28, 1996.
Katz, R.H. et al., "The Bay Area Research Wireless Access Network (BARWAN)", Proceedings of COMPCON '96, pp. 15-20.
A CD-ROM, including a movie file which was downloaded from http:///daedalus.cs.berkeley.edu/index.html#overview on Mar. 29, 2005.
RF Enhanced Networks, "Mobile Data Options at the 20,000 ft. Level: Current and Emerging Technologies: Avoiding Pitfalls", (20 pages) Mar. 21, 2003.
Mobile Access Gateway Corporation (MagC) "MagC White Paper: the MacG Pad and MacG Services High Level Architecture Draft", (5 pages) 2002.
NetMotion Wireless, Inc., "TCP Improvements for Wireless", (22 pages) 2004.
Ramanathan, R., "Mobility Support for Nimrod: Requirements and Solution Approaches" (Internet Draft), (16 pages) Jul. 1994.
"CMU Monarch Mobile IPv4 Implementation," Chapter 2, Carnegie Mellon University, Copyright 1995, 1996, pp. 6-23.
Zhao, X. et al., "Flexible Connectivity Management for Mobile Hosts", Technical Report: CSL-T-97-735, Sep. 1997, Computer Science Laboratory, Departments of Electrical Engineering and Computer Science, Stanford University, pp. 1-19.
Myles, A. et al., "Comparison of Mobile Host Protocols for IP", (12 pages) Apr. 7, 1993.
"Actualité/En bref," Le Journal du Net, Mar. 28, 2000.
"Cast Your Vote for 'Wireless Survivor'," Wireless Week, Sep. 11, 2000.
"Computerworld's Emerging Companies to Watch in 2002," Computerworld, Nov. 26, 2001.
"Draadloos het netwerk op," VNUnet.nl, May 25, 2000.
"First Things First: Top 10 Things to Know About Wireless," Network Computing, Jul. 10, 2000.
"Microvision Teams With WRQ to Pursue Opportunities for Mobile Computing in Wireless LAN and WAN Markets," PR Newswire (Company News on Call), Jun., 1, 2000.
"NetMotion Increases Features," CE city (now dba Pocket PC city), Dec. 12, 2000.
"NetMotion lands $8 million in spinoff," PSBJ Online (Puget Sound Business Journal), Apr. 3, 2001.
"NetMotion Mobility 3.0 Beta Extends Continuous Wireless Connections To Windows 2000," Wireless Developer Network-Daily News, Jul. 10, 2001.
"NetMotion, a WRQ spinoff, closes a round of funding," Seattle Times, Business Digest, Apr. 3, 2001.
"NetMotion: Curing the Wireless LAN at St. Luke's Episcopal Hospital," NetMotion Wireless, Inc., Feb. 26, 2001.
"Networld + Interop 2000 Las Vegas," [German] LANline, Jul. 2000.
"New Products," Wireless Week (Wireless Review via NewsEdge Corporation), Feb. 5, 2001.
"Past is prologue: expand data access," Government Computer News, telephone interview with Doug Walker by GCN chief technology editor Susan M. Menke (www.gcn.com), Aug. 20, 2001.
"PEAR Wireless, NetMotion Collaborate To Offer Secure, High Performance WLAN," TMCnet.com, Nov. 13, 2001.
"Top Wireless Specialists Offer NetMotion Wireless Solution," PR Newswire (Today's News), Apr. 18, 2001.
"WRQ Creates NetMotion Wireless," eAI Journal, Apr. 10, 2001.
"WRQ Creates NetMotion Wireless," The Unstrung Stringer (www.unstrung.com), Apr. 4, 2001http://www.unstrung/.
"WRQ Spins off its Mobile Access Business Unit," Mobileinfo.com, News section, Issue #2001—Apr. 16, 2001 (Updated Apr. 18, 2001).
"WRQ Takes Wraps Off NetMotion Connectivity Manager," Xephon, Mar. 24, 2000.
"WRQ's mobile access unit now NetMotion," Seattle P-I, Tech Digest, Business section, Apr. 3, 2001.
"3G TS 23.171, V3.1.0, 3$^{rd}$ Generation Partnership Project; Technical Specification Group Services and System Aspects; Functional stage 2 description of location services in UMTS (Release 1999)," pp. 1-48, XP002269105, Jul., 2000.
3GPP SA: "Technical Specification Group Services and Systems Aspects: Architecture for an 1 IP Network, 3GPP TR 23.922", 3GPP Standard, Oct. 1, 1999, XP002144276.
3GPP: "TR23 923 V3.0.0: Combined GSM and Mobility Handling in UMTS IP CN", May 2000, pp. 1-75 XP002282368.
"Breaking News," Wireless Week, Apr. 23, 2001.
"Dealflow," Red Herring Communications, Apr. 5, 2001.
Robbins, J., "Debugging Applications", Microsoft Press (2000).
ETSI: "3G TS 23.107 Universal Mobile Telecommunications System (UMTS) QoS Concept and Architecture", ETSI TS 123 107 V.3.3.0, Jun., 2000, pp. 1-36, XP002201573.
"ETSI TS 123 060, V3.3.0, Digital cellular telecommunications system (Phase 2+)(GSM); Universal Mobile Telecommunications System (UMTS); General Packet Radio Service (GPRS); Service description; Stage 2 (3G TS 23.060 version 3.3.0 Release 1999)," pp. 1-186, Apr. 2000.
"Going Mobile: Are Apps to Go the Way to Go?" Application Planet, Feb. 1, 2001.
"Mowgli, Mobile Office Workstations using GSM Links," University of Helsinki Dept. of Computer Science, Helsinki, Finland, Feb. 2000.
"NetMotion Keeps Wireless Connections Going, No Matter What," The Jerusalem Post, Internet Edition, Apr. 2, 2000.
"NetMotion Puts Mobility 3.0 into Open Beta," Midrange Computing, Jul. 11, 2001.
"NetMotion Wireless Makes $8 Million," Deal Watch Daily, Apr. 3, 2001.
Top Wireless Specialists Offer NetMotion Wireless Solution, Wireless Week, Apr. 4, 2001.
"WRQ NetMotion—A Solution for IT Wanderlust," Mobile Insights, Sep. 2, 2000.
"WRQ Spins Off Mobile Business As NetMotion Wireless," Midrange Computing, Apr. 3, 2001.
"WRQ's NetMotion raises $8M," MSNBC.com, Apr. 3, 2001.
Ala-Laurila, J. et al., "Implementation of the wireless ATM access terminal," Computer Networks 31, pp. 959-973 (1999).
Alanko, T., Kojo , M., Liljeberg, M., Raatikainen, K.: "Mowgli: Improvements for Internet Applications Using Slow Wireless Links". Proc. 8th IEEE International Symposium on Personal, Indoor and Mobile Radio Communications, Helsinki, Finland, Sep. 1997.
Alanko, T., et al., "Mobile computing based on GSM: The Mowgli approach," IFIP '96 World Conference—Mobile Communications, Canberra, Australia, Sep. 2-6, 1996.
Alanko T., Kojo, J., Laamanen, H., Liljeberg, M., Moilanen, M., Raatikainen, K: "Measured Performance of Data Transmission Over Cellular Telephone Networks. Computer Communications Review," 24(1994)5. Published also as Technical Report: University of Helsinki, Department of Computer Science, Series of Publications C, No. C-1994-53.
Anderson, T.E., et al., "Serverless Network File Systems," ACM Transactions on Computer Systems, vol. 14, No. 1, pp. 41-79, Feb. 1996.
ANSI/IEEE Std. 802.11, 1999 Edition, Part 11: Wireless LAN Medium Access Control (MAC)and Physical Layer (PHY) Specifications (1999).
Atkinson, "IP Authentication Header," Networking Working Group RFC 1826, Aug. 1995.
Atkinson, "IP Encapsulating Security Payload (ESP)," Networking Working Group RFC 1827, Aug. 1995.
Atkinson, "Security Architecture for the Internet Protocol," Networking Working Group RFC 1825, Aug. 1995.
Tuch, B., "Development of WaveLAN, an ISM band wireless LAN," Lucent Technical Journal, 27-37, Jul./Aug. 1993.
Badrinath, B.R., et al., "Handling Mobile Clients: A Case for Indirect Inteaction," Department of Computer Science, Rutgers University, 7 pages., Oct. 1993.

Baker, F. RFC 1812 "Requirements for IP Version 4 Routers" (IETF Jun. 1995).

Bakre, A.; Badrinath, B.R., "I-TCP: Indirect TCP for Mobile Hosts," Department of Computer Science, Rutgers University, Piscataway,NJ 08855, DCS-TR-314, Oct. 1994.

Bakre, A. et al., "M-RPC: A Remote Procedure Call Service for Mobile Clients," ACM Presents MobiCom '95, Proceedings of The First Annual International Conference on Mobile Computing and Networking, pp. 97-110, Nov. 13-15, 1995.

Benesh, P., "Hospital Cuts Errors With Wireless Data," Investor's Business Daily, Aug. 22, 2001.

Berners-Lee et al., "Hypertext Transfer Protocol-HTTP/1.0"; May 1996; (http://www.cis.ohio-state.edu/htbin/rfc/rfc1945.html).

Bordan, J., Power Point Presentation "Wireless WAN Extensions to NDIS Mobitex NDIS driver," Ericsson Communications Canada Connectivity Lab, Jul. 17, 1996.

Braden, R., RFC 1123, "Requirements for Internet Hosts—Application and Support," Oct. 1989.

Brodsky, I., "PDAs will usher in the next net revolution," Special Focus, Wireless Networks, Network World, Nov. 7, 1994.

Brown, K., et al., "M-TCP: TCP for Mobile Cellular Networks," Department of Computer Science, University of South Carolina, 25 pages, Jul. 29, 1997.

Brown, K., et al., "M-UDP: UDP for Mobile Cellular Networks," Department of Computer Science, University of South Carolina, 19 pages, Sep. 4, 1996.

Perkins, C. and Tangirala, J. "DHCP for Mobile Networking with TCP/IP," Proc. IEEE Int'l Symp. Systems and Comm., Jun. 1995, pp. 255-261.

Caporuscio, M., et al., "Design and Evaluation of a Support Service for Mobile, Wireless Publish/Subscribe Applications," *IEEE Transactions on Software Engineering*, vol. 29, No. 12, pp. 1059-1071, Dec. 2003.

Chan, S. P. and Duryee, T., "Computers: Protection sought against disruption from hackers," Seattle Times, Sep. 30, 2001.

Datability Software Systems Inc., New York, NY "Proposal Presented to Digital Equipment Corporation Large System Group, Marlboro, Massachusetts," Jul. 7, 1983.

Datability Software Systems Inc., New York, NY, Control-PC, Information Management System, System Builder Manual, Draft Version, Apr. 1986.

Datability Software Systems Inc., New York, NY, "Remote Access Facility, User's Guide" (copyright 1985, 1986, 1987, 1988).

Dragan, R. V., "Getting Real With Wireless," PC Magazine, Aug. 1, 2001.

Droms, R., Network Working Group, Request for Comments memo, "Dynamic Host Configuration Protocol," Bucknell University, 39 pages, Oct. 1993.

Dynamic Host Configuration Protocol, RFC 2131 (IETF Mar. 1997), (http://people.nokia.net/charliep/).

Elachi, J., "WRQ Ships NetMotion 2.0," CommWeb, Dec. 12, 2000.

Franklin, C., "Wireless Works: NetMotion makes the difference in wireless networks," Internet Week, May 7, 2001.

Gibbs, M., "Non-stop wireless," Network World Web Applications Newsletter, Jun. 20, 2001.

Glascock, S., "Intel Debuts NetStructure Appliances at N+I," CMPnet, the Technology Network, Sep. 26, 2000.

Glascock, S., "Vendors Get Early Start on Showcasing Wares," TechWeb News, May 9, 2000.

Harkins, et al., "The Internet Key Exchange (IKE)", Networking Working Group RFC 2409, Nov. 1998.

Harris, S., "Standards debate entangles wireless local-area networks," Wireless Web, Jan. 2001.

Housley, et al., "Internet X.509 Public Key Infrastructure Certificate and CRL Profile," Networking Working Group RFC 2459, Jan. 1999.

IBM, Leading the Way for wireless data communication, ARTour, Research Triangle Park, NC 4 pages, Sep. 1995.

Information Sciences Institute,"Transmission Control Protocol-DARPA Internet Program Protocol Specification," Sep. 1981, (http://www.csl.sony.co.jp/cgi-bin/hyperrfc?rfc793.txt).

Piscitello, D. et al., Internet Draft: "Mobile Network Computing Protocol (MNCP)," Sep. 3, 1997.

Cheshire, S. et al., Internet Mobility 4×4, SIGCOMM '96, Computer Science Dept., Stanford Univ., AC< ISBN: 0-201-37928-7, p. 1-12.

IP Mobility Support (RFC 2002, IETF, Oct. 1996).

Jacobson, V. et al., Networking Working Group Request for Comments: 1072, "TCP extensions for long-delay paths," Oct. 1988.

Jacobson, V., et al., Congestion Avoidance and Control, Nov. 1988.

Jacobson, V., Networking Working Group Request for Comments: 1144, "Compressing TCP/IP headers for low-speed serial links," Feb. 1990.

Jaeger, T., et al., "A Role-based Access Control Model for Protection Domain Derivation and Management," RBAC97 Fairfax Va Usa (1997).

Johnson, A. H., "Persistence Pays Off For Wireless Vendor," Computerworld, Jul. 2, 2001.

Johnson, D.B., "Mobility Support in IPv6," Internet Draft, IETF Mobile IP Working Group, XP-002951077, Jul. 2, 2000.

Julien, S., "Bringing Down the Barriers to Wireless Computing," Wireless Design Online: News and Analysis, Jul. 24, 2000.

Julien, S., "Smooth Wireless Glitches," ComNews.com, Oct. 2000.

Katz, D., Network Working Group Internet Draft, "Transmission of IP and ARP over FDDI Networks," Sep. 14, 1992.

Kei, L. M., et al., "An Efficient RPC Scheme in Mobile CORBA Environment," IEEE (2000).

Kiiskinen, J. et al., Data Channel Service for Wireless Telephone Links. University of Helsinki, Department of Computer Science, Series of Publications C, No. C-1996-1. Jan. 1996. Published also in Proceedings of the 2nd International Mobile Computing Conference, Hsinchu, Taiwan, ROC, Mar. 25-27, 1996.

Kleinrock, L., Nomadix, Inc., "On Some Principles of Nomadic Computing and Multi-Access Communications," *IEEE Communications Magazine*, pp. 46-50, Jul. 2000.

Kobielus, J., "Prospects are golden for Wireless Data Services," Special Focus, Wireless Networks, Network World, Nov. 7, 1994.

Kojo M. et al., "An Efficient Transport Service for Slow Wireless Telephone Links." IEEE Journal on Selected Areas in Communications, vol. 15, No. 7, Sep. 1997.

Kojo, M. et al., Enhanced Communication Services for Mobile TCP/IP Networking. University of Helsinki, Department of Computer Science, Series of Publications C, No. C-1995-15, Apr. 1995.

Kojo, M. et al., "Connecting Mobile Workstations to the Internet over a Digital Cellular Telephone Network." University of Helsinki, Department of Computer Science, Series of Publications C, No. C-1994-39. Sep. 1994. Published also in Proceedings of the Mobidata Workshop, Rutgers University, NJ, Nov. 1994.

Laamanen, H, "An Experiment of Dependability and Performance of GSM Access to Fixed Data Network." University of Helsinki, Department of Computer Science, Series of Publications C, No. C-1995-41. Sep. 1995.

Liljeberg, M. et al., "Optimizing World-Wide Web for Weakly Connected Mobile Workstations: An Indirect Approach." In Proc. 2nd International Workshop on Services in Distributed and Networked Environments (SDNE'95) Jun. 5-6, 1995, Whistler, Canada.

Liljeberg, M. et al., "Enhanced Service for World-Wide Web in Mobile WAN Environment." University of Helsinki, Department of Computer Science, Series of Publications C, No. C-1996-28, Apr. 1996. (Revised version published in Proceedings of the IEEE Global Internet 1996 Conference, London, England, Nov. 20-21, 1996).

M3i RadioLink, Overview, Management through instant interactive information, 7 pages, Jun. 1995.

mailing list at (http://www.citi.umich.edu/projects/mobile/mobile-ip-mail), Jun. 1992-Jul. 1995.

Maltz, D. et al., "MSOCKS: An Architecture for Transport Layer Mobility," 1998 IEEE, 0-7803-4386-Jul. 1998.

Mannion, P., "IP mobility to run seamless course," EE Times, Sep. 25, 2001.

Marek, S., "Wireless' Weakest Link," Wireless Week, Oct. 25, 2001.

Martin, J.-C., "Policy-Based Networks," XP-002271561, Sun BluePrints OnLine, Oct. 1999.

Mathias, C. et al., "The ABCs of PCS," Special Focus, Wireless Networks, Network World, Nov. 7, 1994.

Medhi, D., et al., "Network Dimensioning and Performance of Multiservice, Multirate Loss Networks with Dynamic Routing," IEEE/ACM Transactions on Networking, vol. 5, No. 6, pp. 944-957, Dec. 1997.

Microsoft Support Online Knowledge Base Search Results, "DHCP (Dynamic Host Configuration Protocol) Basics," Article ID: Q120829, Revision Date Sep. 24, 1996.

Mink, S. et al., "Towards Secure Mobility Support for IP Networks," IEEE Publication, vol. 1, pp. 555-562, SP101526810, Aug. 21, 2000.

Molta, D., "Mobile & Wireless Technology (NetMotion Mobility Keeps Wireless Apps Grounded)," Network Computing, Oct. 1, 2001.

Molta, D., "WLAN Security on the Rise," Network Computing, Feb. 4, 2002.

Montenegro, G., Sun Microsystems, Inc., Internet Draft, "Reverse Tunneling for Mobile IP," Jan. 12, 1997.

Nasarre, C., "Debug Detect and Plug GDI Leaks in Your Code withTwo Powerful Tools for Windows XP," MSDN Magazine, Jan. 2003.

Nelson, M. G., "WRQ Plans Wireless Spin-off," Information Week Via Comm Web, Apr. 4, 2001.

Ohlhorst, F., "Seamless Wireless Connectivity," Computer Reseller News (CRN), Aug. 9, 2001.

Ohta, "Conventional IP over ATM," Internet Draft Mar. 1995.

Ohta, M. et al., Internet Draft draft-ohta-ip-over-atm-02.txt, Conventional IP over ATM, Mar. 1995.

PCCA STD-201 Extensions to NDIS for Wireless WANs, Official Standard, Appendices A-F, Mar. 18, 1997.

PCCA STD 201, Extensions to NDIS for Wireless WANs, Revision 1.1, Oct. 29, 1996.

PCCA STD-201 "Extensions to NDIS for Wireless WANs" Version 1.1, Jul. 7, 2000.

PCCA STD-201 "Extensions to NDIS for Wireless WANs" Revision 1.1, May 9, 1997.

PCCA-XSTD-201, Extensions to NDIS 3 for Wireless WANs, Draft Version 0.09, Aug. 31, 1995.

PCCA-XSTD-201, Extensions to NDIS 3 for Wireless WANs, Version 1.1, Jan. 3, 1996.

PCCA-XSTD-201, Extensions to NDIS 3 for Wireless WANs, Version 1.2, Jan. 17, 1996.

PCCA-XSTD-201, Extensions to NDIS 3 for Wireless WANs, Version 1.0, Oct. 25, 1995.

PCCA-XSTD-201, Wireless Extensions to NDIS 3 Proposal, Draft Version 0.08, Jul. 5, 1995.

PCCA-XWPDS, Draft Proposed PCCA Standard, "PCCA Extensions for the PC/TCP Packet Driver Specification," Revision 1.03a, Dec. 11, 1994.

Peretz, M., "Pear Shaped WLAN Products Unveiled," 802.11-Planet. com, Nov. 12, 2001.

Perkins et al, DHCP for IPv6, The Third IEEE Symposium on Computers and Communications (ISCC'98) Athens, Greece, Jun. 30-Jul. 2, 1998.

Perkins et al., DHCP for Mobile Networking with TCP/IP (ISCC 1995), (http://people.nokia.net/charliep/).

Perkins et al., "Using DHCP with Computers that Move," Wireless Networking, 1993, (http://people.nokia.net/charliep/).

Perkins, "IP Mobility Support for the IPv4," RFC 3220, Jan. 2002.

Perkins, C., "Mobile Networking Through Mobile IP," Copyright 1997 Institute of Electrical and Electronics Engineers, Inc., 15 pages.

Perkins, Internet Draft: "IP Encapsulation Within IP," IETF, May 31, 1996.

Perkins, Internet Draft: "IP Mobility Support," IETF, May 31, 1996.

Phifer, L., "Improving WLAN Security," 802.11-Planet.com, Nov. 26, 2001.

Pietrik, M., "Learn System-Level Win32 Coding Techniques by Writing an API Spy Program", MSJ, Dec. 1994.

Piscitello, D., Internet Draft, "Mobile Network Computing Protocol (MNCP)," 55 pages, Aug. 28, 1997.

Piscitello, D. et al., "Mobile Network Computer Protocol (MNCP)" Sep. 3, 1997.

Piscitello, D. et al., Internet Draft: "Mobile Network Computing Protocol (MNCP)," Aug. 28, 1997.

Poropudas, Timo, "Mainframe emulator skills come in handy for wireless roaming," WOW! Wireless, Dec. 8, 2000.

Power Point Presentation "Advantages of WRQ's TCP" (WRQ 1994).

Press Release, "Bethlehem, Penn.—(Business Wire) via Individual Inc.—DDesigned for businesses with mobile workers, PADCOM, Inc. today introduced SmartPath . . . ," Sep. 22, 1997.

Press release, "WRQ Licenses AtGuard to Symantec and ASCII Network Technology" (Copyright 1999).

Product Information, PadCom, Inc, PadCom Connectivity Suite, "Connectivity Suite Technical Overview"(2001,2002).

Published Internet Standards: Request for Comment No. 1122, "Requirements for Internet Hosts-Communications Layers," IETF, Oct. 1989.

Droms, R. "Dynamic Host Configuration Protocol," IETF RFC 2131, Mar. 1997.

Rash, W., "All Networks are Insecure," ZDNet, Jan. 18, 2002.

Rash, W., "Wireless Networks Are Great, But Don't Forget The Security," Internet Week, Jan. 22, 2001.

Rash, W., "Wireless Security Gets a Jumpstart," ZDNet (www.zdnet. com/enterprise), Oct. 25, 2001.

Request for Comment (RFC) 1674 "A Cellular Industry View of IPng," IETF, Aug. 1994.

Richter, J., "Programming Applications for Microsoft Windows", Fourth Edition, Chapter 22, Microsoft Press (1999).

Rist, O., "A Wonderful Wireless World at Fall N×I," Planet IT (NetMotion Wireless), Oct. 18, 2000.

Rist, O., "Where's the Killer App?" SD Times, Nov. 1, 2001.

Rist, O, and Chee, B. "Look, Ma . . . No Wires," Internet Week Online, Mar. 14, 2000.

Robbins, J., "Bugslayer", MSJ, Feb. 1998, http://www.microsoft.com/msj/0298/bugslayer0298.htm (Feb. 1998).

Robbins, J., "Bugslayer", MSJ, Jun. 1999, (http://www.microsoft.com/msj/0699/BugSlayer/Bugslayer0699.htm) (Jun. 1999).

Rysavy, P., "Break Free With Wireless LANs," Network Computing, Oct. 29, 2001.

Alexander, S. And Droms, R.. "DHCP Options and BOOTP Vendor Extensions," IETF RFC 2132, Mar. 1997.

Savarese, J., "Wireless: Security Standards Improve," (ComNews. com,) Jan. 7, 2002.

Savarese, J., "Security standards improve," reprinted from Communications News, Jan. 2002.

Schroeder, M., "Adaptation And Evolution," Communications Convergence, Jul. 5, 2001.

Schuurmans, J., "NetMotion Wireless spun off as version 2 available," WOW! Wireless, Mar. 6, 2001.

Sharer, R.J., "Applying Policy Management to Reduce Support Costs for Remote and Mobile Computing," International Journal of Network Management, 8, 211-218 (1998).

Solomon, Internet Draft, "Mobile IP Working Group," May 24, 1996.

Technical Report, 3G TR 23.923 V.3.0.0, XP-002282368, 3rd Generation Partnership Project; Technical Specification Group Services and System Aspects; Combined GSM and Mobile IP Mobility Handling in UMTS IP CN, May, 2000.

Technical Report, 3GPP TR 23.922 V1.0.0 (Oct. 1999) XP-002144276, , 3rd Generation Partnership Project, Technical Specification Group Services and Systems Aspects; Architecture for an All IP network.

Technical Specification, ETSI TS 123 107 V3.3.0 (Jun. 2000), XP-002201573, Universal Mobile Telecommunication System (UMTS); QoS Concept and Architecture (Release 1999).

Teknique, Data Sheet, TX1000 High Performance Communication Processor, Schaumburg, IL, 2 pages (1994).

Teknique, Data Sheet, TX5000 High Performance Communication Processor, Schaumburg, IL, 2 pages (1994).

The UC Berkeley BARWAN Research Project CDROM, with Index, (http://daedalus.cs.berkeley.edu/).

Valko, A., et al., XP-002133539, Internet Draft, "Cellular IP," Nov. 18, 1998.

Veldkamp, T., "Roaming over routers nu ook met Pocket PC's," [Dutch] VNUnet.nl, Dec. 21, 2000.

Web site information, WRQ AtGuard, www.atguard.com (Copyright 1999).

Weber, C., "Using IPSec in Windows 2000 and XP, Part One," (http://www.securityfocus.com/infocus/1519), Dec. 5, 2001.

Westerinen, A., et al., Networking Group Request for Comments 3198, "Terminology for Policy-Based Management," 13 pages, Nov. 2001.

Wexler, J., "Big-picture approaches to security," Network World Fusion, Jan. 2, 2002.

Wexler, J., "Mobile IP gotcha," Network World Wireless in the Enterprise Newsletter, Dec. 4, 2000.

Wexler, J., "Pick a network, any network," Network World Wireless Newsletter, Sep. 17, 2001.

White Paper, "TCP/IP: The Best Protocol for Remote Computing," (www.rysavy.com/Articles/remote.htm) (1996).

Wright, M., XP-002116275, "Using Policies for Effective Network Management," International Journal of Network Management, 9, 118-125 (1999).

WRQ Reflection Network Series TCP Connection Version 4 (1994).

WRQ White Paper, "How WRQ's TCP/IP Reduces Costs and Improves Reliability in Remote and Mobile Computing," 5 pages, Nov. 14, 1996.

WRQ White Paper, "Reducing the Cost of PC Connectivity," 7 pages, Nov. 25, 1996.

WRQ White Paper, "TCP Kernel Architecture-The Silent TCP/IP Issue," 4 pages, Nov. 14, 1996.

WRQ White Paper, "TCP/IP: The Best Protocol for Remote Computing," 8 pages, Nov. 14, 1996.

(www.ka9q.net/code/ka9qnos/) (Mar. 15, 2002 update).

Zenel, B., Thesis Proposal, "A Proxy Based Filtering Mechanism for The Mobile Environment," Dept. of Computer Science, Columbia University, New York, NY, Feb. 1998.

Zetie, C., "WRQ NetMotion Provides a Simple Solution to Mobility," Giga Information Group, Sep. 6, 2000.

Wong, D., "Soft Handoffs in CDMA Mobile Systems," IEEE Personal Communications, Dec. 1997.

Netmotion Wireless: "Extending Mobile Solutions Without Middleware." White Paper Online!. XP002324100, Aug. 6, 2001.

INTERNETWEEK.com, "Wireless Works, Netmotion makes the difference in wireless networks." Internetweek, Online!, XP002, May 7, 2001.

Yongguang Zhang et al: "A 'Persistent connection' Model for Mobile and Distributed Systems." Computer Communications and Networks, 1995, Proceedings, Fourth International Conference, Las Vegas, NV., USA Sep. 20-23, 1995, IEEE COMPUT.SOC.US. XP010200337, Sep. 20, 1995.

Logue, et al., "The Unofficial @Guard FAQ," Jul. 30, 1998.

Pahlavan, K., et al., "Wideband Local Access: Wireless LAN and Wireless ATM", IEEE Comm. Magazine, Nov. 1997, p. 3-38.

Hansen, J. et al., "Semi-Connected TCP/IP in a Mobile Computing Environment," Master's Thesis in Computer Science, Department of Computer Science, University of Copenhagen (DIKU), DIKU Project No. 95-6-11, Jun. 10, 1996, p. 1-339.

M. Alzona et al., "Project Octopus, A Framework for Ubiquitous Mobile Computing," Technical Report 1994—96, Carnegie Mellon University Information Network Institute, Sep. 18, 1994.

B. Bruegge et al., "Applications of Mobile Computing and Communications," IEEE Personal Communications Magazine, vol. 3, No. 1, pp. 64-71, Feb. 1996.

M. Stemm, "Vertical Handoffs in Wireless Overlay Networks," Technical Report CSD-96-903, University of California, Berkeley, May 1996.

* cited by examiner

APPARATUS AND METHOD FOR INTELLIGENT ROUTING OF DATA BETWEEN A REMOTE DEVICE AND A HOST SYSTEM

CROSS-REFERENCE TO RELATED APPLICATIONS

The present application is a Continuation of application Ser. No. 11/170,077, filed Jun. 30, 2005, which is a Continuation of application Ser. No. 10/898,283, filed Jul. 26, 2004, which is a Continuation of application Ser. No. 10/164,581, filed Jun. 10, 2002, (now U.S. Pat. No. 6,826,405), which is a Continuation of application Ser. No. 08/932,532, filed Sep. 17, 1997 (now U.S. Pat. No. 6,418,324), the contents of which are expressly incorporated by reference herein in their entireties.

BACKGROUND OF THE INVENTION

1. Field of Invention

The present invention relates to the transportation of data through dissimilar communications media. More particularly, the present invention relates to an apparatus and method for transporting data between a remote mobile or fixed terminal device and a host system over multiple, dissimilar communications media. The communications media over which the data is transported include wireless data links wired data links or a combination of wireless and wired data links which are selected based upon a set of preference metrics.

2. Background Information

The ability to transport data between mobile and/or fixed terminal devices and host computer systems have been generally available for many years. Networks designed to transport this data currently exist in a wide variety of wireless and wired network architectures. Both apparatus and method exists for transporting data through multiple, similar media types as well as the automatic selection of alternate communication paths based upon a plurality of preference metrics.

Often, when multiple networks are available from a common location such as a vehicle, great benefit may be derived by allowing uniform communications through all available networks. Certain networks may perform better for bulk data transfers where another may perform interactive messaging in an optimal fashion. One network may be preferable because of its low cost but an alternate, more expensive network may be acceptable as a backup if the low-cost network is unavailable.

Other examples include U.S. Pat. No. 5,412,375, to WOOD, which discloses a system for selecting one of a plurality of interfaces to a single wireless communications system in accordance with the capabilities of a subscriber unit and the capabilities of a base unit. A list of air interface capabilities of the subscriber unit and the base unit are compared by a controller to determine a compatible interface. As disclosed in WOOD, the plurality of air interfaces include Analog Mobile Phone System (AMPS), Time Division Multiple Access (TDMA) and Code Division Multiple Access (CDMA). While the WOOD system does select from one of a plurality of interfaces which may be applicable for data communication, the routing decision is based on the capabilities of the endpoints rather than the preference metrics of the transporting networks. The endpoint devices, in this case, must be aware of the peculiarities of the wireless environment.

U.S. Pat. No. 5,420,574, to ERICKSON et al., discloses a subscriber unit attached to a trunked mobile radio having a data input. The mobile radio communicates both voice and data message formats over a wireless network to a base station via channels that are allocated by a trunked data controller which is connected to a host network. Channel states and communication parameters are set in accordance with the type of information (e.g., voice or data) that is being transmitted or received. While the ERICKSON et al. system dynamically switches between incompatible message formats without the intervention of the endpoint devices, only a single data path is provided. In addition, the incompatibility of the two alternate paths arises from a difference in message formats rather than the use of independent, incompatible networks.

Further, the transportation of data through alternate, incompatible communications media is a problem that does not have a uniform solution in the art. This problem is exacerbated in wireless communication networks where protocols, timing and other incompatibilities render an otherwise acceptable level of service inadequate. Attempts to provide data links through incompatible networks have suffered from the same obstacles that hindered data communications prior to open standards becoming widely accepted, i.e., proprietary protocols visible to the endpoint terminal devices make the devices inflexible and expensive and the interoperation of similar devices with incompatible networking components is difficult and complex.

Networks may be interconnected by routers which operate at the network level and convey messages between compatible networks. Routers make logical decisions about the pathway through which data is to be directed in the networks based upon a variety of preference metrics. A router is generally implemented as an autonomous device with multiple connections to the networks through which data is to be routed. Routers operate at the network layer and can recognize and manage protocols and multiple connections to networks. Routers usually operate in accordance with the address provided by the particular protocol of the network, and normally provide routing between and through networks utilizing the same network protocol and can route between networks that use different data-link layers, such as Ethernet, Token-Ring, Serial PPP, etc. Another type of router includes two routers loosely-coupled through a protocol-neutral datalink, where the linked routers are considered as a single "virtual" router.

Dissimilar networks may be connected by gateways which are devices that interconnect two or more dissimilar networks. A gateway differs from a router in that the endpoint terminal devices may implement a dissimilar or incompatible protocols. Gateways often perform specific protocol conversions at the layers above the network layer to move data from one type of network to another. In this regard, the Open Systems Interconnection (OSI) model includes seven "layers" to provide communications between heterogeneous (i.e., incompatible) systems. The layers, from lowest to highest, are: the physical layer, the data link layer, the network layer, the transport layer, the session layer, the presentation layer, and the application layer. Each of the layers performs a specific task in transporting data between two or more entities. Such a layered structure is shown in *The TCP/IP Companion*, by Martin R. Arick, Wiley-QED, pp. 18-19.

U.S. patent application Ser. No. 08/456,860, to DOVIAK et al., for example, discloses a system in which a distant mobile or fixed terminal device transports data through a plurality of wireless network to an endpoint which may or may not implement the same network protocol as the distant device. However, while the DOVIAK et al. system is capable transmitting data over a plurality of dissimilar wireless communications networks, the system does not automatically transmit data through differing ones of a plurality of dissimilar networks in accordance with preference metrics to reach the data-link endpoints. Thus, the system does not automatically provide redundant or alternate pathways through which data may be delivered.

U.S. Pat. No. 5,537,220 to EZUMI et al., discloses a portable facsimile apparatus provided with a capability to communicate over a plurality of communications lines. As disclosed in EZUMI et al., the facsimile machine may communicate over telephone lines or a mobile communication unit. A NCU (controller) is provided within the facsimile machine to discriminate whether the facsimile machine is connected to the telephone line or to the mobile communication unit. The NCU functions to adjust the data rate, and transmitting and receiving signal levels based on which communication system it is communicating. Although this concept may be extended to a generic protocol-neutral data networking environment, the EZUMI et al. system provides for the selection of only one single path to the exclusion of other, possible viable path based solely on which link is plugged into the NCU. Further, the EZUMI et al. system does not switch communication paths within the boundaries of a communication session thereby further limiting its usefulness in a connectionless, packet data environment such as a TCP/IP network.

U.S. Pat. No. 5,602,843, to GRAY, discloses a PBX-based integrated telecommunications system having a wired subsystem connected to wired terminals, and a wireless system for connecting to mobile terminals. A controller is provided which manages base stations and communicates to wireless handsets. When communicating to a handset, the controller determines which base station is in communication with the handset and directs the base station to send packet-based information to that handset. A separate PBX controller is provided to communicate with the wired terminals. The PBX controller includes a proximity sensor to detect wireless handsets such that when a handset is detected in proximity to a wired terminal, messages are forwarded to the wired terminal rather than the wireless handset. While the GRAY system dynamically selects the route to a terminal device based upon a preference metric (wireless proximity), the alternate routing technique does not address transporting data between the same two endpoints. In addition, GRAY provides no means to provide alternate path routing for a terminal device through either the wireless or wired handsets.

U.S. Pat. No. 5,452,471, to LEOPOLD et al., discloses a communication system having a primary and one or more subordinate communication systems. In the illustrated embodiment, the primary communication system is a satellite-base communication system having the widest area of coverage. Each of the satellites within the system defines a cell area which moves as the orbiting satellites move. The secondary and tertiary communications systems are disclosed as terrestrial based, stationary systems having base stations flied near the surface of the earth (e.g., fixed to a building), where each subordinate system has an increasingly smaller region of coverage. The secondary and tertiary systems include a controller located at a monitoring location within each region. Each of the communications systems includes a link to a central office to enable communications over the public switched telephone network. The LEOPOLD et al. communication systems and mobile subscriber units operate within one frequency spectrum, however, the primary and secondary communication systems operate together by using orthogonal channels to prevent interference. In addition, when communicating with secondary systems, the mobile subscriber unit transmits at a relatively low power such that the primary system will not receive the transmission. The mobile subscriber unit is programmed to utilize the communication system having the smallest area of coverage such that if the subscriber unit has three communications systems available, the subscriber unit will utilize the tertiary communications system (i.e., the system having the smallest area of coverage) based on a designed assumption that the more subordinate the communication system is, the higher the capacity of the system. While the system of LEOPOLD et al. dynamically selects a route based upon a set of preference metrics such that the terminal endpoints are unaware of the routing selection, a common data-link protocol is required throughout all possible associated networks. In addition, the wireless frequencies employed must be derived from a continuous, compatible set of frequencies which prevents the device from selecting among inherently incompatible networks.

Despite the teachings of these prior attempts, users of mobile or fixed wireless data communications are provided with systems of limited capacity and flexibility when routing data through more than one network. In addition, such systems require special hardware and/or software developed for and compatible with the networks, which may require additional training of support personnel and end-users. Further, users of wireless mobile data communication services are provided with only a limited ability to control costs associated with sending and receiving data to and from remote devices, and are limited in their hardware and software design implementations. In previous teachings, the candidate networks must be compatible with one another at either the network or the data-link level. Thus, routing data through inherently incompatible networks such as Cellular Digital Packet Data (CDPD) and Ericsson EDACS is not possible as these are incompatible at both the data-link and network levels. Moreover, known systems do not allow a customer to use existing RF wireless infrastructures, including existing hardware and software, with only minor modifications needed to transport data from a mobile device to a host computer network. In addition, past attempts do not permit wireless data communications in a manner that is transparent to the remote device. Further, prior systems do not provide the flexibility to users such that a plurality of different remote devices may communicate with the wired host network irrespective of the radio infrastructure and transmission protocol employed. Such features, without the above-noted drawbacks, would be highly desirable to provide flexibility and ease of use, and to give users of portable data devices greater control over their hardware and software design.

SUMMARY OF THE INVENTION

In view of the foregoing, the present invention, through one or more of its various aspects, embodiments and/or specific features or sub-components thereof, is thus presented to bring about one or more objects and advantages, such as those specifically noted below.

A general object of the present invention is to provide an apparatus and method for transporting data from a remote, wireless device to a wired network. Another object of the invention is to provide a remote device with an interface to present data to the wired network through RF wireless communication.

More particularly, an object of the present invention is to provide an apparatus that resides between an existing wired communications network and an existing radio-frequency network to provide a wireless RF connection between a remote device and the wired network.

Another object of the present invention is to provide an apparatus and method for a completely transparent data path between a remotely located device and an existing wired network using a wireless RF communications link without either the remote device, or the wired network being aware that a wireless RF communications link is being employed.

Still another object of the present invention is to provide an apparatus and method for a completely transparent data path between a remotely located device and an existing wired network through a plurality of different wireless RF communications link protocols and a plurality of different wired networks protocols selected by the user.

Still another object of the present invention is to provide an apparatus which functions as a protocol-appropriate communications controller and makes remote devices indistinguishable from locally attached devices to a wired network.

According to one aspect of the present invention, an apparatus for transporting data between a remote device and a host communication network using a wireless communications link is provided. The apparatus comprises a mobile data controller connected to the remote device and the wireless communications link. The mobile data controller comprises a remote data conversion means for converting data to be transported between the remote device and the host communication network. The remote data conversion means converts the transported data between a remote device transmission format utilized by the remote device and a wireless link transmission format utilized by the wireless communications link.

The apparatus also comprises a network interface means for interfacing the host communication network with the wireless communications link. The network interface means comprises a wireless link conversion means for converting the transported data between the wireless link transmission format and a network interface format utilized by the network interface means; and a host network conversion means for converting the transported data between the network interface format and a host network format utilized by the host communication network.

The apparatus further comprises a means for transporting the transported data over the wireless communication in accordance with the wireless link transmission format, the wireless link transmission format and the host network format being incompatible. According to another aspect of the present invention, the network interface means comprises a remote network controller that logically resides on the host communication network and performs the functions of a network communication controller.

According to another aspect of the present invention, the apparatus for transporting data further comprises a plurality of network interface means connected by a local network and a synchronization means for synchronizing the transfer of information between the network interface means, the information comprising routing tables and health and status information.

According to the present invention a method of transporting data from a mobile device to a host network is provided. The remote device and a wireless communications link are connected by a mobile data controller, and the host communication network and the wireless communications link being interfaced by network interface device.

The method includes the steps of: converting, at the mobile data controller, data to be transported between the remote device and the host communication network, the converting step converting the transported data between a remote device transmission format utilized by the remote device and a wireless link transmission format utilized by the wireless communications link; transporting the transported data over the wireless communications link in accordance with the wireless link transmission format; receiving, at the network interface device, the transport data from the wireless communications link; converting, at the network interface device, the transported data between the wireless link transmission format and a network interface format utilized by the network interface device, the wireless link transmission format and the host network format being incompatible; further converting, at the network interface device, the transported data between the network interface format and a host network format utilized by the host communication network; and forwarding the transported data to the host communication network in accordance with the host network format.

In a preferred embodiment, the transportation step further comprises determining wireless communications link selection criteria; dynamically selecting a wireless communications link from a plurality of incompatible wireless communications links in accordance with the selection criteria; and switching to the selected wireless communications link. Afterwards, the following steps are continuously repeated: dynamically selecting a next wireless communications link from the plurality of incompatible networks in accordance with the selection criteria; determining whether to switch wireless communications links; and switching to the next wireless communications link in response to a result of the determination.

According to another aspect of the present invention, an apparatus for transporting data over a plurality of incompatible networks between a first device and a second device is provided. The apparatus comprises a system for determining network selection criteria. In addition, the apparatus comprises a selection system for dynamically selecting a network from the plurality of incompatible networks in accordance with the network selection criteria and a switching system for switching to the selected network to use for data transport.

According to another aspect of the present invention, the apparatus transports data via a plurality of protocols over a plurality of incompatible networks in which the transportation of data is transparent to the first and second devices and to an end user. The protocols may include but are not limited to Internet Protocol (IP) and transparent protocol.

According to another aspect of the present invention, the apparatus for transporting data further comprises a system interfacing protocolized data into a plurality of incompatible networks using different protocols.

According to another aspect of the present invention, the switching system switches networks during the time between the transport of consecutive data packets.

According to another aspect of the present invention, the system for determining network selection criteria uses two classes of parameters to determine the next network to use for transport of data.

According to another aspect of the present invention, the selection system further determines a next network to switch to from the plurality of incompatible networks in accordance with the network selection criteria, when the selected network becomes unavailable. In addition, a monitoring system is provided which monitors the availability of the incompatible networks to determine whether the next network is available for data transport.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE ILLUSTRATED EMBODIMENTS

Figure 1:
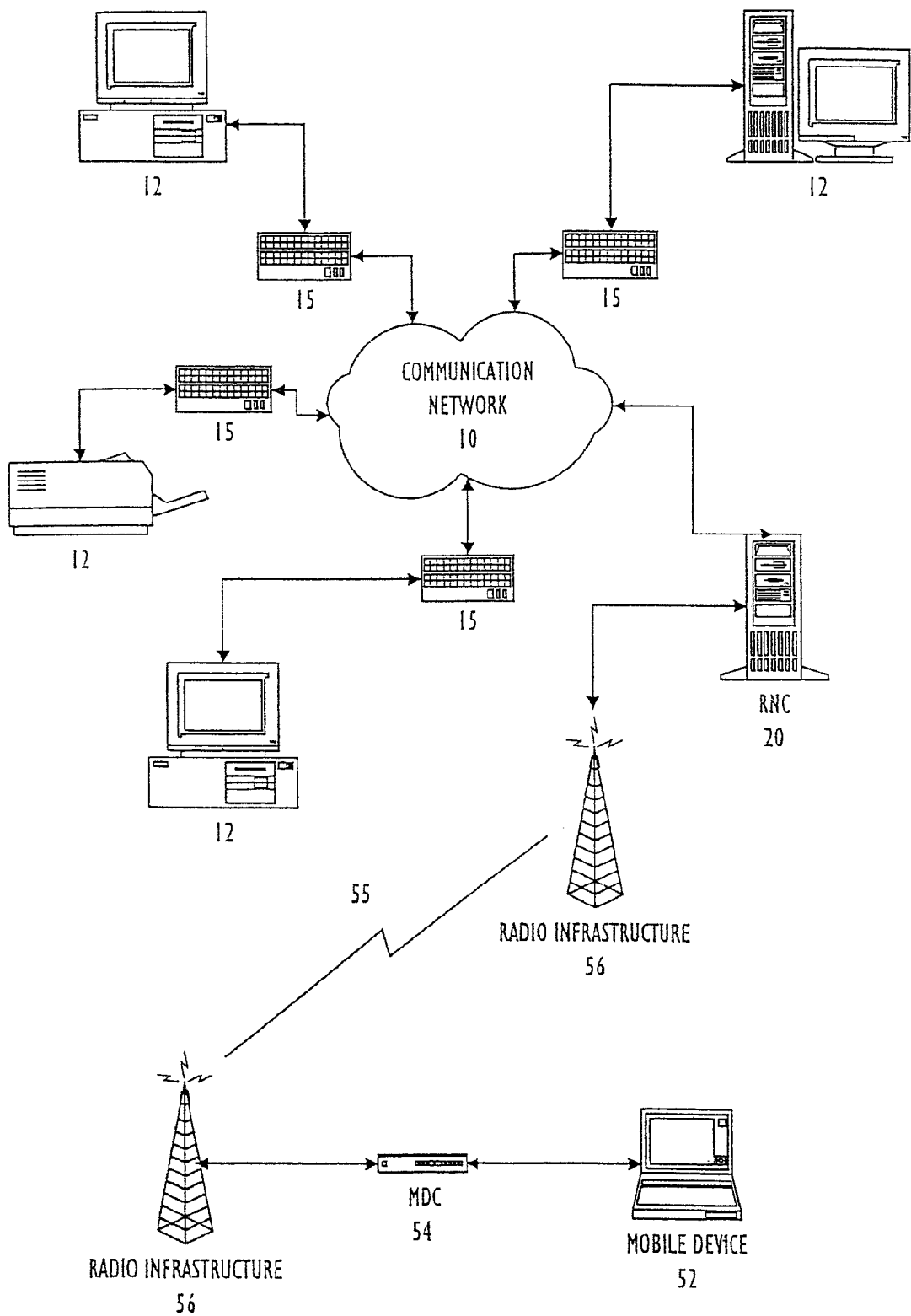
FIG. 1 illustrates a general overview of a remote network controller and mobile data controller in accordance with an aspect of the present invention.

Referring now to the accompanying drawings, FIG. 1 illustrates a general overview of a remote network controller and a mobile data controller in accordance with an aspect of the present invention. In FIG. 1, a wired communication network 10 is shown as a host network system having communications controllers 15 and locally-attached devices 12. The wired communication network 10 may be, for example, a Token Ring network or an Ethernet Local Area Network (LAN). The locally-attached devices 12 may include a personal computer, a workstation, a printer or network server, and reside at a plurality of dispersed locations. According to the present invention, a remote network controller 20 may also be provided which logically resides on the wired communication network 10 and acts as a protocol-appropriate communications controller to send and receive data to and from the communications network 10 and one or more remote or mobile devices 52. For purposes of illustration, only one of the remote devices 52 is shown in FIG. 1.

Remote devices 52 communicate via a mobile data controller 54 and a wireless radio-frequency (RF) communications link 55 created by the user's radio infrastructure 56 to the remote network controller 20. The mobile data controller 54 may convert asynchronous data from the remote device 52 into an appropriate protocol format of the radio infrastructure 56. In accordance with an aspect of the present invention, the remote devices 52, although not physically connected to the wired communication network 10, are logically connected to the wired communication network 10 through the radio infrastructure 56 and the remote network controller 20 and are indistinguishable from locally-attached devices 12. The remote devices 52 may be, for example, a laptop computer, personal digital assistant (PDA), a credit card reader, or a global positioning system (GPS) receiver. The radio infrastructure 56 may comprise a conventional point to point or trunking radio system.

The logical connection created by the remote network controller 20 between the remote device 52 and the wired communication network 10 is "transparent" to the user of the remote device 52, and to the wired communication network 10. In accordance with an aspect of the invention, the remote network controller 20 takes data transported by the radio infrastructure 56, irrespective of the format protocol of the radio infrastructure, and converts the data into a format protocol recognized by the wired network 10. Similarly, the remote network controller 20 of the present invention takes data from the wired network 10 and converts the data into a format protocol recognized by the radio infrastructure 56. Accordingly, the user of the remote device 52 does not have to perform any additional steps to send and receive data to and from the wired communication network 10, and the wired communication network 10 does not have to perform any additional steps to send and receive data to and from the remote device 52. The user of the remote device 52 interacts with the wired communication network 10 in a similar manner as a user of the locally-attached devices 12. Similarly, the wired communication network 10 interacts with the remote device 52 in a similar manner as the wired communication network interacts with the locally-attached devices 12.

Figure 2:
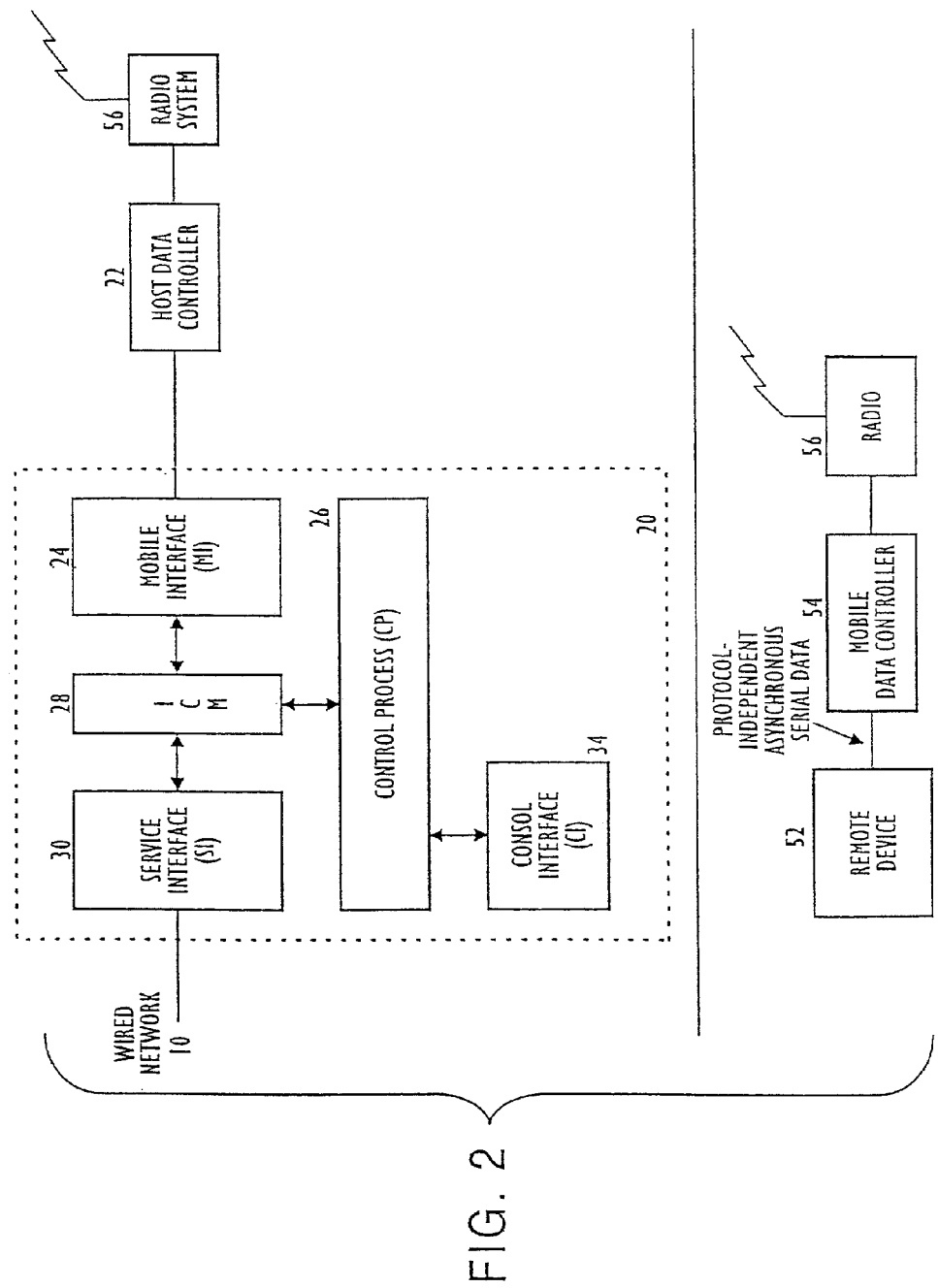
FIG. 2 illustrates a block diagram of the basic components of the remote network controller and mobile data controller of the present invention.

Referring now to FIG. 2, there is illustrated a block diagram of the basic components of the remote network controller 20 of the present invention. Each component of the remote network controller 20 will be generally described for introductory purposes and will later be described in greater detail below with reference to the accompanying drawings. The various components of the host data controller 22 and the mobile data controller 54 will also be discussed hereinafter with reference to FIGS. 13 and 25, respectively.

As shown in FIG. 2, the remote network controller 20 may comprise a service interface 30, a mobile interface 24, an interprocess communication manager 28, a control process module 26, and a console interface 34. The remote network controller 20 may be implemented through a collection of software program modules and hardware components working cooperatively. The remote network controller 20 itself may run on a standard platform, such as a personal computer (PC) equipped with a commercially available processor or multi-processor, e.g., an Intel or Motorola based processor or multi-processor, and a commercially available operating system, such as an MS-DOS or UNIX based operating system. The remote network controller 20 may also contain an Ethernet controller or suitable network controller card depending on the wired communication network 10. In addition, the remote network controller 20 may include random access memory and physical storage media including hard disk and tape storage devices.

The wired communications network 10 is connected to the remote network controller 20 by the service interface 30. The service interface 30 handles all network connections. If several wired communications networks 10 are present, one or more service interfaces 30 may be provided to handle wired network connectivity. The service interface 30 connects to an interprocess communication manager 26. The interprocess communication manager 28 manages all inter-process message routing within the remote network controller 20. One or more mobile interfaces 24 may also be provided to handle connectivity with the radio infrastructure(s) 56. Each mobile interface 24 is also connected to the interprocess communication manager 28. The control process module 26 of the remote network controller 20 is provided to process management functions and data integrity. The control process module 26 is connected to the interprocess communication manager 28 and the console interface 34. The console interface 34 allows for user configuration and reporting of data.

As further illustrated in FIG. 2, the remote network controller 20 may be connected to a host data controller 22. One or more host data controllers 22 may be provided for connecting the remote network controller 20 to specific radio infrastructures 56, e.g., a Motorola trunked radio. The host data controller 22 may be connected to the mobile interface 24 of the remote network controller 20.

In the field, the remote device 52 is connected to the mobile data controller 54 which, in turn, is connected to the radio infrastructure 56 for transmitting and receiving data. The mobile data controller 54 is responsible for connecting the remote device 52 to the radio infrastructure 56 and to provide protocol-independent asynchronous serial data transfer to and from the remote device 52.

In order to provide transparent data transportation, whereby the network protocols and the protocols of the radio infrastructure 56 are transparent or invisible to the user, inbound asynchronous data from the remote device 52 is collected and transported to the wired communication network 10 in packets over the radio infrastructure 56. The data is sent using the existing protocols of the radio infrastructure 56. The remote network controller 20 accepts the data and encapsulates it into the appropriate protocol used by the wired communication network 10. The data is passed to the wired communication network 10 in a similar fashion for passing data from any of the other locally-attached devices 12. Similarly, outbound data to the remote device 52 from the wired communication network 10 is removed from the network protocol by the remote network controller 20. The remote network controller 20 then encapsulates the data into the appropriate protocol associated with the radio infrastructure 56 and sends the data over the radio infrastructure 56 to the mobile data controller 54. Upon receipt of the data, the mobile data controller 54 removes the data from the radio infrastructure protocol and asynchronously sends the data to the remote device 52.

In accordance with the present invention, multiple wired networks 10 with different protocols may be linked to multiple RF environments in any combination by incorporating the remote network controller and mobile data controller of the present invention.

Figure 3:
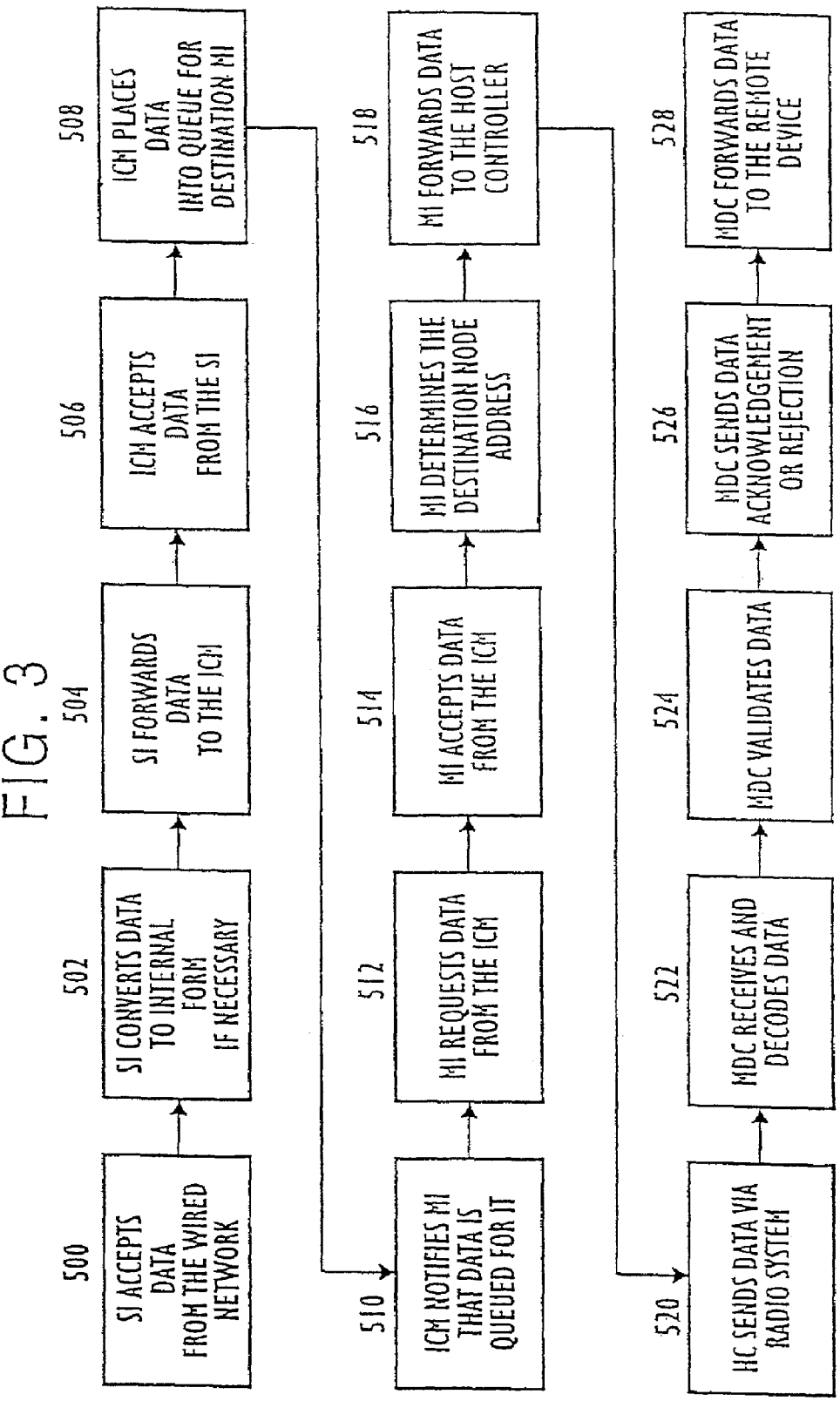
FIG. 3 is a high-level flow chart, according to the present invention, of the outbound data from a wired communication network to a remote device.

FIG. 3 is a high-level flow chart for transporting outbound data from the wired communication network 10 to the remote device 52. As shown in FIG. 3, when data is to be sent to the remote device 52, the service interface 30 of the remote network controller 20 accepts data from the wired communication network 10 at step 500. The service interface 30 then converts the data from the protocol used by the wired communication network 10 and encapsulates it into an internal protocol used by the remote network controller 20 at step 502. In addition, the service interface 30 may receive routing information from the wired communication network 10 as to what remote device 52 the data is to be passed, e.g., a network address or device identifier of the remote device 52.

At step 504, the service interface 30 forwards the data to the interprocess communication manager 28. The interprocess communication manager 28 accepts the data at step 506 and, at step 508, places the data in a queue for the appropriate destination mobile interface 24. The destination mobile interface 24 may depend on the radio infrastructure 56 employed by the user. The outbound data that is to be passed from the interprocess communications manager 28 to the mobile interface 24 may be encapsulated in an internal protocol of the remote network controller 20, along with routing information to specify the remote device 52 to which the data is to be sent. At step 510, the interprocess communication manager 28 notifies the mobile interface 24 that the data to be sent to the remote device 52 is queued for the mobile interface. The particular mobile interface 24 that the data is queued for depends on the particular radio infrastructure 56 employed to communicate with the destination remote device 52. At step 512, the mobile interface 24 requests that the queued data be sent from the interprocess communication manager 28. The mobile interface 24 may request data when it is free to send the data to a destination remote device 52 and not handling another process. At step 514, the mobile interface 24 accepts the queued data from the interprocess communication manager 28. Thereafter, at step 516, the mobile interface 24 determines, based on the queued data, the destination node address of the remote device 52 to which the data is to be sent. At step 518, the mobile interface 24 forwards the data to the appropriate host data controller 22 so that it may be sent over the radio infrastructure 56 at step 520. According to an aspect of the present invention, the host data controller 22 may receive the data, remove it from the internal protocol and encapsulate the data into a packet determined by the protocol used by the radio infrastructure 56. The packet of data may be broadcasted over the radio infrastructure 56 so as to enable the host data controller 22 to communicate with multiple mobile data controllers 54 simultaneously. The broadcasted data packet may include the identification of the specific mobile data controller 54 to which the packet is to be delivered, so that only uniquely identified mobile controller(s) may accept the packet.

Referring again to FIG. 3, at step 522, the mobile data controller 54 receives the data from the remote radio infrastructure 56 and decodes the data. The data packet, once received by the mobile data controller 54, is accepted and the data is removed from the packet. At step 524, the mobile data controller 54 validates the data and, at step 526, sends an acknowledgment or rejection message to the host data controller 22 via the radio infrastructure 56. According to the present invention, the remote network controller 20 and the host data controller 22 may be responsible for ensuring the integrity of the data transported over the radio infrastructure. As such, an error detection/retry mechanism may be employed to detect and correct data transmission errors. After the integrity of the data is verified, the mobile data controller 54 at step 528 will forward the data to the remote device 52. The data may be asynchronously transferred to the remote device 52 through a serial connection.

Figure 4:
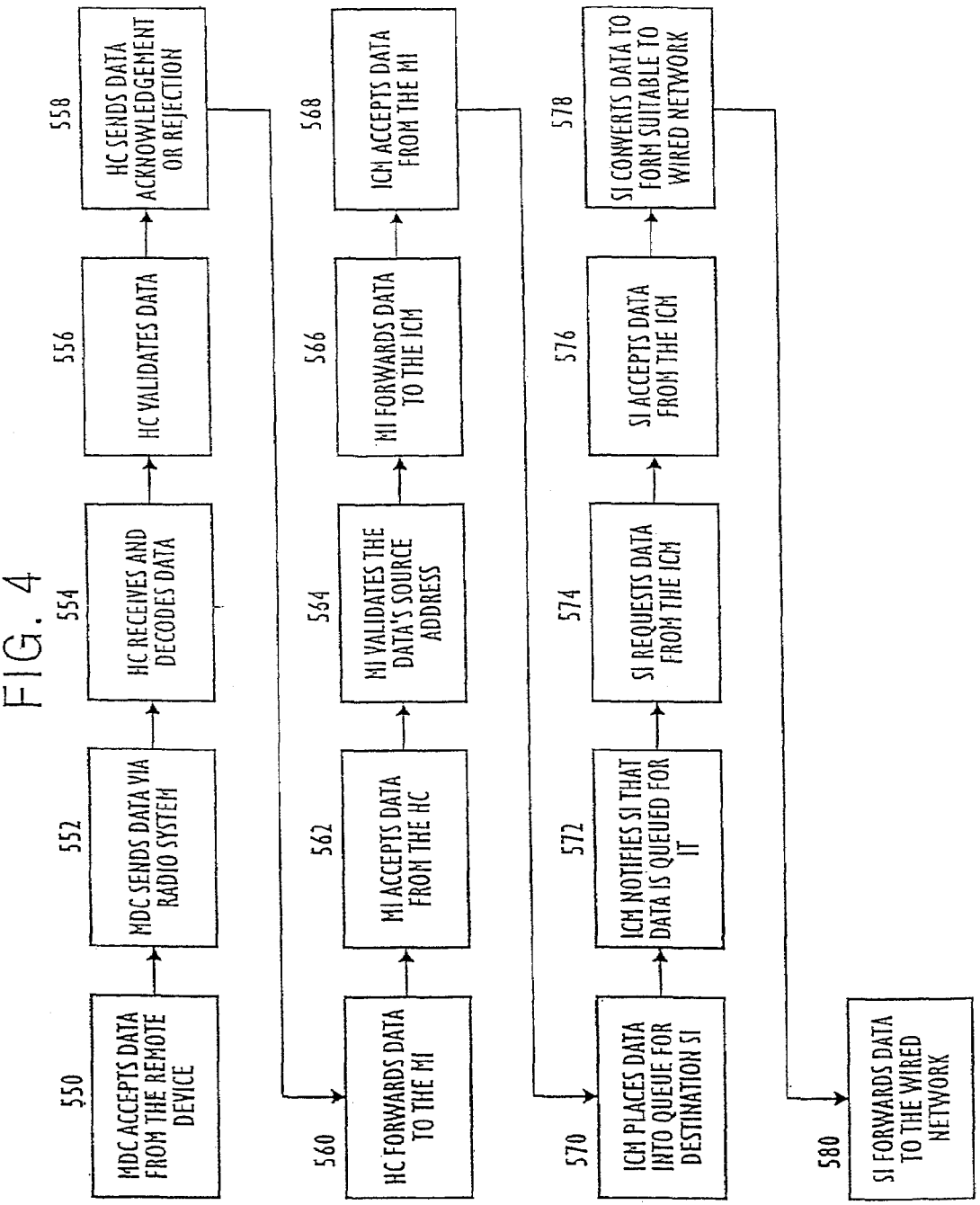
FIG. 4 is a high-level flow chart, according to the present invention, illustrating the flow of inbound data from a remote device to a wired communication network.

FIG. 4 is a high-level flow chart illustrating the processing of inbound data from the remote device 52 to the wired communication network 10. At step 550, the mobile data controller 54 accepts data from the remote device 52. At step 552, the mobile data controller 54 formats and sends the data to the remote network controller 20 via the radio infrastructure 56, which may comprise a modem. The data may be transmitted using the appropriate protocol of the radio infrastructure 56. The data may be modulated within the mobile data controller 54 prior to transmission via the radio infrastructure 56. The mobile data controller 52 may place the data from the remote device 52 into packets to be sent over the radio infrastructure 56. The packet size can be determined by one of three methods. The first is a maximum packet size. Once an upper limit of data is accumulated, the mobile data controller 54 may send the packet of information to the host data controller 22. For example, once 256 bytes of data are collected, the data may be sent by the radio infrastructure 56 over the RF communications link 55. The second method is a maximum time to wait before sending data. In this case the mobile data controller 54 will send a packet after waiting a predetermined period of time, no matter how much data is accumulated. The third method involves the mobile data controller 54 detecting a predefined "end-of-packet" character which causes all accumulated data to be transmitted. At step 554, the host data controller 22 receives and decodes the data packet from the protocol of the radio infrastructure 56. Generally, the data arrives as a packet of a predetermined size. At step 556, the host data controller 22 validates the data and, thereafter, sends at step 558 an acknowledgment or rejection message to the mobile data controller 54 based on the validation process. According to an aspect of the present invention, the host data controller 22 may determine if the transmitted data packet is correct, or in error. The host data controller 22 may also determine if the data packet has arrived in the proper sequence, and that the packet is not a duplicate. As discussed above, the inbound data may be removed from the packet and encapsulated in the internal protocol used by the remote network controller 20. The internal protocol may contain additional information, such as the identification of the mobile data controller 54 which sent the information.

At step 560, the host data controller 22 forwards the data to the mobile interface 24. The mobile interface 24 accepts the data from the host data controller 22 at step 562. The mobile interface 24 validates the address of the source of the data (e.g., the particular mobile data controller 54 or remote device 52) at step 562. At step 566, the mobile interface 24 forwards the data to the interprocess communication manager 28, which accepts the data at step 568. The mobile interface may also pass the routing information specifying the remote device 52 from which the data originated. At step 570, the interprocess communication manager 28 places the data into a queue for the destination service interface 30. The particular destination service interface 30 will depend upon which wired communication network 10 the data is to be delivered. Included in the information which is passed to the service interface 30 is the destination address (i.e., the communication network 10 to which the data is to be delivered). At step 572, the service interface 30, when available to handle data, requests the data from the interprocess communication manager 28. The service interface 30 accepts the data at step 576 and converts the data into an appropriate form, i.e., protocol, usable by the wired communication network 10 at step 578. As a result, the data may be passed to the hardware device (e.g., an Ethernet controller) using the protocol required by the wired communication network 10. This configuration allows any existing network interface card to be used in conjunction with the remote network controller 20, because the data is placed into the appropriate network protocol by the service interface 30 before it is transmitted to the wired network. At step 580, the service interface 30 forwards the data to the wired communication network 10.

The validation process of the outbound data depicted in FIG. 3 and inbound data depicted in FIG. 4 does not depend on the type of wired communication network 10 employed by the user. Through a single validation process performed by the host data controller 22 and the mobile data controller 54 (see, steps 524 and 526 in FIG. 3 and steps 556 and 558 in FIG. 4), the integrity of the data transmitted from the wired communication network 10 to the remote device 52 through the radio infrastructure 56 is ensured. This validation process may include, for example, an error detection and retry mechanism to detect errors and to cause (when necessary) the retransmission of the data.

Figure 5:
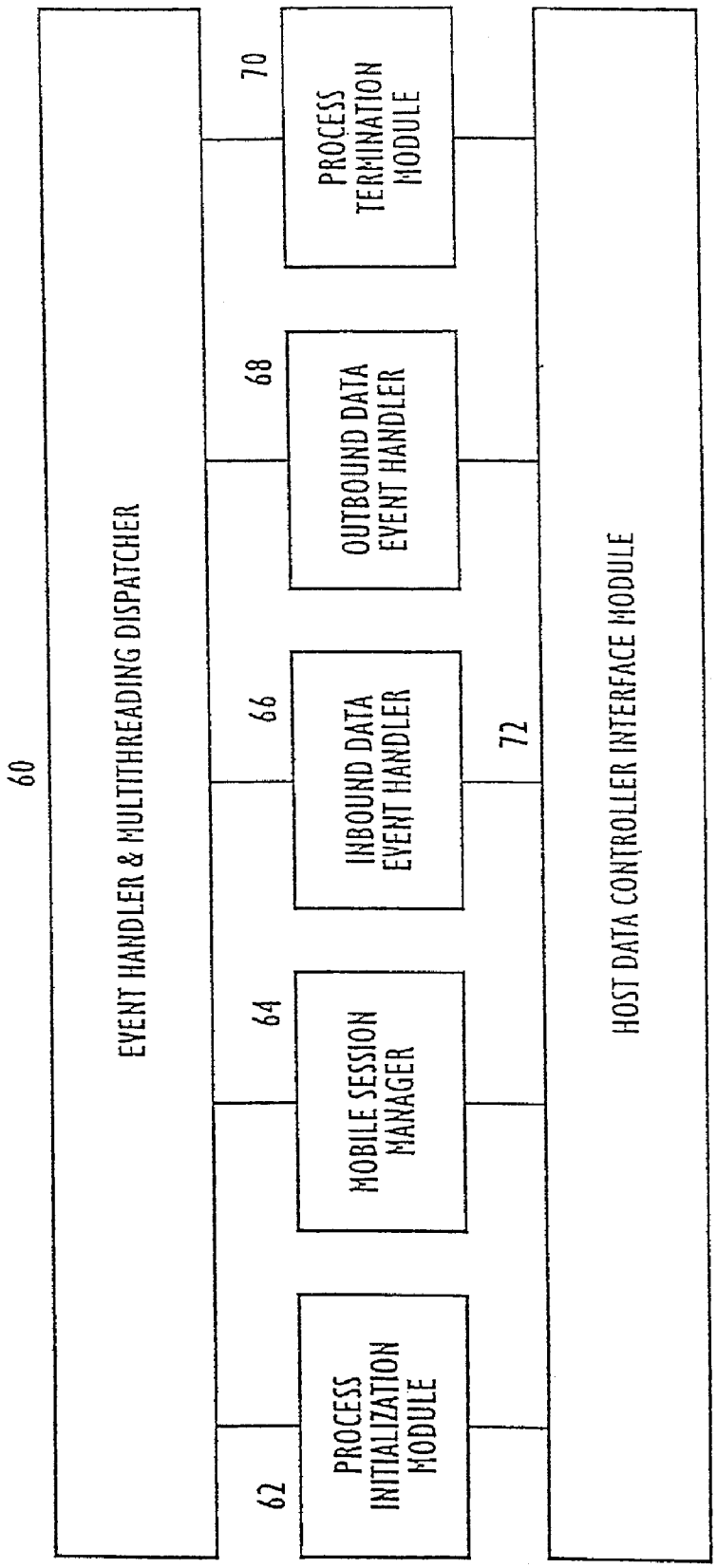
FIG. 5 illustrates a block diagram of the components of a mobile interface in accordance with the present invention.

Referring now to FIG. 5, there is illustrated a block diagram of the basic components of the mobile interface 24 of the remote network controller 20 of the present invention. As noted above, the mobile interface 24 is responsible for interfacing the remote network controller 20 with the host data controller 22 and the radio infrastructure 56. The mobile interface 24 may be a software interface that records statistical information related to inbound and outbound data. The mobile interface 24 may also be responsible for error detection and correction, and establishing and managing the mobile data sessions with the remote devices 52. The number of mobile interfaces 24 provided in the remote network controller 20 depends on the number of different types of radio infrastructures 56 employed by the user. Each type of radio infrastructure 56 may have its own associated mobile interface 24.

As shown in FIG. 5, the mobile interface 24 may include an event handler and multithreading dispatcher 60, a process initialization module 62, a mobile session manager 64, an inbound data event handler 66, an outbound data event handler 68, a process termination module 70 and a host data controller interface module 72. The event handler and multithreading dispatcher 60 may contain high-level logic and be used to control the overall execution flow of the mobile interface 24. The process initialization module 62 may be utilized to acquire resources and establish the operation environment for the mobile interface 24 process. The process initialization module 62 may also be provided to initialize the host data controller 22.

According to the present invention, the mobile session manager 64 may be provided to control the communications environment between the mobile data controller 54 and the host data controller 22. The inbound data event handler 66 responds to signals from the host data controller 22 indicating that inbound data is available and preprocess session control information. The outbound data event handler 68 is provided to respond to signals from the interprocess communication manager 28 indicating that outbound data is available or that a session control function is required. The process termination module 70 functions to release previously-acquired resources and terminate the mobile interface 24 process efficiently. The host data controller interface module 72 handles low-level interaction with the associated host data controller(s) 22.

Figure 6:
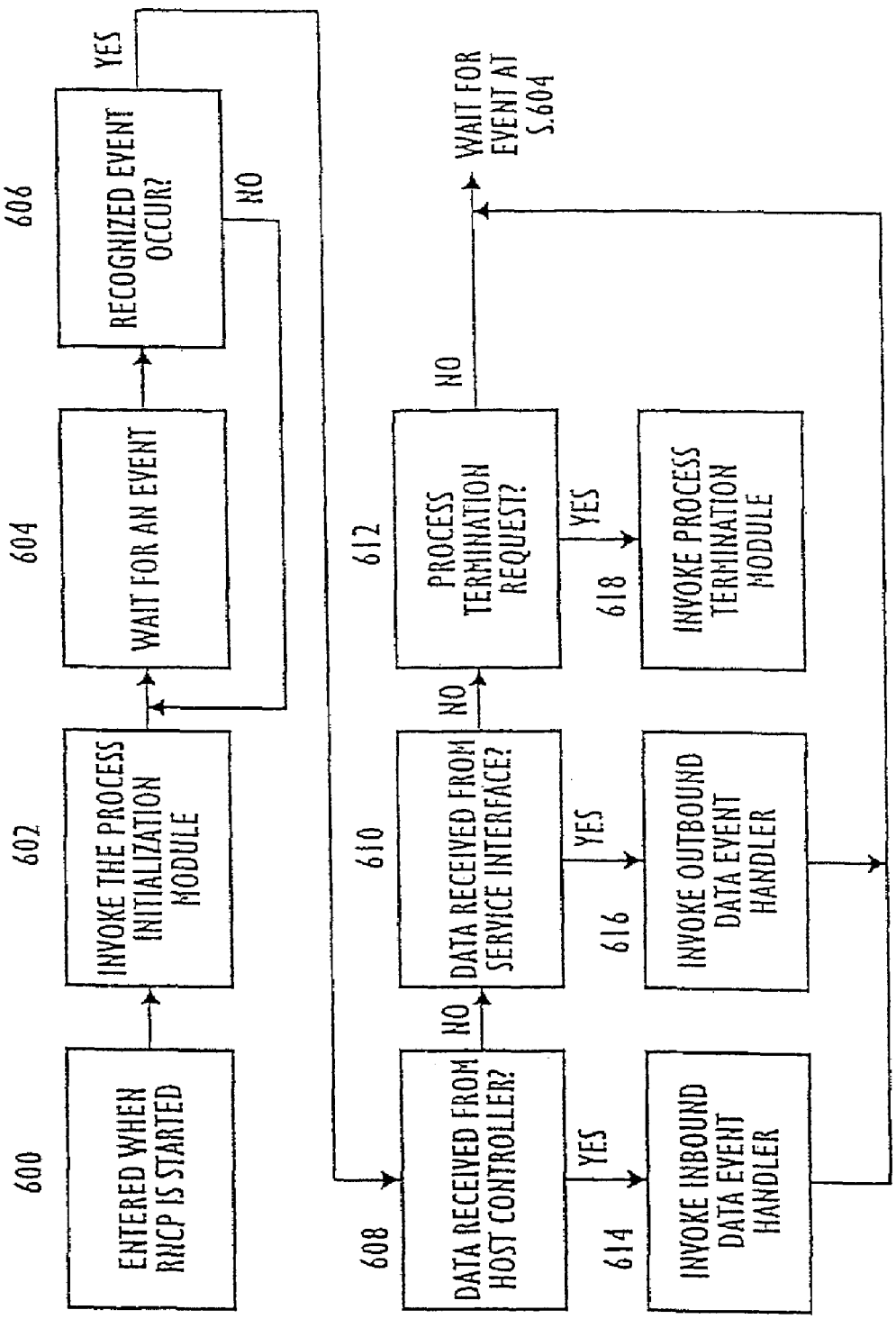
FIG. 6 is a flow chart of the processing of an event handler and multithreading dispatcher associated with the mobile interface of the present invention.

The process flow of the event handler and multithreading dispatcher 60 will now be described with reference to FIG. 6. At step 600, the process begins when the remote network controller 20 is powered up and initialized. At step 602, the process initialization module 62 is invoked (described below with reference to FIG. 7). At step 604, the event handler and multithreading dispatcher 60 waits for an event (e.g., receipt of inbound data) to occur. While the event handler and multithreading dispatcher 60 waits for an event to occur, mobile interface 24 may be placed in a "sleep" mode to conserve processor resources. At step 606, once an event occurs, the event handler and multithreading dispatcher 60 determines if it is a recognized event. If the event handler and multithreading dispatcher 60 determines it is not a recognized event at step 606, processing returns to step 604. If, however, the event handler and multithreading dispatcher 60 determines that the event is a recognized event at step 606, then processing continues at step 608, where the event handler and multithreading dispatcher 60 determines if the data was received from the host data controller 22.

At step 608, if the event handler and multithreading dispatcher 60 determines the data was received from the host data controller 22, the event handler and multithreading dispatcher 60 invokes the inbound data event handler 66, at step 614 (described below with reference to FIG. 9) and processing continues at step 604. If at step 608 the event handler and multithreading dispatcher 60 determines that the data was not received from the host data controller 22, then the event handler and multithreading dispatcher 60 determines whether the data was received from the service interface 30 at step 610.

If the event handler and multithreading dispatcher 60 at step 610 determines that the data was received from the service interface 30, then at step 616 the outbound data event handler 68 is invoked (described below with reference to FIG. 10) and processing returns to step 604. If the event handler and multithreading dispatcher 60 at step 610 determines that the data was not received from the service interface 30, then at step 612 the event handler and multithreading dispatcher 60 determines if there is a process termination request.

If, at step 612, the event handler and multithreading dispatcher 60 determines there is a process termination request, then at step 618, the process termination module 70 is invoked (described below with reference to FIG. 11). If, at step 612, the event handler and multithreading dispatcher 60 determines that there is not process termination request, then processing continues at step 604 to wait for another event.

Figure 7:
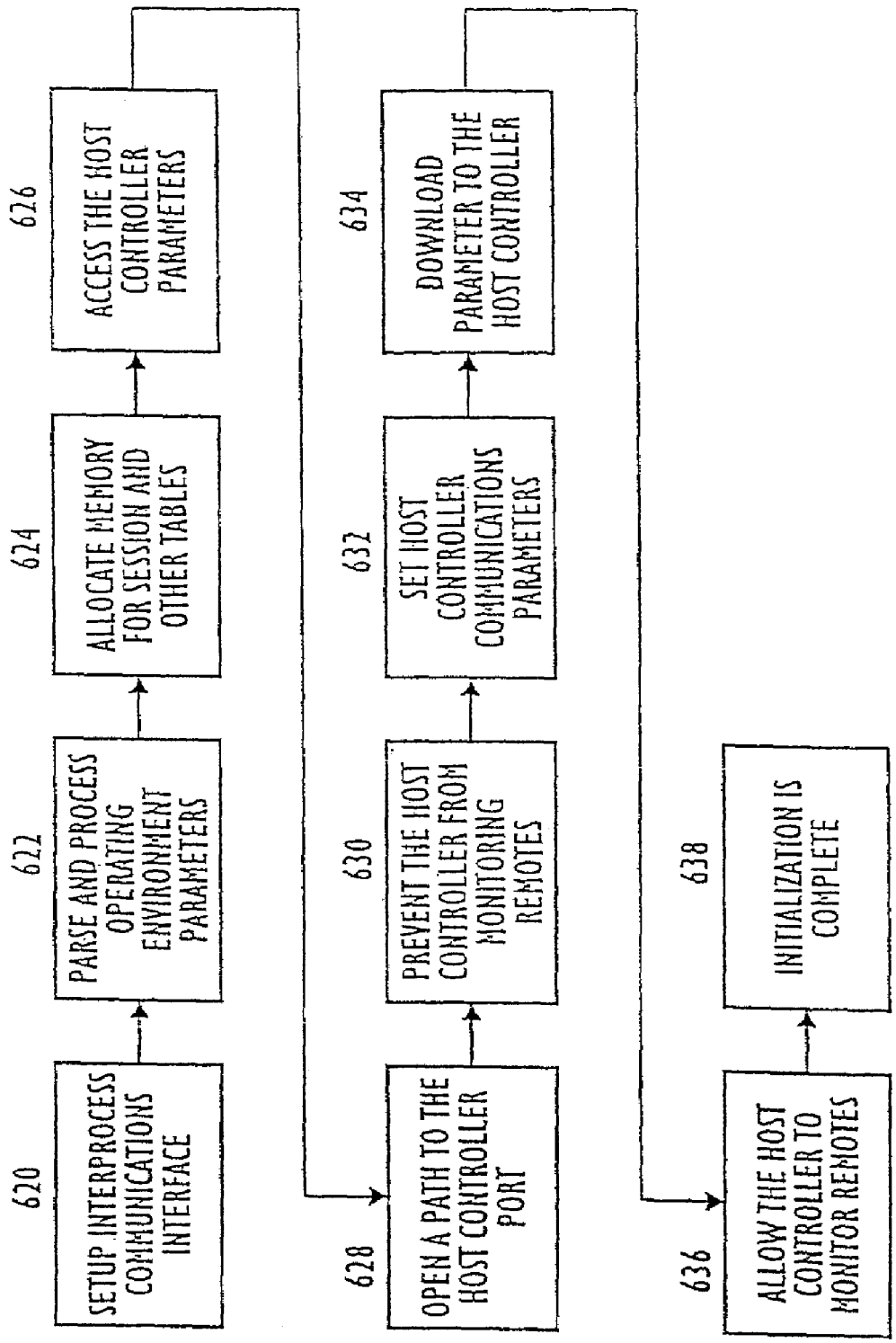
FIG. 7 is a flow chart for indicating the process flow of a process initialization module associated with the mobile interface of the present invention.

Referring now to FIG. 7, there is illustrated an exemplary flow chart for indicating the process flow of the process initialization module 62 of FIG. 5. At step 620, the interprocess communications interface is setup. At step 622, the operating environment parameters are parsed and processed. This includes the host data controller 22 parameters referenced in steps 626, 632 and 634 below. At step 624, memory is allocated for the session and other tables contained within the mobile interface 24, which are used to control data flow and other operations. At step 626, the host data controller 22 parameters are accessed. At step 628, a path to the host data controller 22 port is opened. At step 630, the host data controller 22 then is prevented from monitoring for an event from the remote device(s) 52. Step 630 prevents erroneous transmissions that may arise if the host data controller 22 attempts to monitor a remote device 52 before the initialization process is complete. At step 632, the host data controller 22 communication parameters are set. At step 634, the communication parameters are downloaded to the host data controller 22. After the initialization processes of steps 632 and 634 are completed, the host data controller 22 at step 636 is enabled to monitor the remote device(s) 52. At step 638, the entire initialization procedure is complete and processing returns to step 604 in FIG. 6.

Figure 8:
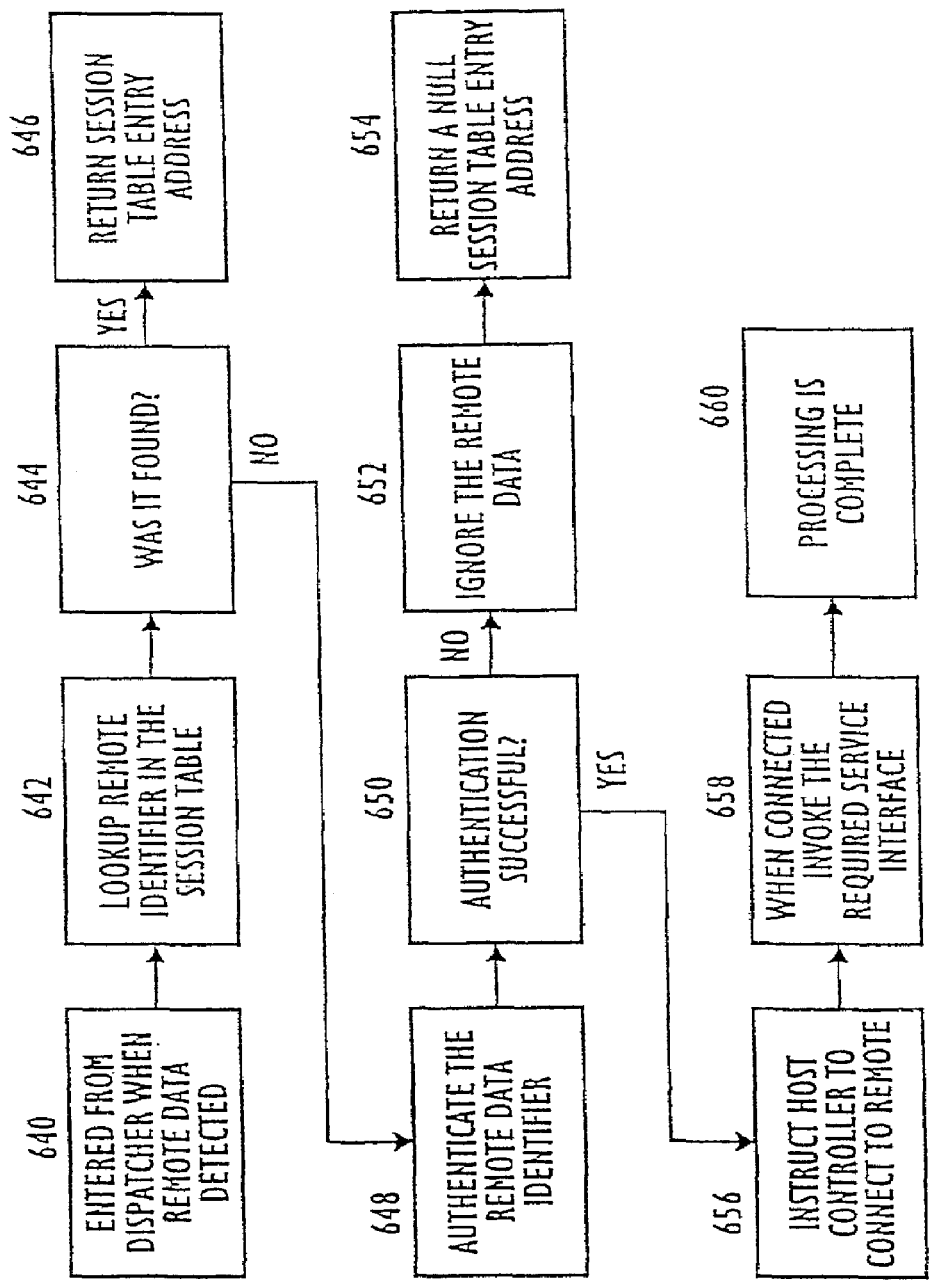
FIG. 8 is a flow chart for indicating the processing of a mobile session manager associated with the mobile interface of the present invention.

Referring now to FIG. 8, there is illustrated an exemplary flow chart describing the logic flow of the mobile session manager 64 of FIG. 5. At step 640, the mobile session manager 64 handler is entered from the event handler and multithreading dispatcher 24 when remote data is detected. At step 642, the remote identifier of the remote device 52 is looked up in a session table. At step 644, the mobile session manager 64 determines if the remote identifier was found in the session table. If the mobile session manager 64 determines that the remote identifier was found, the address is returned from the session table at step 646.

If the mobile session manager 64 does not find the remote identifier at step 644, then at step 648 the mobile session manager 64 attempts to authenticate the remote identifier. At step 650, the mobile session manager determines if the authentication is successful. If at step 650 the authentication is successful, then at step 656 the host data controller 22 is instructed to connect to the remote device 52 based on the remote identifier. After the host data controller 22 is connected to the remote device 52, the appropriate service interface 30 is invoked at step 658. At step 660, processing is complete. If at step 650, the authentication was not successful, the remote data is ignored at step 652, and a null session table entry address is returned by the mobile session manager 64.

Figure 9:
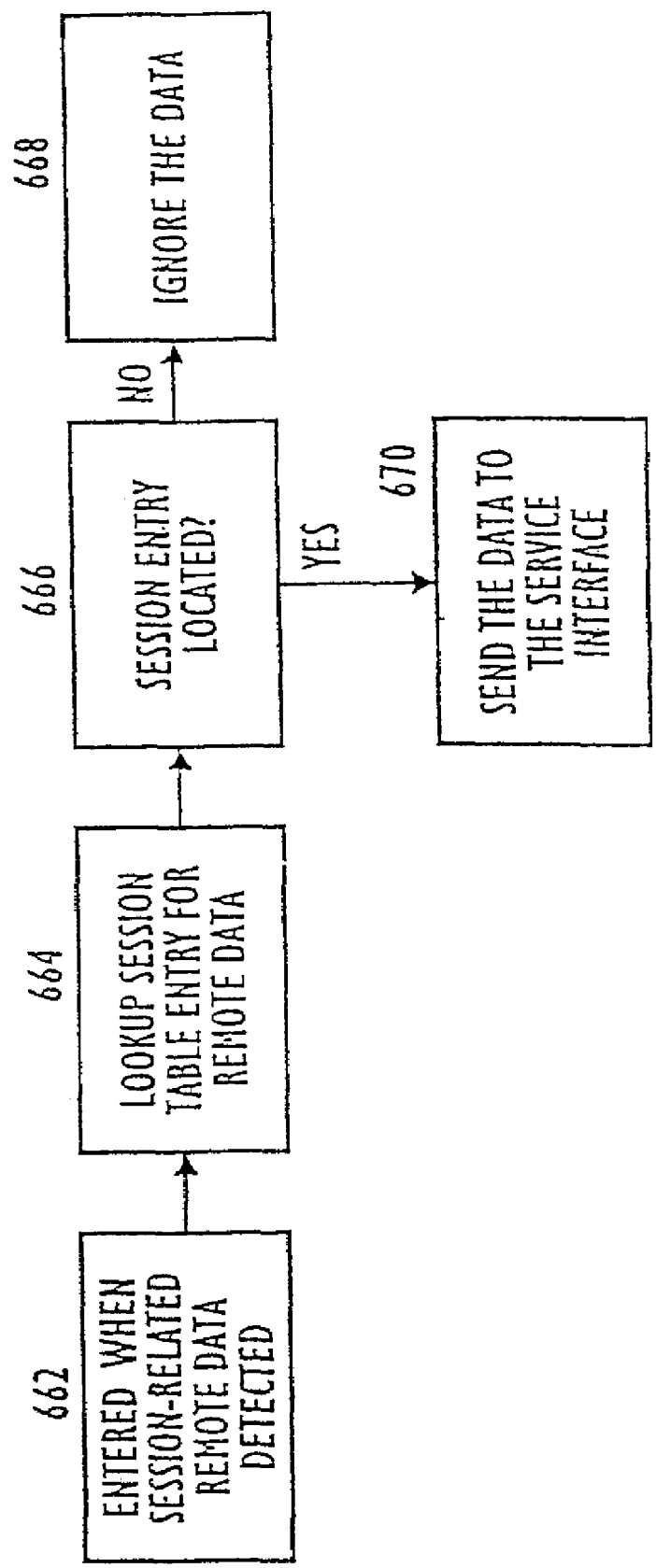
FIG. 9 is a flow chart of the processing steps for an inbound data event handler associated with the mobile interface of the present invention.

Referring now to FIG. 9, there is illustrated an exemplary flow chart of the processing steps of the inbound data event handler 66 of FIG. 5. At step 662, the inbound data event handler is invoked (from step 614 in FIG. 6). At step 664, the remote identifier of the remote device 52 is checked against the session table. At step 666, it is determined whether the inbound data event handler 66 found the remote identifier in the session table. If at step 666, the remote identifier is not found in the session table, the data is ignored and processing continues at step 604 in FIG. 6. If the remote identifier is found in the session table at step 666, the data is sent to the service interface 30 at step 670. Processing then continues at step 604 in FIG. 6.

Figure 10:
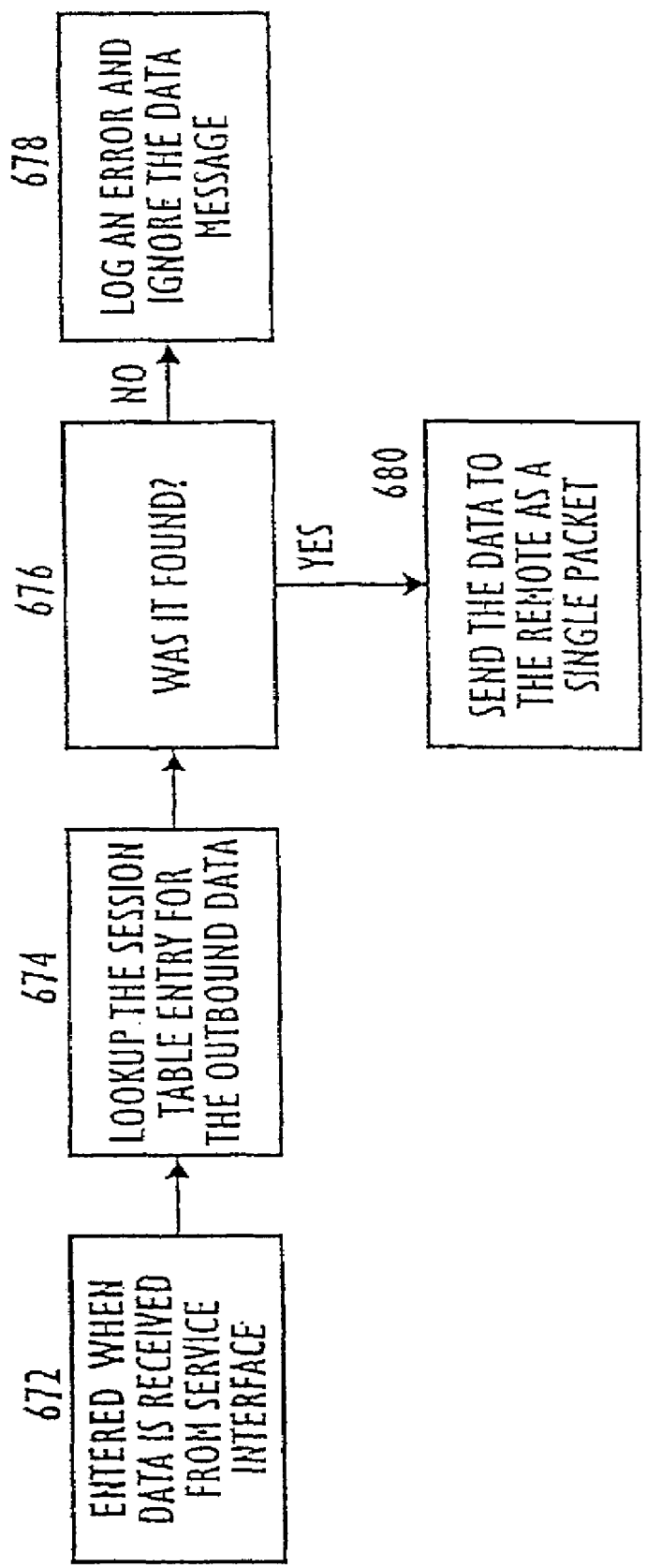
FIG. 10 is a flow chart of the processing steps for an outbound data event handler associated with the mobile interface of the present invention.

Referring now to FIG. 10, there is illustrated an exemplary flow chart of the processing steps of the outbound data event handler 68 of FIG. 5. At step 672, the outbound data event handler is invoked (from step 616, FIG. 6). At step 674, the session table is checked for the outbound data remote identifier. At step 676, it is determined if the outbound data event handler 68 found the remote identifier in the session table. If at step 676, the remote identifier is not found in the session table, an error is logged and the data message is ignored. Processing then continues at step 604 in FIG. 6. If the remote identifier is found in the session table at step 676, the data is sent to the remote device 52 as a single packet at step 680. Processing then continues at step 604 in FIG. 6.

Figure 11:
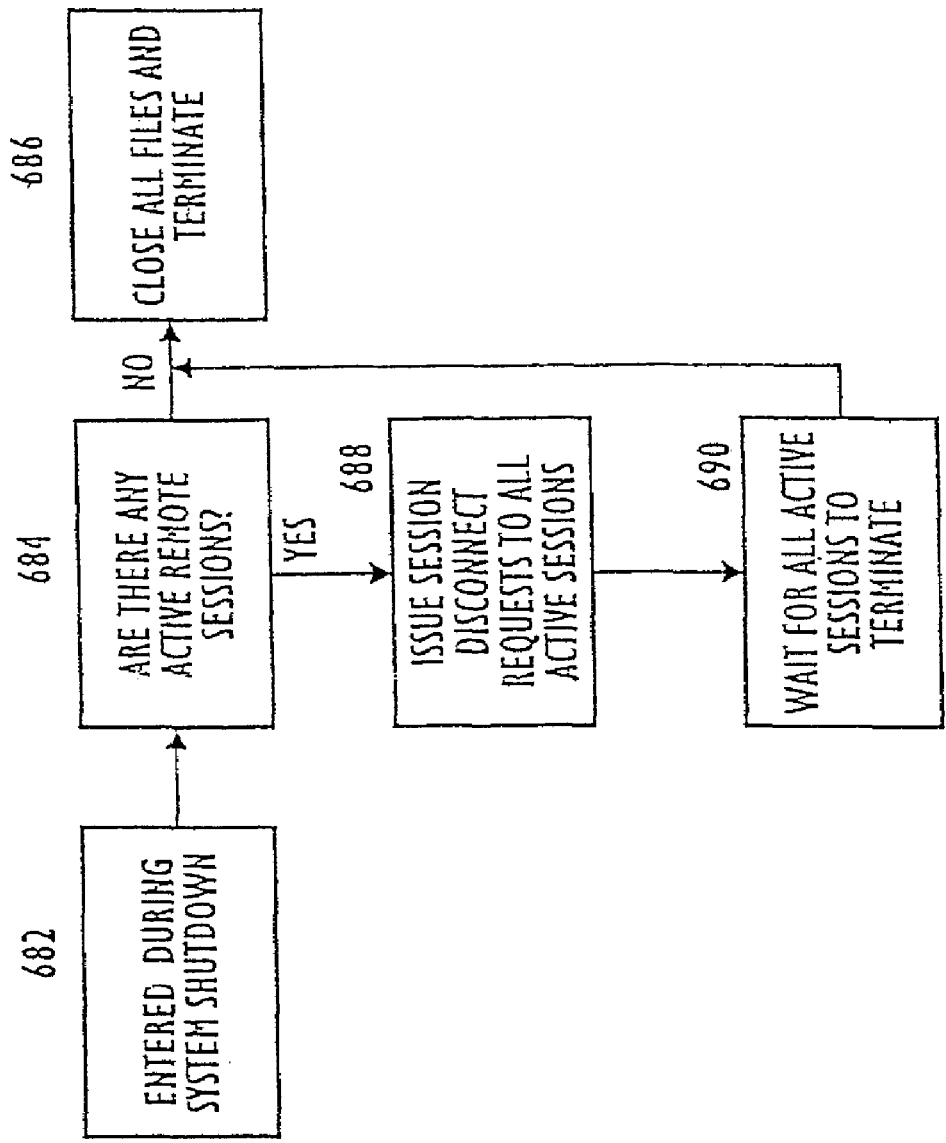
FIG. 11 is a flow chart of the processing steps for a process termination module associated with the mobile interface of the present invention.

Referring now to FIG. 11, there is illustrated an exemplary flow chart of the processing steps of the process termination module 70 of FIG. 5. At step 682, the process termination module 70 is invoked (from step 618 in FIG. 6). At step 684, the process termination module 70 determines if there are any active remote sessions. If, at step 684, it is determined by the process termination module 70 that there are no active sessions, then at step 686 all files are closed and the mobile interface 24 terminates. If, however, it is determined by the process termination module 70 that there are active sessions, then at step 688 all of the active sessions are issued a disconnect request. At step 690, the process termination module waits for all active sessions to terminate. Once all active sessions have terminated at step 690, then all files are closed and the mobile interface 24 terminates at step 686.

Figure 12:
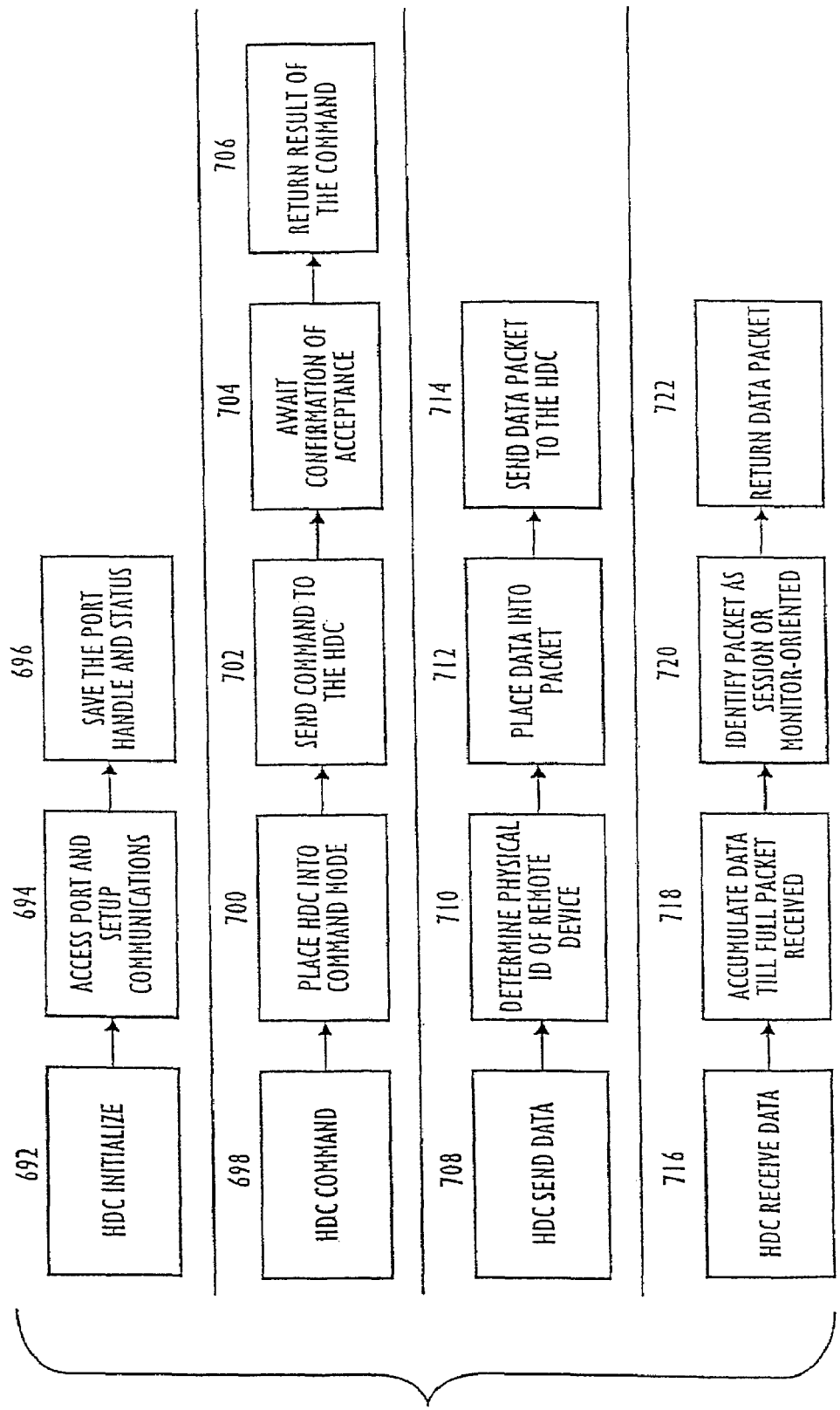
FIG. 12 is a flow chart of the processes associated with a host data controller interface module associated with the mobile interface of the present invention.

Referring now to FIG. 12, there is illustrated an exemplary flow chart of the processes associated with the host data controller interface module 72 of FIG. 5. The host data controller interface module 72 consists of a number of discrete functions (e.g., Initialize, Command, Send Data, and Receive Data) which are called when needed by the mobile interface 24 and share common information about the host data controller 22. The host data controller interface module 72 may access the host data controller 22 via a serial communications port which is assigned to the mobile interface 24 and remains fixed when the remote network controller 20 is in operation.

A host data controller 22 initialize routine begins at step 692. The initialization routine may be initiated in accordance with step 602 (see FIG. 6) and steps 632 and 634 (see FIG. 7). At step 694, the serial communications port is accessed and setup. Thereafter, at step 696, the port handle and status is saved to be used by other processes within the host data controller interface module 72.

A host data controller 22 command routine begins at step 698. The command routine may be initiated upon the occurrence of a recognized event (see, e.g., step 604 in FIG. 6) so that the appropriate control or operation commands may be sent to the host data controller 22. At step 700, the host data controller 22 is placed into a command mode. At step 702, a command (e.g., disconnect or receive) is issued to the host data controller 22 based on the event that is recognized. At step 704, the host data controller interface module 72 awaits a confirmation of acceptance of the command from the host data controller 22. At step 706, the result of the command is returned to the host data controller interface module 72.

A host data controller 22 send data routine begins at step 708 and may be initiated from step 680 in FIG. 10. The send data routine is initialized so that data may be sent to the appropriate remote device 52. First, the physical identification of the remote device 52 is determined at step 710. Thereafter, the data to be sent to the remote device 52 is placed into a packet at step 712, and sent to the host data controller 22 at step 714.

At step 716, a host data controller 22 receive data routine is initiated in accordance with step 670 in FIG. 9. The receive data routine is initiated so that data from the remote device 52 may be received by the remote network controller 20. At step 718, data is accumulated within the host data controller 22 receive data routine (see, FIG. 12, step 716) until a full packet of information is received. Thereafter, at step 720, the packet is identified as either session oriented or monitor oriented data. The identified data packet is then returned, at step 722, to the mobile interface 24 and sent to the wired communication network 10 via the remote network controller 20.

Figure 13:
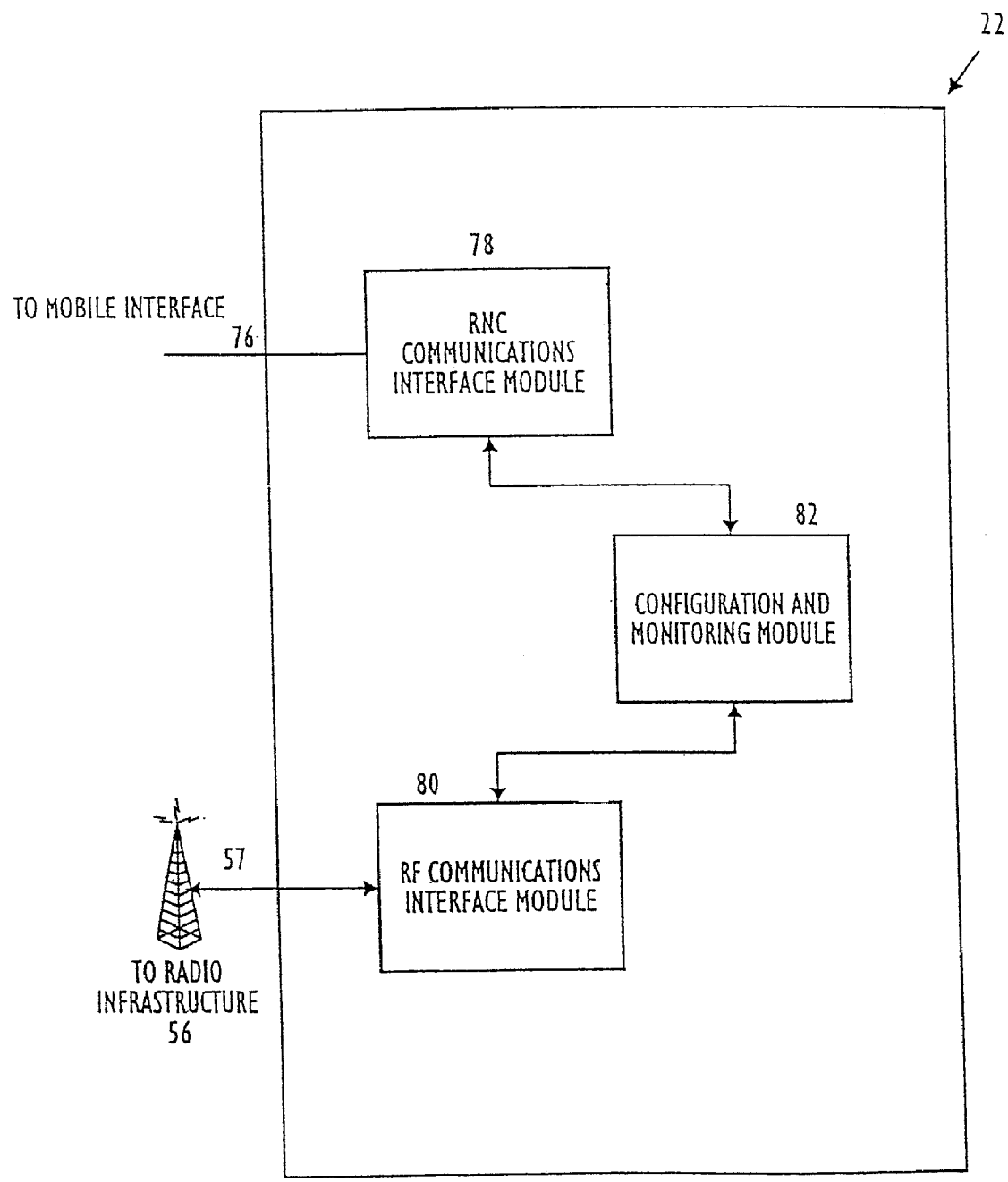
FIG. 13 is a block diagram of the various components of a host data controller in accordance with an aspect of the present invention.

Referring now to FIG. 13, in accordance with an aspect of the present invention, there is illustrated a block diagram of the basic components of the host data controller 22 (see, e.g., FIG. 2) of the present invention. The host controller 22 may be physically connected external to the remote network controller 20 via the mobile interface 24. The host data controller 22 is specifically designed to convert the radio infrastructure 56 protocol to the internal protocol of the remote network controller 20. Typically, one host data controller 22 may be connected to each mobile interface 24; however, one or more host data controllers 22 may be connected for redundancy and greater reliability.

As shown in FIG. 13, the host data controller 22 may comprise an RF communications interface module 80, a remote network controller communications interface module 78, and a configuration and monitoring module 82. The host data controller 22 may comprise any combination of hardware and software to perform the functions described herein. For example, the host data controller 22 may comprise a commercially available processor or multi-processor with overlying application software. The software running in the host data controller 22 may be written in Z80 or other appropriate high-level language (e.g., Pascal). The host data controller 22 may also contain a plurality of serial ports for communicating with other devices.

The remote network controller communications interface module 78 is connected to the mobile interface 24 of the remote network controller 20 and is responsible for sending and receiving data to and from the remote network controller 20. A subsystem port 76 (e.g., an RS-232 adapter) may be used to connect the remote network controller communications interface module 78 to the mobile interface 24 of the remote network controller 20. If the host data controller 20 is connected to more than one remote network controller, then additional subsystem port connection(s) may also be provided to connect to the interface module 78 to the additional remote network controllers. The remote network controller communications interface module 78 sends health and status information regarding the host data controller 22 to the mobile interface 24. This information informs the remote network controller 20 that the host data controller 22 is operational and accepting data.

The configuration and monitoring module 82 is specific to the type of radio infrastructure 56 employed. Software parameters, such as the number of subsystem ports, how often to send health and status requests, and a list of mobile data controllers 54 to which the host data controller 22 can communicate, may be set and stored in the configuration and monitoring module 82. The configuration and monitoring module 82 can also accumulate statistics which are passed to the mobile interface 24.

In order to diagnose potential system errors in the host data controller 22, the remote network controller 20 may test and analyze the host data controller 22 over a diagnostic port (not shown) to determine a cause of the system failure or error. The diagnostic port may be used not only to determine if the host data controller 22 is operational, but also to configure software parameters particular to the type of radio infrastructure 56. These parameters can be changed to communicate with a different radio infrastructure 56 type as necessary.

The RF communications interface module 80 is responsible for sending and receiving the radio-frequency transmissions. The RF communications interface module 80 is specific to the radio infrastructure 56 in use and is connected to the radio infrastructure 56 by a communication line 57. Again, because the host data controller 22 is designed to integrate with an existing radio infrastructure 56, each host data controller 22 is software configured to work with many different types of radio infrastructure 56 protocols for flexibility. The host data controller 22 may be designed to be plugged into the remote network controller 20, connecting to the mobile interface 24, and can simply be exchanged with a different host data controller 22, or reprogrammed depending on the radio infrastructure 56 employed. Host data controllers 22 may be configured so as to be compatible with, for example, conventional point-to-point radio systems, conventional repeater-based radio systems, LTR Trunking, Motorola Trunking, Ericsson (EDACS) Trunking-Voice Path, EDACS RDI Trunking-Data Path, and EDACS IMC Voice Path radio infrastructures.

Figure 14:
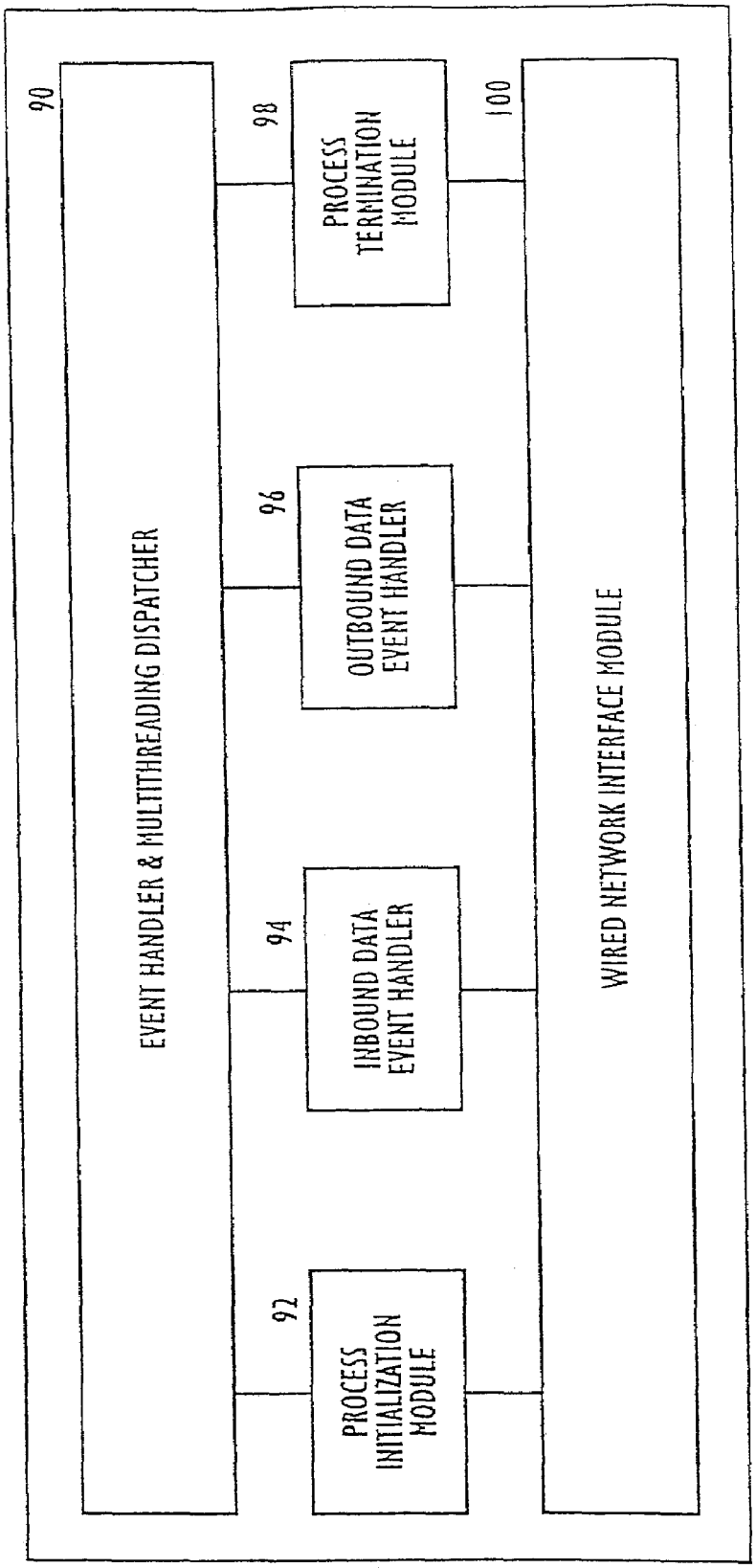
FIG. 14 is a block diagram of the components comprising a service interface according to the present invention.

Referring to FIG. 14, there is illustrated a block diagram of the components comprising the service interface 30 (see FIG. 2) of the present invention. The service interface 30 is responsible for communicating to and from the wired communication network 10. The service interface 30 is concerned only with the software level protocols of the wired communication network 10. The hardware interface to the wired communication network 10 is accomplished by a known network control card, such as an Ethernet controller or a Token-Ring controller.

The number of service interface 30 connections to the wired communication network 10 is dictated by the type of wired communication network 10. If the wired communication network 10 uses asynchronous data transfer, there will be one service interface 30 for every entry point, e.g., serial port, into the wired communication network 10. In a local area network (LAN) environment, each service interface 30 may handle a variety of different network addresses. A different service interface 30 may be used for each type of wired communication network 10.

As shown in FIG. 14, the service interface 30 may include an event handler and multithreading dispatcher 90, a process initialization module 92, an inbound data event handler 94, an outbound data event handler 96, a process termination module 98 and a wired network interface module 100. The event handler and multithreading dispatcher 90 may contain high-level logic and be used to control the overall execution flow of the service interface 30. The process initialization module 92 acquires resources and establishes the operation environment of the service interface 30 process. The inbound data event handler 94 responds to signals from the interprocess communication manager 28 that inbound data is available and pre-process session control information. The inbound data event handler 94 may also handle asynchronous timer events. The outbound data event handler 96 is provided to respond to signals from wired communication network interface module 100 that outbound data is available or that a timer event has occurred. The process termination module 98 functions to release previously-acquired resources and terminate the service interface 30 process gracefully. The wired communication network interface module 100 handles low-level interaction with the associated wired communication network transport mechanism, i.e., communication protocol, being used.

Figure 15:
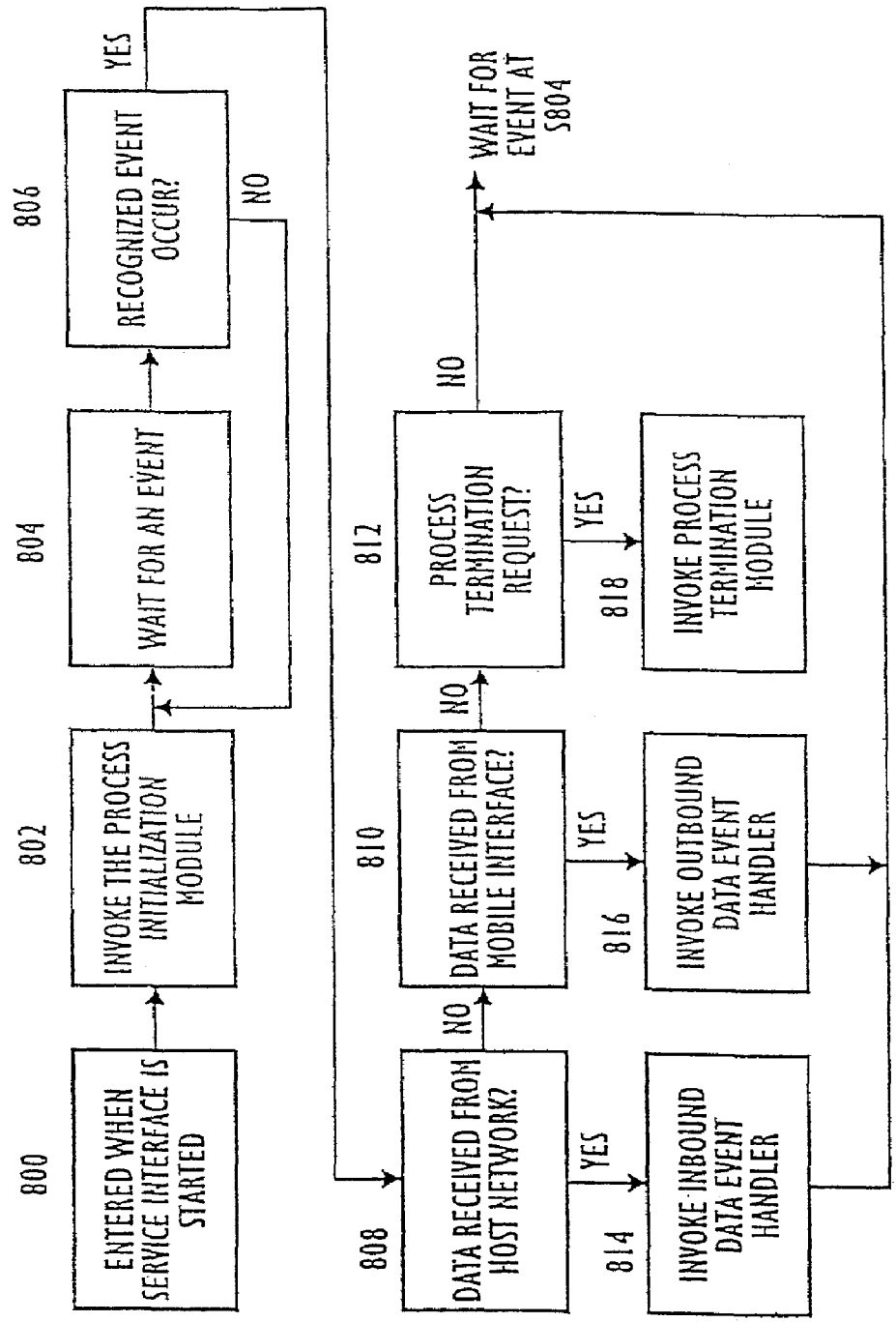
FIG. 15 is a flow chart of the processing of an event handler and multithreading dispatcher associated with the service interface of the invention.

An exemplary process flow of the event handler and multithreading dispatcher 90 (see FIG. 14) of the present invention will now be described with reference to FIG. 15. At step 800, the process begins when the service interface 30 is powered up and initialized. At step 802, the process initialization module 92 is invoked (described below with reference to FIG. 16). At step 804, the event handler and multithreading dispatcher 90 waits for an event to occur in response, e.g., to network or remote device activity. While the event handler and multithreading dispatcher 90 waits for an event to occur, the service interface 30 may be placed in a "sleep" mode to conserve processing power. At step 806, once an event occurs, the event handler and multithreading dispatcher 90 determines if it is a recognized event. Recognized events may include Initialize, Send Data, Receive Data and/or Terminate. If the event handler and multithreading dispatcher 60 determines it is not a recognized event at step 806, then processing returns to step 804. If the event handler and multithreading dispatcher 90 recognizes the event at step 806, then processing continues at step 808, where the event handler and multithreading dispatcher 90 determines if the data was received from the host communication network 10.

At step 808, if the event handler and multithreading dispatcher 90 determines the data was received from the host wired communication network 10, the event handler and multithreading dispatcher 90 invokes the inbound data event handler 94, at step 814 (described below with reference to FIG. 17) and, thereafter, processing continues at step 804. If at step 808 the event handler and multithreading dispatcher 90 determines that the data was not received from the host wired communication network 10, the event handler and multithreading dispatcher 90 then determines if the data was received from the mobile interface 24 at step 810.

If the event handler and multithreading dispatcher 90 determines at step 810 that the data was received from the mobile interface 24, then at step 816 the outbound data event handler 96 is invoked (described below with reference to FIG. 18) and, thereafter, processing continues at step 804. If the event handler and multithreading dispatcher 90 at step 810 determines that the data was not received from the mobile interface 24, then at step 812 the event handler and multithreading dispatcher 90 determines if there is a process termination request.

If, at step 812, the event handler and multithreading dispatcher 90 determines there is a process termination request, then at step 818 the process termination module 98 is invoked (described below with reference to FIG. 19). However, if at step 812 the event handler and multithreading dispatcher 90 determines that there is not process termination request, then processing returns to step 804 to wait for another event.

Figure 16:
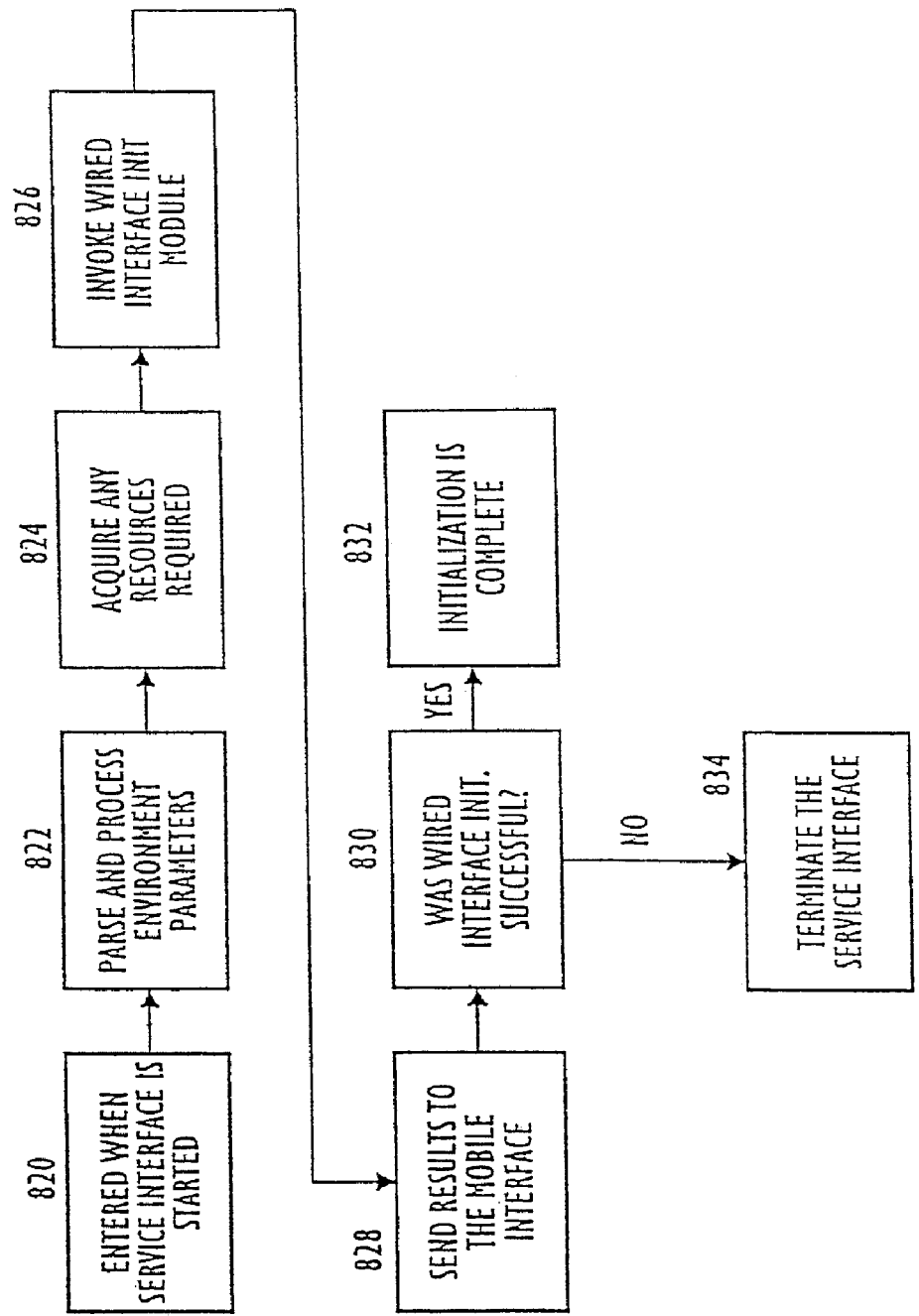
FIG. 16 is a flow chart describing the process flow of a process initialization module associated with the service interface of the invention.

Referring now to FIG. 16, there is illustrated an exemplary flow chart describing the process flow of the process initialization module 92 (see, e.g., FIG. 14) of the present invention. At step 820, the interprocess communications interface is setup when the service interface 30 is started or powered up. At step 822, the operating environment parameters are parsed and processed (i.e., the parameters of the operating environment are processed individually). At step 824, any resources required (e.g., memory) are acquired. Thereafter, at step 826, the wired communication network interface module 100 is invoked (see FIGS. 20-24 discussed below). As discussed below, the wired communication network interface module 100 may include several procedures associated with initializing the connectivity with the wired communication network 10, reading data from the wired communication network 10, writing data to the wired communication network 10, and terminating connectivity with the wired communication network 10. In accordance with an aspect of the present invention, a unique set of procedures may be provided by the wired communication network interface module 100 for each type of wired communication network 10. For example, a unique set of procedures may be provided for networks utilizing transparent asynchronous communications, TCP/IP stream sockets, Vehicle Location Reporting Facilities, Bidirectional Messaging Facilities, or Credit Card Verification Facilities.

After the wired communication network interface module 100 is invoked, the results of the previous operations performed at step 826 are sent at step 828 to the mobile interface 24. At step 830, it is determined by the process initialization module 92 if the wired communication network interface module 100 was successfully invoked at step 826. If it is determined at step 830 that the wired communication network interface module 100 was successfully invoked, then the initialization is complete at step 832, and processing returns to step 804 in FIG. 15. If, however, it is determined at step 830 that the wired communication network interface module was not successfully invoked, then the service interface 30 is terminated at step 834.

Figure 17:
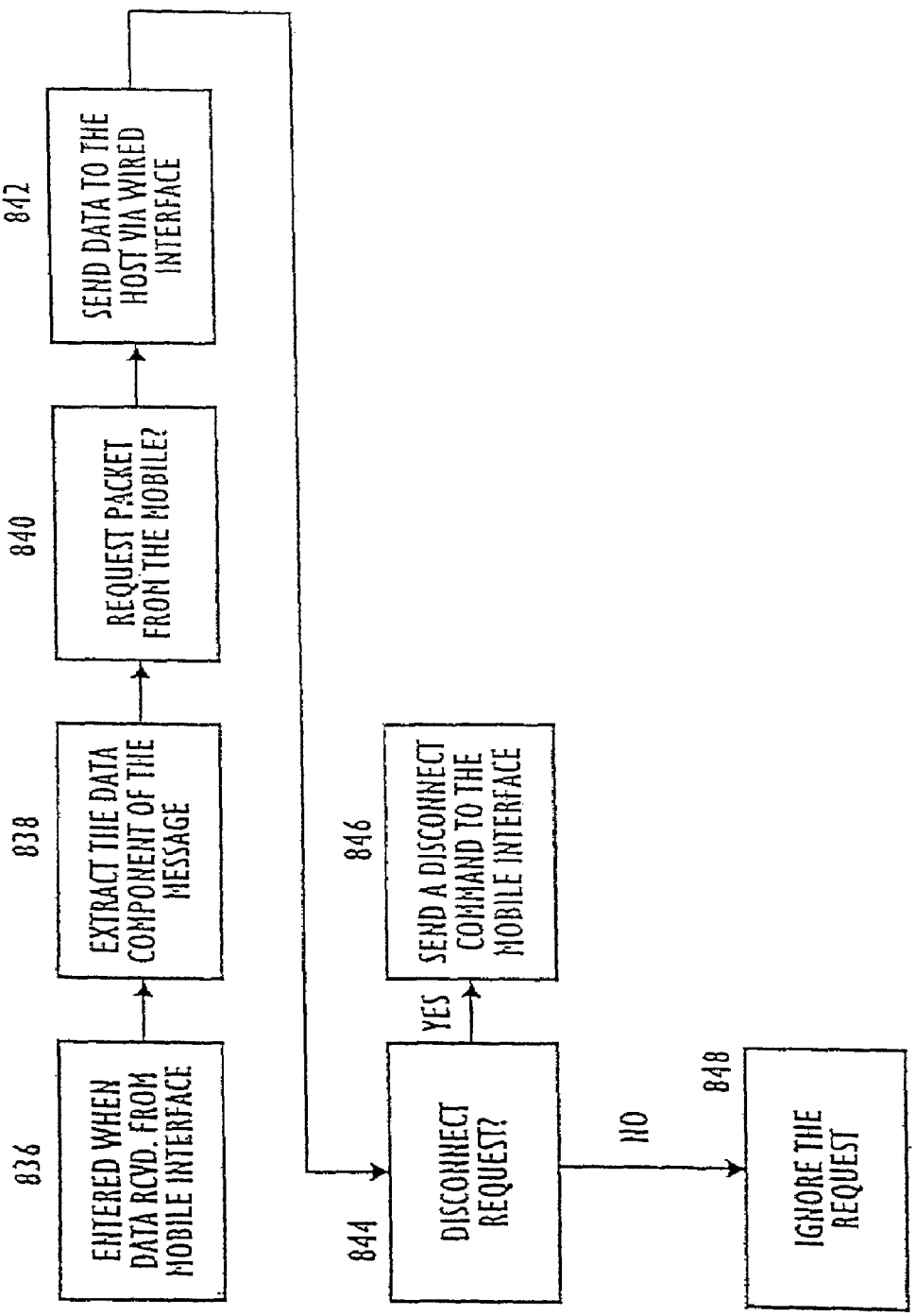
FIG. 17 is a flow chart of the processing steps for an inbound data event handler associated with the service interface of the present invention.

Referring now to FIG. 17, there is illustrated an exemplary flow chart of the processing steps for the inbound data event handler 94 (see, e.g., FIG. 14) of the present invention. At step 836, the inbound data event handler is invoked (from step 814 in FIG. 15). At step 838, the data portion of the message sent by the wired communication network 10 is extracted. At step 840, the service interface 30 requests a packet of data from the mobile interface 24. At step 842, after the packet is accepted by the service interface 30, data is sent to the appropriate destination via the wired communication network 10. The inbound data event handler 94 then waits for a disconnect request at step 844. If the inbound data event handler 94 receives a disconnect request at step 844, then a disconnect command is sent to the mobile interface 24 at step 846. Processing then continues at step 804 in FIG. 15. If, however, the inbound data event handler 94 does not receive a disconnect request at step 844, then the request received is ignored at step 848 and, thereafter, processing then continues at step 804 in FIG. 15.

Figure 18:
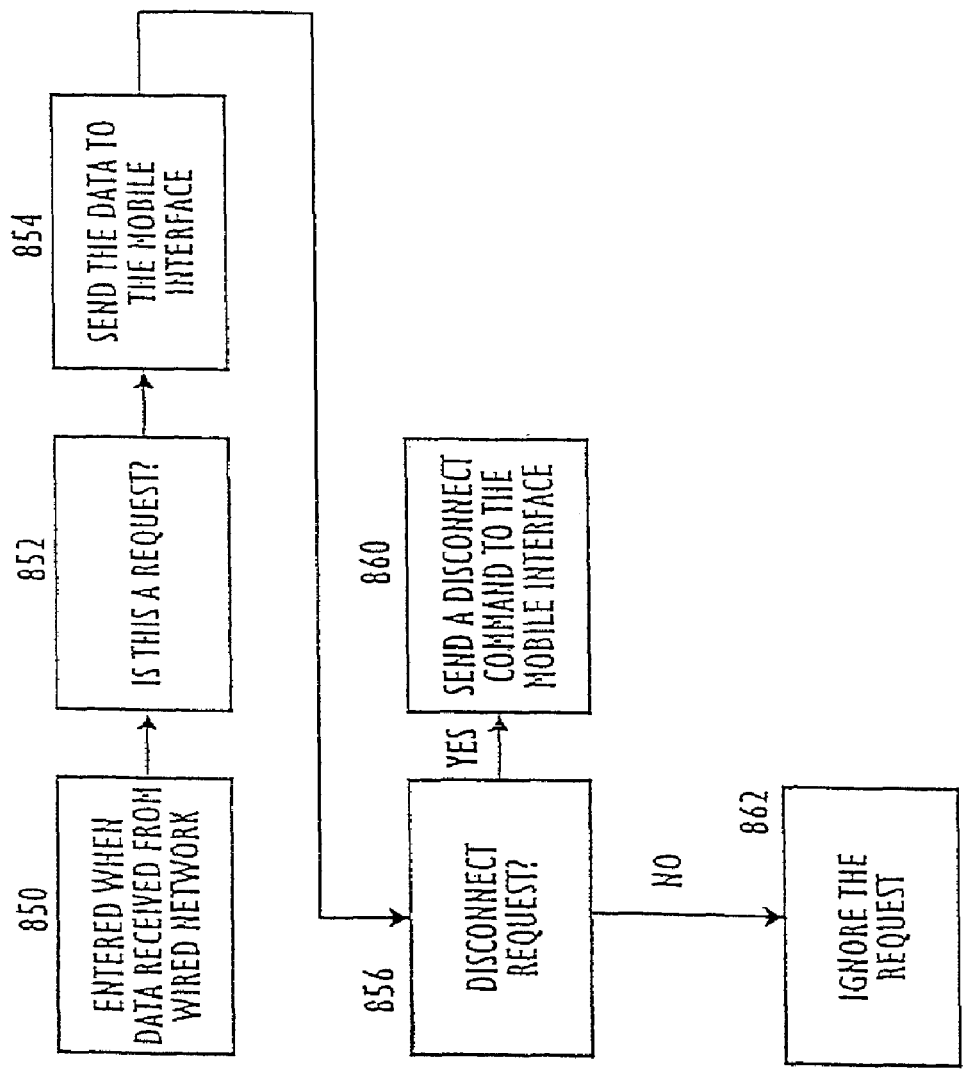
FIG. 18 is a flow chart of the processing steps for an outbound data event handler associated with the service interface of the present invention.

Referring now to FIG. 18, there is illustrated an exemplary flow chart of the processing steps for the outbound data event handler 96 (see FIG. 14) of the present invention. At step 850, the outbound data event handler is invoked (from step 816 in FIG. 15). At step 852, the outbound data event handler 96 determines if there is a request (e.g., a disconnect request from the wired communication network 10 or the remote device 52). If there is a request, then processing continues at step 856. However, if there is presently not a request, then at step 854 the outbound data from the network 10 is sent to remote device 52 via the mobile interface 24. At step 865, the outbound data event handler 96 then determines if a disconnect request has been received. If the outbound data event handler 96 receives a disconnect request at step 856, then a disconnect command is sent to the mobile interface 24 at step 860 by the interprocess communication manager 28 (see, e.g., FIG. 2). Processing then continues at step 804 in FIG. 15. If, however, the outbound data event handler 96 does not receive a disconnect request at step 856, then the request received is ignored at step 862 and processing then continues at step 804 in FIG. 15.

Figure 19:
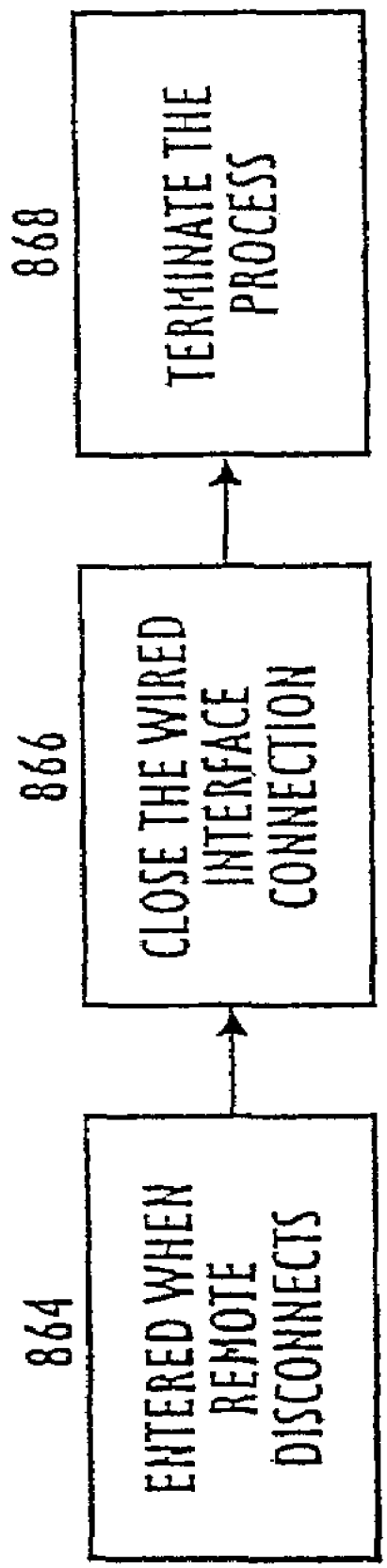
FIG. 19 is a flow chart of the processing steps for a process termination module associated with the service interface of the present invention.

Referring now to FIG. 19, there is illustrated an exemplary flow chart of the processing steps for the process termination module 98 (see FIG. 14) of the present invention. At step 864, the process termination module 98 is invoked (from step 818 in FIG. 15). At step 866, the wired communication network interface module 100 connection is closed. Thereafter, at step 868, the processes associated with the service interface 30 are terminated.

Referring now to FIGS. 20-24, there are illustrated exemplary flow charts of the various processes that may be performed by the wired communication network interface module 100 of the present invention. The wired communication network interface module 100 may consist of a number of discrete functions which provide the service interface 30 with a uniform means of communicating with various host computer networks, irrespective of the communication protocols of the wired communication network 10. All protocol and other feature-specific communications translation and handling is performed at the wired communication network interface module 100. The wired communication network interface module 100 may be designed for networks utilizing different implementations, such as transparent asynchronous communication, Hayes compatible communication, TCP/IP stream socket, Bidirectional Messaging Facilities, File Transfer Facilities, SNA Protocol Enveloping, Vehicle Location Reporting Facilities, Credit Card Verification Facilities, and Harris DNP 3.0 Frame Relay. As noted above, a unique set of procedures may be provided by the wired communication network interface module 100 for each type of wired communication network 10. Examples of several of these sets of procedures are provided below.

Figure 20:
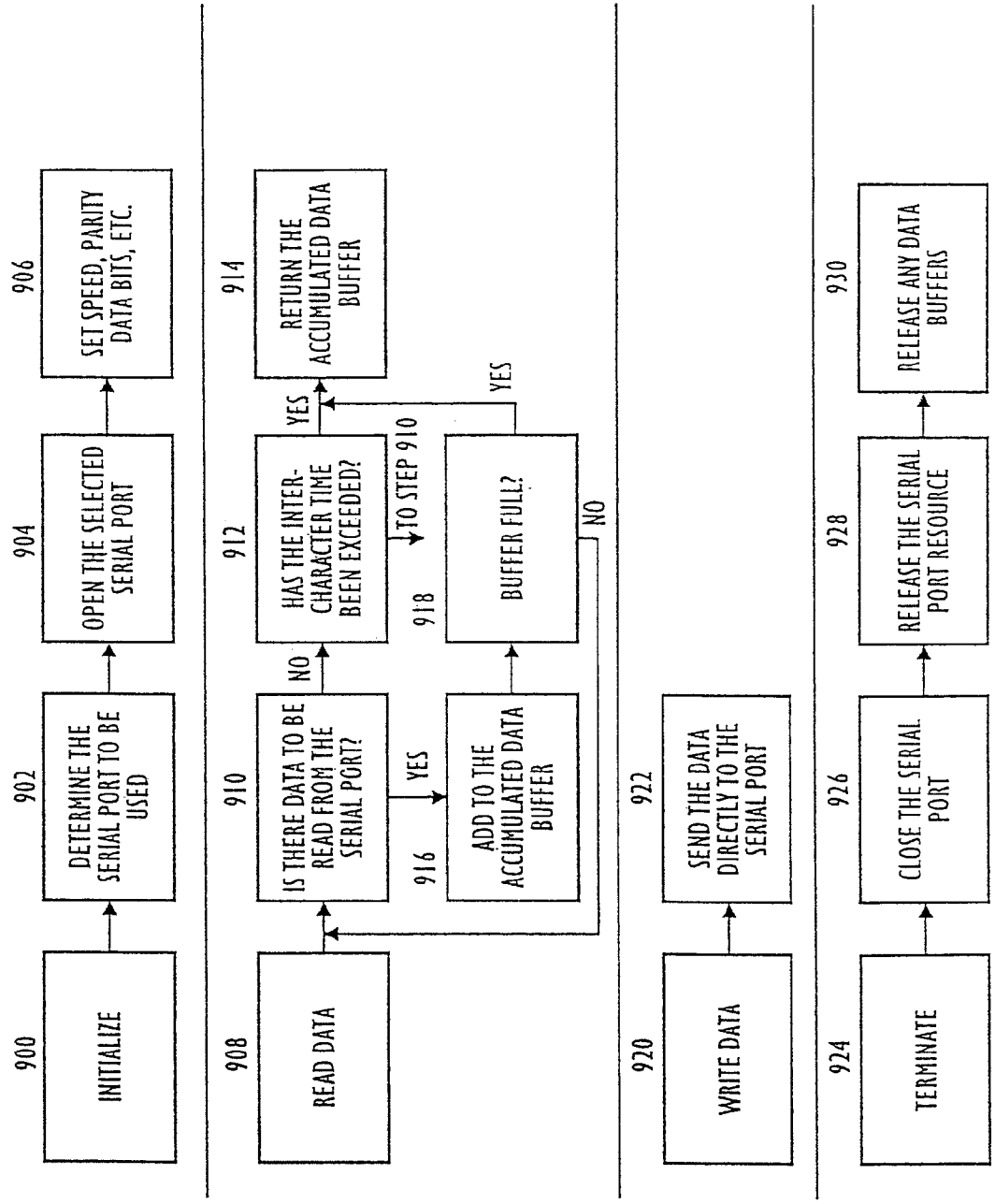
FIGS. 20, 21, 22, 23A, 23B and 24 are flow charts of the various processes associated with a wired communication network interface module associated with the service interface in accordance with the present invention.

Referring now to FIG. 20, there is illustrated an exemplary flow chart of the set of procedures associated with the wired communication network interface module 100 that are designed for transparent asynchronous communication networks. At step 900, an initialization process begins in accordance, for example, with step 802 of FIG. 15. At step 902, the serial port of the wired communication network 10 that is to be used is determined, and the identified port is opened or accessed at step 904. At step 906, the speed (bps), the parity (odd or even), and the data bits for communication with the network 10 are established along with other appropriate parameters.

At step 908 a data read operation begins. The data read routine may be invoked by the outbound data event handler 96 at step 850 (see FIG. 18). Initially, at step 910, the wired communication network interface module 100 determines if there is data to be read from the serial port. If at step 910 the wired communication network interface module 100 determines there is data to be read, then at step 916 the data is added to an accumulated data buffer within the remote network controller 20. At step 918, if the wired communication network interface module 100 determines that the data buffer is full, then at step 914 the data accumulated in the buffer is returned to the calling module. If, however, at step 910 the wired communication network interface module 100 determines there is no data to be read from the serial port attached to the network 10, then at step 912 it is determined if the inter-character time (e.g., a predetermined character receipt delay time) has been exceeded. If at step 912 the inter-character time has been exceeded, then at step 914 the accumulated data buffer is returned to the calling module to be further processed. Otherwise, if the inter-character time has not been exceeded, then processing continues at step 910 so that the wired communication network interface module 100 may again determine if there is data to be read from the serial port.

At step 920, a write data routine is started. The write data routine may be initiated by the inbound data event handler 94 at step 836 in FIG. 17. At step 922, the data is sent directly to the serial port of the wired communication network 10. The write data routine is thereafter completed.

At step 924, a terminate routine is initiated. The terminate routine may be initiated in accordance with a terminate request at step 818 in FIG. 15. In response to initiation of the terminate routine, the serial port of the network 10 is closed at step 926. Thereafter, at step 928, the serial port resource is released so it may be used by another process. Finally, at step 930, any data buffers in use are also released.

Figure 21:
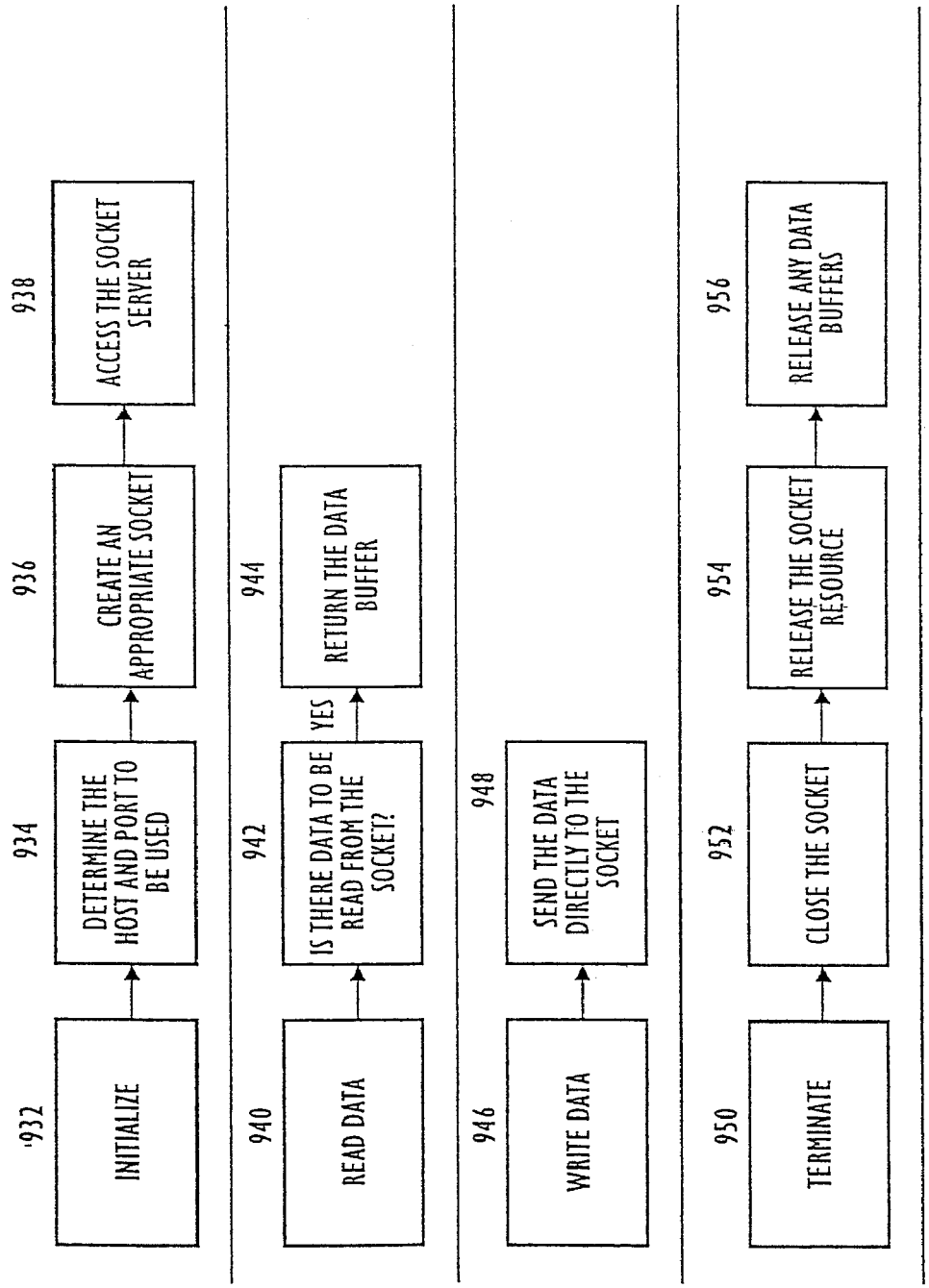

Referring now to FIG. 21, there is illustrated exemplary flow charts of the set of procedures associated with the wired communication network interface module 100 for networks utilizing TCP/IP stream socket connectivity. At step 932, an initialization process begins in accordance, for example, with step 802 of FIG. 15. At step 934, a host network and serial port to be used are determined. At step 936, an appropriate socket is created. At step 938, the socket server is accessed for data transport.

At step 940 a data read operation begins. The data read routine may be invoked the outbound data event handler 96 at step 850 (see FIG. 18). Initially, at step 942, the wired communication network interface module 100 determines if there is data to be read from the socket. If at step 942 the wired communication network interface module 100 determines there is data to be read, then at step 944 the data buffer is returned to the remote network controller 20 for further processing.

At step 946, a write data routine is started. The write data routine may be initiated by the inbound data event handler 94 at step 836 in FIG. 17. At step 948, the data is sent by the wired network interface module 100 directly to the socket at the wired communication network 10. The write data routine is thereafter completed.

At step 950, a terminate routine is initiated. The terminate routine may be initiated in accordance with a terminate request at step 818 in FIG. 15. Initially, the socket is closed at step 952. Thereafter, at step 954, the socket resource is released so it may be used by another process. Finally, at step 956, any data buffers in use are also released.

Figure 22:
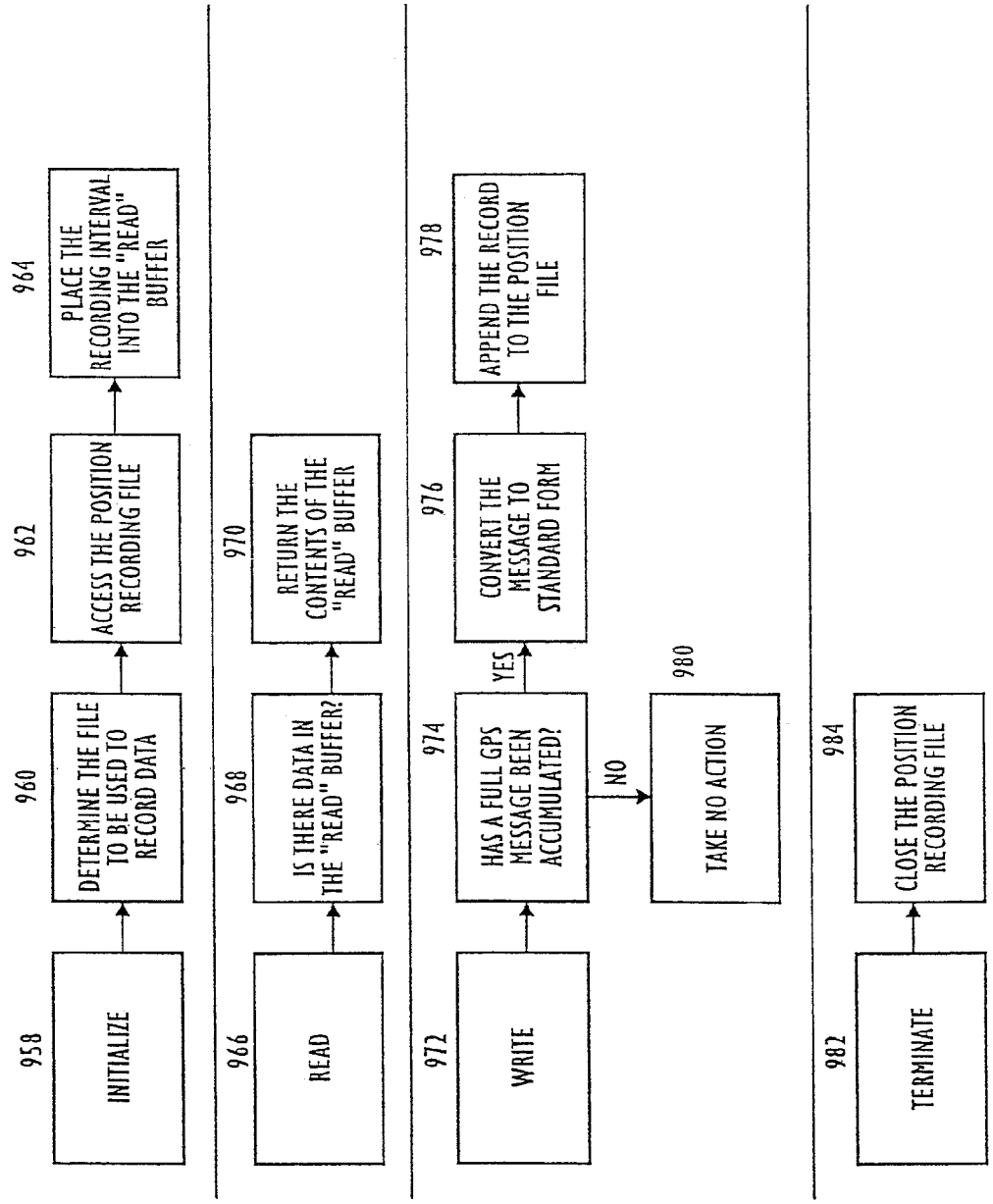

Referring now to FIG. 22, there is illustrated exemplary flow charts of the set of procedures associated with the wired communication network interface module 100 for use with networks utilizing Vehicle Location Reporting Facilities. At step 958, an initialization process begins in accordance, for example, with step 802 of FIG. 15. At step 960 the wired communication network interface module 100 determines a position recording file to be used to record data. The position recording file may be stored within the wired communication network 10. At step 962, the position recording file is accessed from the network 10. Thereafter, at step 964, the recording interval is placed into a read buffer that may be provided to the remote device 52 via the mobile data controller 54.

At step 966 a data read operation begins. The data read routine may be invoked by the outbound data event handler 96 at step 850 (see FIG. 18). Initially, at step 968, the wired communication network interface module 100 determines if there is data in the read buffer. If at step 968 the wired communication network interface module 100 determines there is data in the read buffer, then at step 970 the contents of the read buffer is returned to the calling module.

At step 972, a write data operation is started. The write data routine may be initiated by the inbound data event handler 94 at step 836 in FIG. 17. Initially, at step 974, the wired communication network interface module 100 determines if a full Global Positioning Satellite (OPS) message has been accumulated. If at step 974, the wired communication network interface module 100 determines that a full GPS message has not been accumulated, then no action is taken at step 980. If at step 974, the wired communication network interface module 100 determines that a full GPS message has been accumulated, then the message is converted at step 976 to a standard form usable by the wired communications network 10. At step 978, the position recording file at the host is appended with the GPS message.

At step 982, a terminate routine is initiated. The terminate routine may be initiated in accordance with a terminate request at step 818 in FIG. 15. The terminate routine may comprise closing the position recording file at step 984.

Figure 23A:
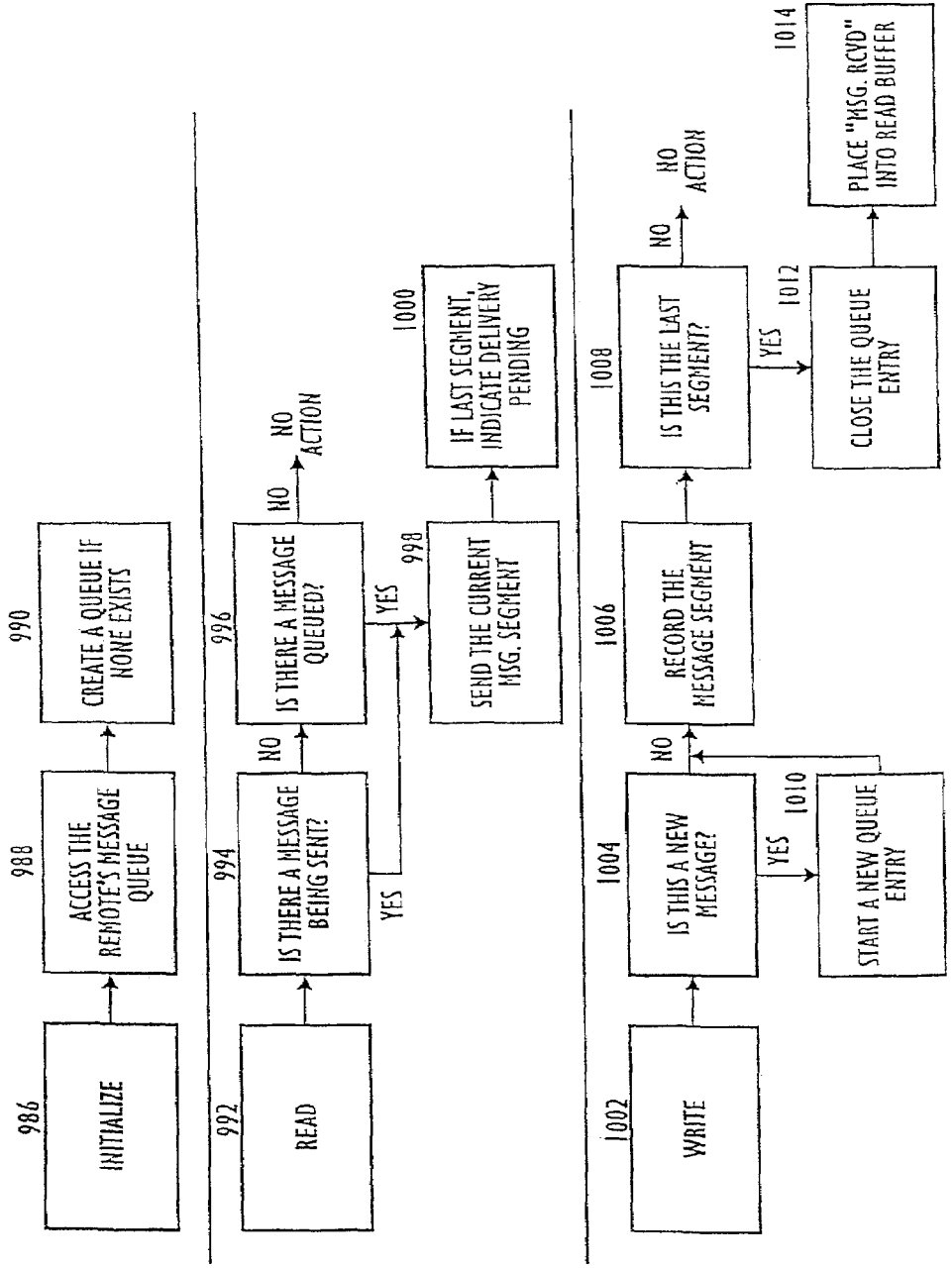
Figure 23B:
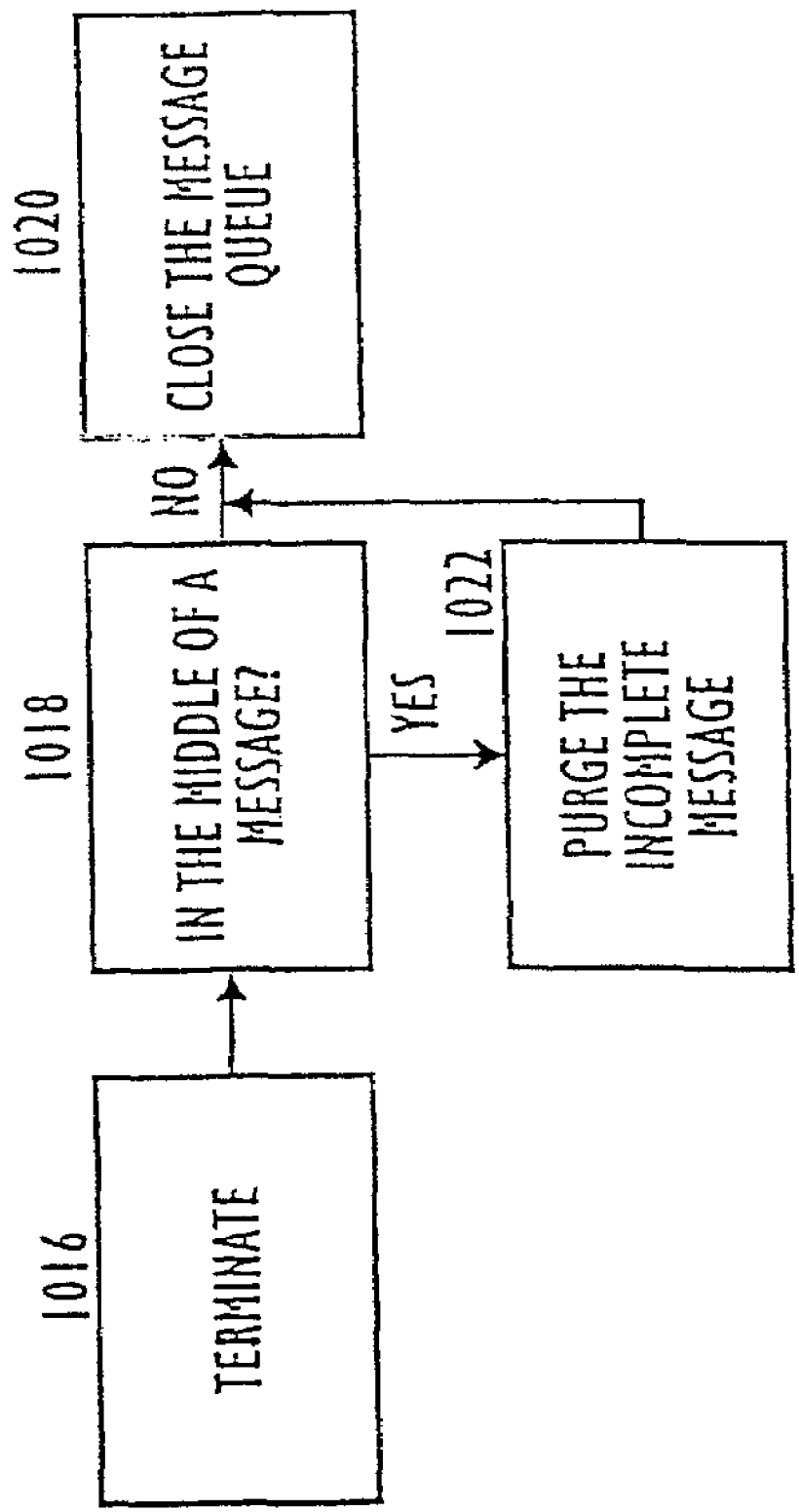

Referring now to FIGS. 23A and 23B, there is illustrated exemplary flow charts of the set of procedures associated with the wired communication network interface module 100 that are designed for networks utilizing Bidirectional Messaging Facilities or Store and Forward Messaging Facilities. Referring to FIG. 23A, at step 986, an initialization process begins. The initialization process may be started in accordance, for example, with step 802 of FIG. 15. At step 988, a message queue for the remote device 52 is accessed. Thereafter, at step 990, if no queue exists for the remote device 52, a message queue is created at the remote network controller 20.

At step 992 a data read operation begins. The data read routine may be invoked by the outbound data event handler 96 at step 850 (see FIG. 18). Initially, at step 994, the wired communication network interface module 100 determines if a message is in the process of being sent. If at step 994 the wired communication network interface module 100 determines that a message is being sent, then at step 998, the current message segment is sent by the remote device 52 to the wired communication network 10. If at step 994 the wired communication network interface module 100 determines that no message is being sent, then at step 996, the wired communication network interface module 100 determines if there is a message queued. If at step 996 the wired communication network interface module 100 determines that no messages are queued then no action is taken. However, if at step 996 the wired communication network interface module 100 determines that there is a message queued for the remote device 52, then the current message queued is sent at step 998. After the last segment of the message is sent, the wired communication network interface module 100 may indicate that delivery of the message is pending to the remote device 52 at step 1000.

At step 1002, a write data routine is initiated. The write data routine may be initiated by the inbound data event handler 94 at step 836 in FIG. 17. Initially, at step 1004, the wired communication network interface module 100 determines if a new message is present. If at step 1004 the wired communication network interface module 100 determines that a new message is present, then at step 1010 the wired communication network interface module 100 starts a new queue entry. Thereafter, processing continues at step 1006, where the message segment is recorded. At step 1008, the wired communication network interface module 100 determines if this is the last segment. If at step 1008 the wired communication network interface module 100 determines that it is the last segment, then at step 1012, the queue entry is closed and "Message Received" message may be placed into the read buffer at step 1014 to be sent to the remote device 52. If at step 1008, the wired communication network interface module 100 determines that it is not the last segment, then no action is taken.

Referring to FIG. 23B, at step 1016, a terminate routine is started. The terminate routine may be initiated in accordance with a terminate request at step 818 in FIG. 15. At step 1018, the wired communication network interface module 100 determines if the terminate request has come in the middle of a message. If at step 1018, the wired communication network interface module 100 determines that the request came in the middle of a message, then the message is purged at step 1022. Processing then continues at step 1020, where the wired communication network interface module 100 closes the message queue.

Figure 24:
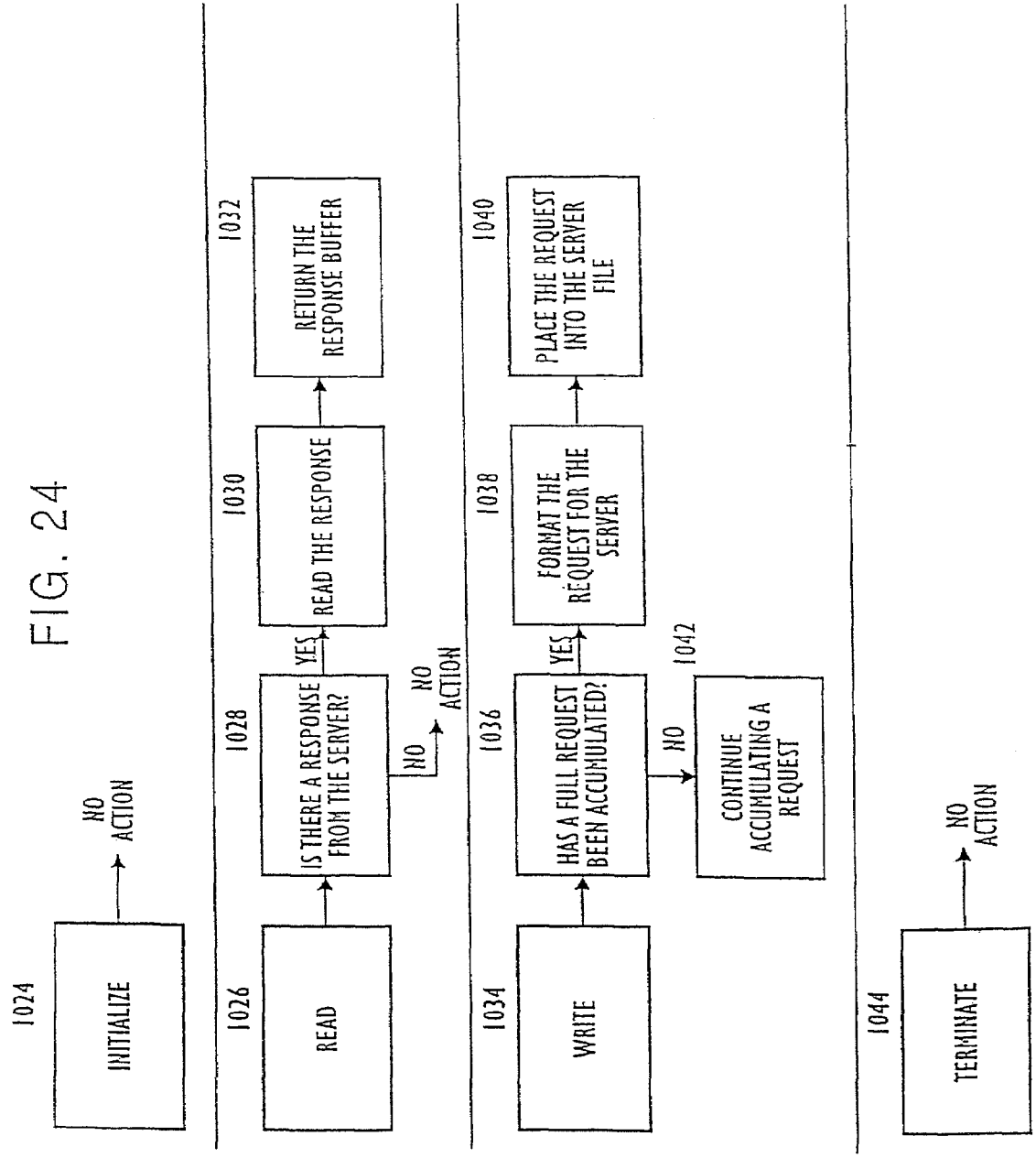

Referring now to FIG. 24, there is illustrated flow charts of the set of procedures associated with the wired communication network interface module 100 designed for use with networks utilizing Credit Card Point-of-Sale Facilities. At step 1024, an initialization process begins. The initialization process may be started in accordance, for example, with step 802 of FIG. 15. In accordance with the invention, no action is required for the initialization procedure.

At step 1026 a data read operation begins. The data read routine may be invoked the outbound data event handler 96 at step 850 (see FIG. 18). Initially, at step 1028, the wired communication network interface module 100 determines if there is a response from a server attached to the wired communication network 10. If at step 1028 the wired communication network interface module 100 determines there is a response from the server, then at step 1030 the response is read, and the response buffer is returned to the remote device 52 at step 1032. If at step 1028 there is no response from the server, then no action is taken.

At step 1034, a write data operation is started. The write data routine may be initiated by the inbound data event handler 94 at step 836 in FIG. 17. At step 1036, the wired communication network interface module 100 first determines if a full request by the remote device 52 has been accumulated. If at step 1036 the wired communication network interface module 100 determines that a full request has not been accumulated, then the remote device 52 continues to accumulate a request at step 1042. If at step 1036 a full request has been accumulated, then at step 1038, the request is formatted for the server on the wired communications network 10. Thereafter, the request is placed into the server file at step 1040.

At step 1044, a terminate routine is illustrated. The terminate routine may be initiated in accordance with a terminate request at step 818 in FIG. 15. According to the present invention, no action is necessary for the terminate routine.

Figure 25:
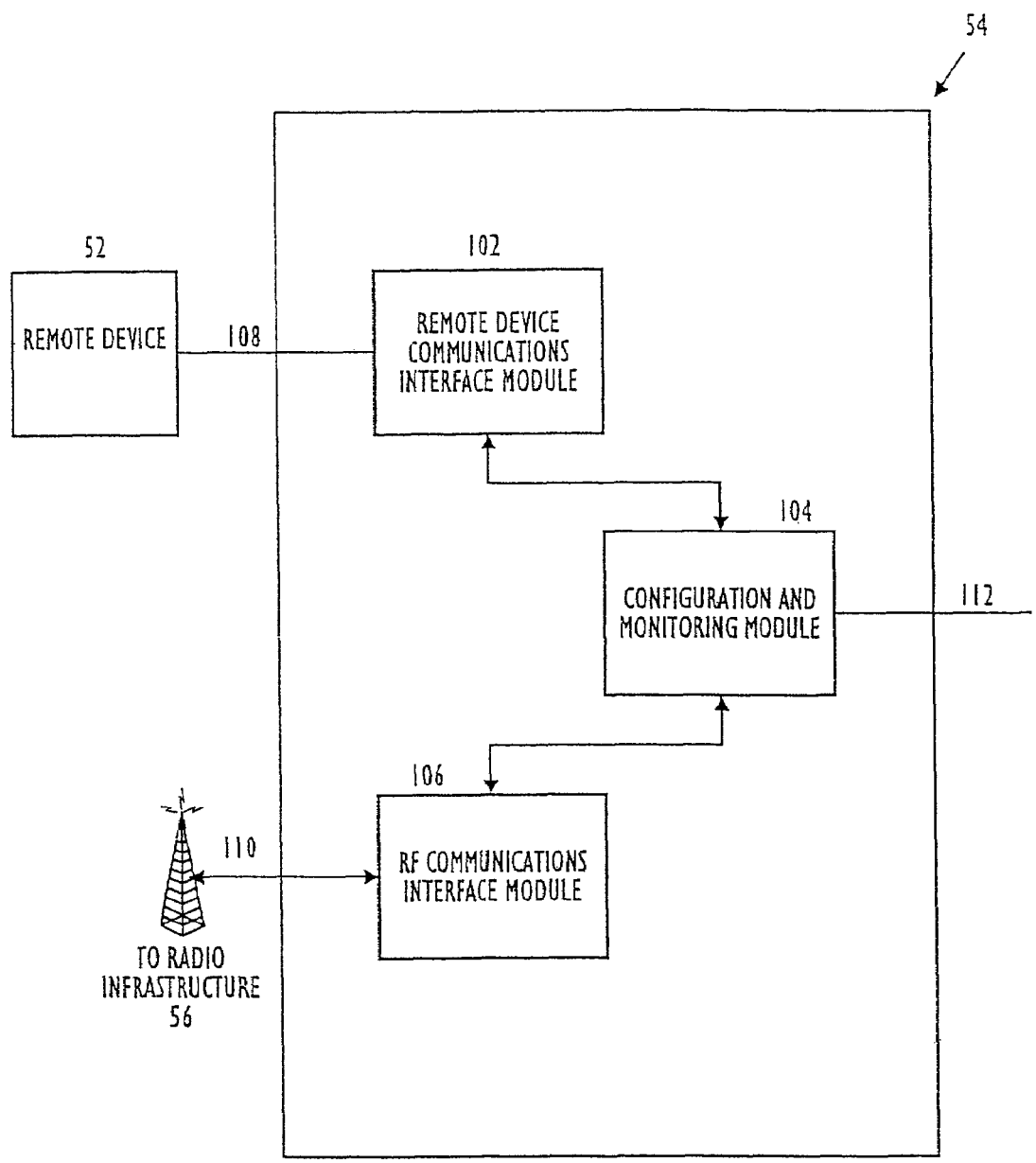
FIG. 25 is a block diagram of the various components of a mobile data controller of the present invention.

Referring now to FIG. 25, there is illustrated a block diagram of the various components of the mobile data controller 54, according to another aspect of the present invention. The mobile data controller 54 may be specifically designed to match the asynchronous data transferred to and from the remote device 52 to the radio infrastructure 56 protocol. Typically, there is one type of mobile data controller 54 that is associated with a host data controller 22 which is connected to the mobile interface 24 of the remote network controller 20. In addition, the mobile data controller 54 may have a unique identifier associated with it for routing purposes.

In accordance with the present invention, the mobile data controller 54 may be implemented by any combination of hardware and software. For example, the mobile data controller 54 may comprise a commercially available processor with overlying software and random access memory. The software running in the mobile data controller 54 may be written in Z80 or other appropriate processor-based (i.e., native) assembly language and configured to the specific radio infrastructure 56. The software may specify the various voltage levels and logic signals necessary to communicate via the RF communications infrastructure 56. As noted above, the mobile data controller 54 may translate and pass any protocols associated with the wired communications network 10 to and from the remote device 52 to make it appear to the wired communication network 10 that the remote device 52 is locally-attached.

The mobile data controller 54 is configurable over the radio infrastructure 56. configuration information may be input by an operator at the remote network controller 20 through the console interface 34 (see FIG. 2) and passed over the radio infrastructure 56 to the mobile data controller 54. This allows parameters such as packet size to be changed at the host wired communications network 10 without the necessity of altering the mobile data controller 52 in the field.

As shown in FIG. 25, the mobile data controller 54 may comprise an RF communications interface module 106, a remote device communications interface module 102, and a configuration and monitoring module 104. The mobile data controller 54 may be connected to the remote device 52 via a communication port 108 for sending and receiving data. The remote device communications interface module 102 is connected to the remote device 52 via the communication port 108 and is responsible for sending data to, and receiving data from, the remote device 52. The communication port 108 may comprise, for example, an RS-232 adapter.

The configuration and monitoring module 104 is specific to the type of radio infrastructure 56 employed. Software parameters, such as the number of subsystem ports, how often to send health and status requests, and a list of host data controllers 22 to which the mobile data controller 54 can communicate, may be set and stored in the configuration and monitoring module 104. The configuration and monitoring module 104 can also accumulate statistics which are passed to the host data controller 22.

In order to diagnose potential system errors in the mobile data controller 54, an operator may be provided with the ability to field test and analyze the mobile data controller via an external diagnostic port 112 to determine a cause of the system error or failure. The diagnostic port 112 may be used not only to determine if the mobile data controller 54 is operational, but also can be used to configure software parameters to determine the type of the radio infrastructure 56. These parameters can be changed to communicate with a different type of radio infrastructure 56 as necessary.

The RF communications interface module 106 is responsible for sending and receiving the data via radio-frequency (RF) transmission. The RF communications interface module 106 is specific to the radio infrastructure 56 used, and is connected to the radio infrastructure 56 through a communication line 110. Because the mobile data controller 54 is designed to integrate with an existing radio infrastructure 56, each mobile data controller 54 may be software configured, for purposes of flexibility, to work with many types of radio infrastructure 56 protocols. The RF communications interface module 106 may also send health and status information regarding the mobile data controller 54 to the host data controller 22. This information may inform the remote network controller 20 that the mobile data controller 54 is operational and the remote device 52 is accepting data.

According to the present invention, the RF communication interface module 106 may include a commercially available modem (not shown). The modem may be selected depending on the data rate(s) of the communication line 100 and the radio infrastructure 56. More than one modem may be provided if multiple data rates are required. Optionally, the modem can be implemented using a Digital Signal Processing (DSP) chip and associated software. The DSP chip can be a commercially available programmable signal processing chip. In such a case, the DSP implementation will allow a single modem to be changed (e.g., by uploading new parameters to the DSP software) in order to communicate with a plurality of different types of radio infrastructures 56 having distinct protocols and data rates.

Similar to the host data controllers 22, the mobile data controllers 54 may be compatible with, for example, conventional point-to-point radio systems, conventional repeater-based radio systems, LTR Trunking, Motorola Trunking, Ericsson (EDACS) Trunking-Voice Path, EDACS RDI Trunking-Data Path, and EDACS IMC Voice Path based radio infrastructures 56.

Referring again to FIG. 2, a brief description of the interprocess communications manager 28 will be provided. According to the present invention, the interprocess communications manager 28 is responsible for routing all communication between the various modules and interfaces within the remote network controller 20. The interprocess communications manager 28 creates a logical route from the remote device 52 to the service interface 30 of the remote network controller. The interprocess communications manager 28 passes routing information which determines from which radio infrastructure 56 and remote device 52 the inbound data has come from, and to which radio infrastructure 56 and remote device 52 the outbound data will be sent.

The interprocess communications manager 28 may also pass information generated by the remote network controller 20, which is independent of the data and routing information. This information may include internal parameters and error detection codes. The interprocess communications manager 28 also interfaces with the control process module 26. The control process 26 may act as the "central hub" of the remote network controller 20. The control process 26 provides resource management, process management, session management, configuration management and system statistics management within the remote network controller 20.

As further shown in FIG. 2, the remote network controller 20 also includes a console interface 34. The console interface 34 may be adapted to allow a network operator to configure and control the wireless Network Interfaces described above, the mobile user characteristics and the configuration information of the wired communications network 10. The console interface 34 may be a stand-alone platform having a commercially available processor (e.g., an Intel or Motorola based processor) and an Ethernet controller card for communicating, for example, with another remote network controller 20.

Figure 26:
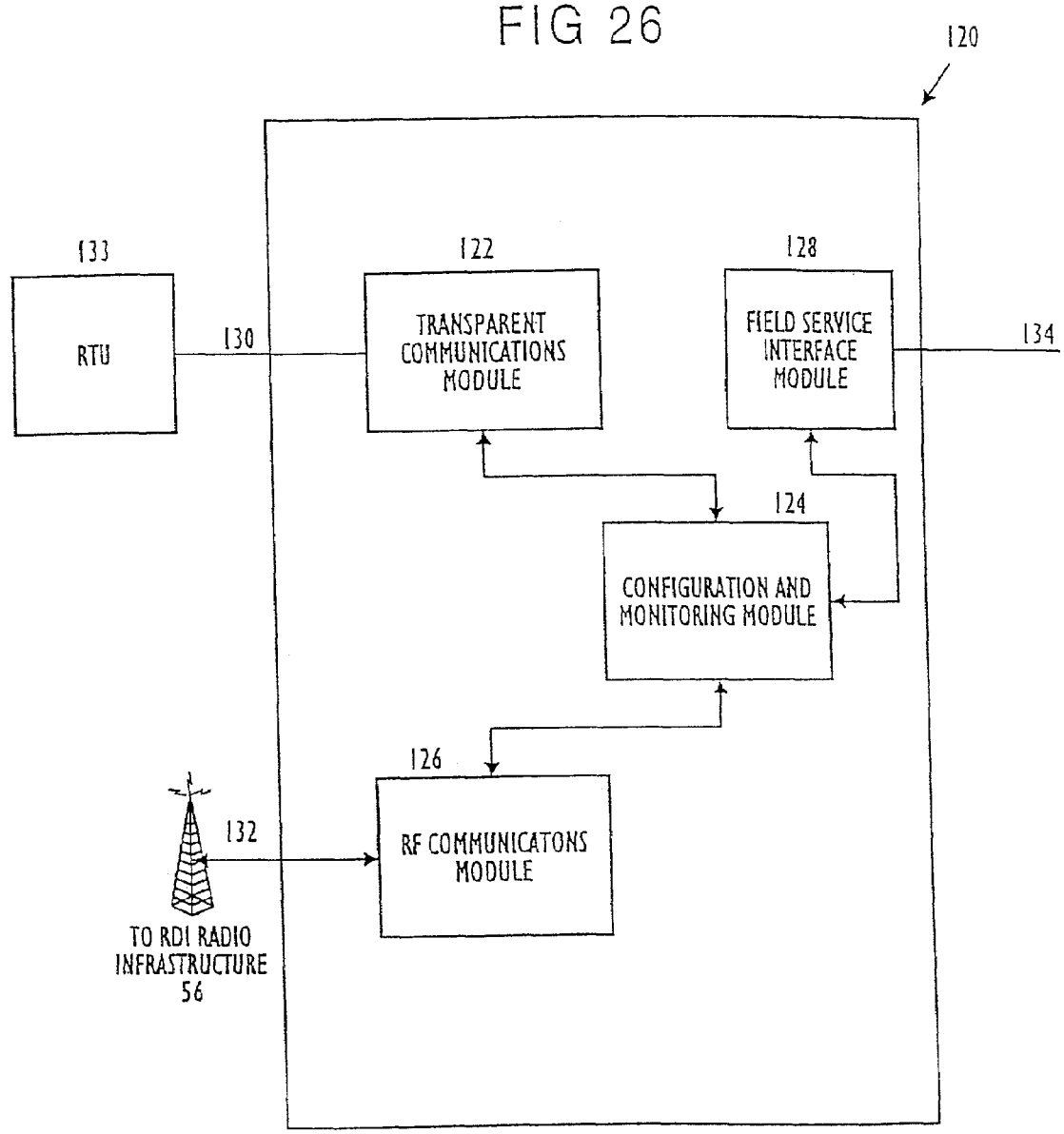
FIG. 26 is a block diagram of the various components of a remote gateway according to another aspect of the present invention.

Referring now to FIG. 26, there is illustrated a remote gateway 120, in accordance with another aspect of the present invention. As shown in FIG. 26, the remote gateway 120 is comprised of a transparent communications module 122, a field service interface module 128, a configuration and health module 124 and a RF communications module 126. The remote gateway 120 is functionally similar to the mobile data controller 54. However, the remote gateway 120 is a specific type of mobile data controller that may be used to attach to a remote telemetry unit for monitoring, for example, electrical power distribution.

The transparent communications module 122 is responsible for communicating with a terminal device, typically a Remote Telemetry Unit (RTU) located in the field, and accepts data from the RF communications module 126. As shown in FIG. 26, the transparent communications module 122 may be connected to a RTU 133 via a communication line 130. The transparent communications module 122 does not recognize any protocol, but handles hardware flow control and buffering and packetizing. Data communication between the transparent communications module 122 and the RTU 133 may be carried through asynchronous serial transfer.

The RF communications module 126 is configured to communicate with the remote network controller 20 using whatever protocol is required for data transport over the radio infrastructure 56. The RF communications interface module 126 interfaces with the radio infrastructure 56 in a similar manner as previously described above with regard to the RF communications interface module 106. The RF communications interface module 126 accepts data from the transparent communications module 122 and delivers it to the radio infrastructure 56 for transmission to the remote network controller. The RF communications interface module 126 detects collisions with inbound RF data and restarts outbound transmissions. The RF communications interface module 126 performs error/retry functions and notifies the transparent communications module 122 of successes or failures.

The field service interface module 128 allows a technician to field test the remote gateway 120 and troubleshoot the remote gateway should a system error or problem arise. An external diagnostic port 112 connected to the field service interface module 128 may be provided for this purpose. The field service interface module 128 may interact with the configuration and health module 124 to query, set, and reset local configuration of the remote gateway 120.

The configuration and health module 124 may accept configuration information from the remote network controller 20 via the radio infrastructure 56 and adjust the operating parameters of the remote gateway 120 accordingly. The configuration and health module 124 may also monitor and determine if the RF communications module 126 has successfully transmitted a packet of information to the host data controller 22 by analyzing the data stream. If a packet of information has not been successfully transmitted, the configuration and health module 124 may direct the RF communications module 126 to resend the packet of information to the host data controller 22.

Figure 27:
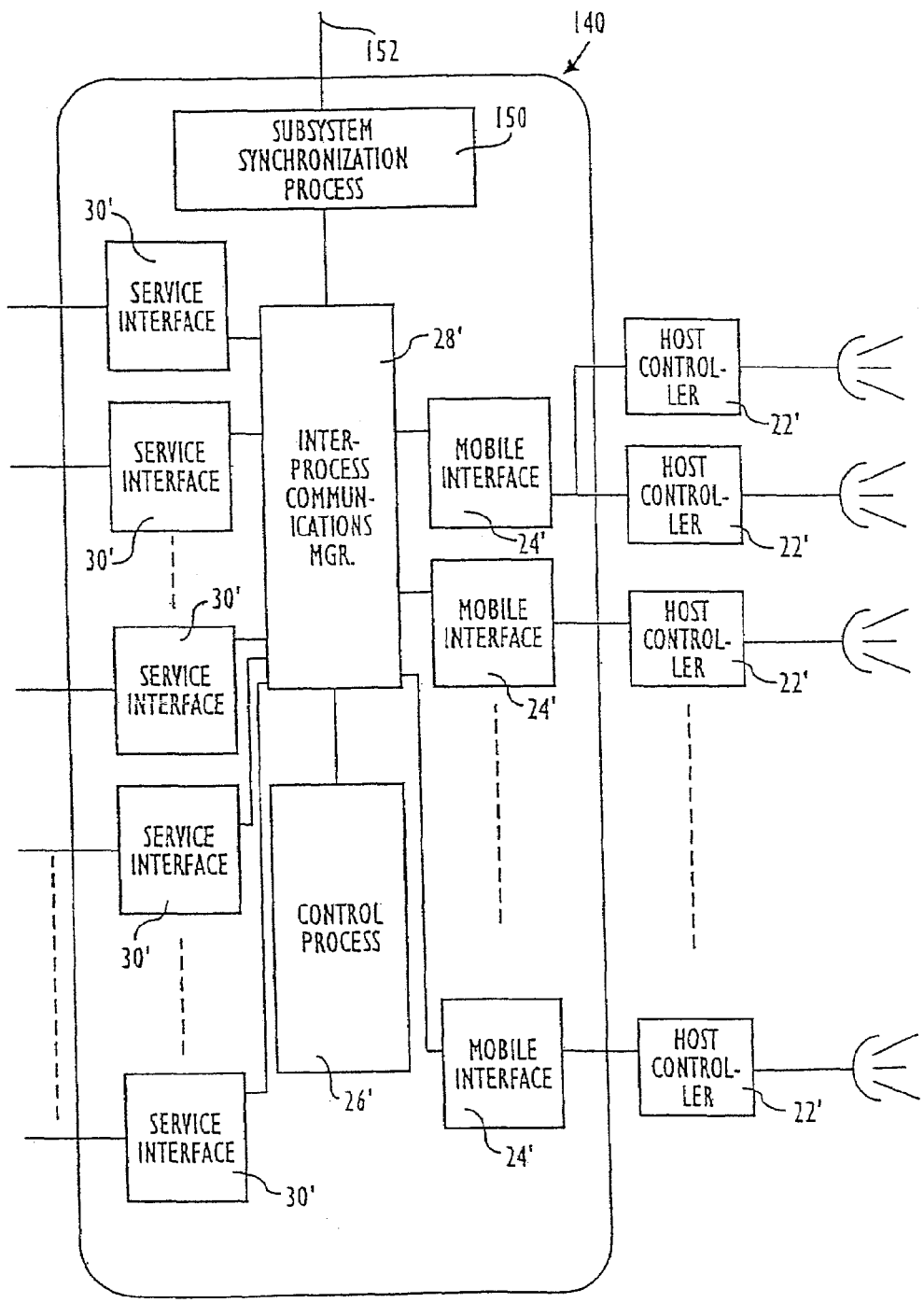
FIGS. 27 and 28 illustrate a block diagram of a remote network controller in accordance with still another aspect of the present invention, in which a subsystem synchronization process module is utilized.
Figure 28:
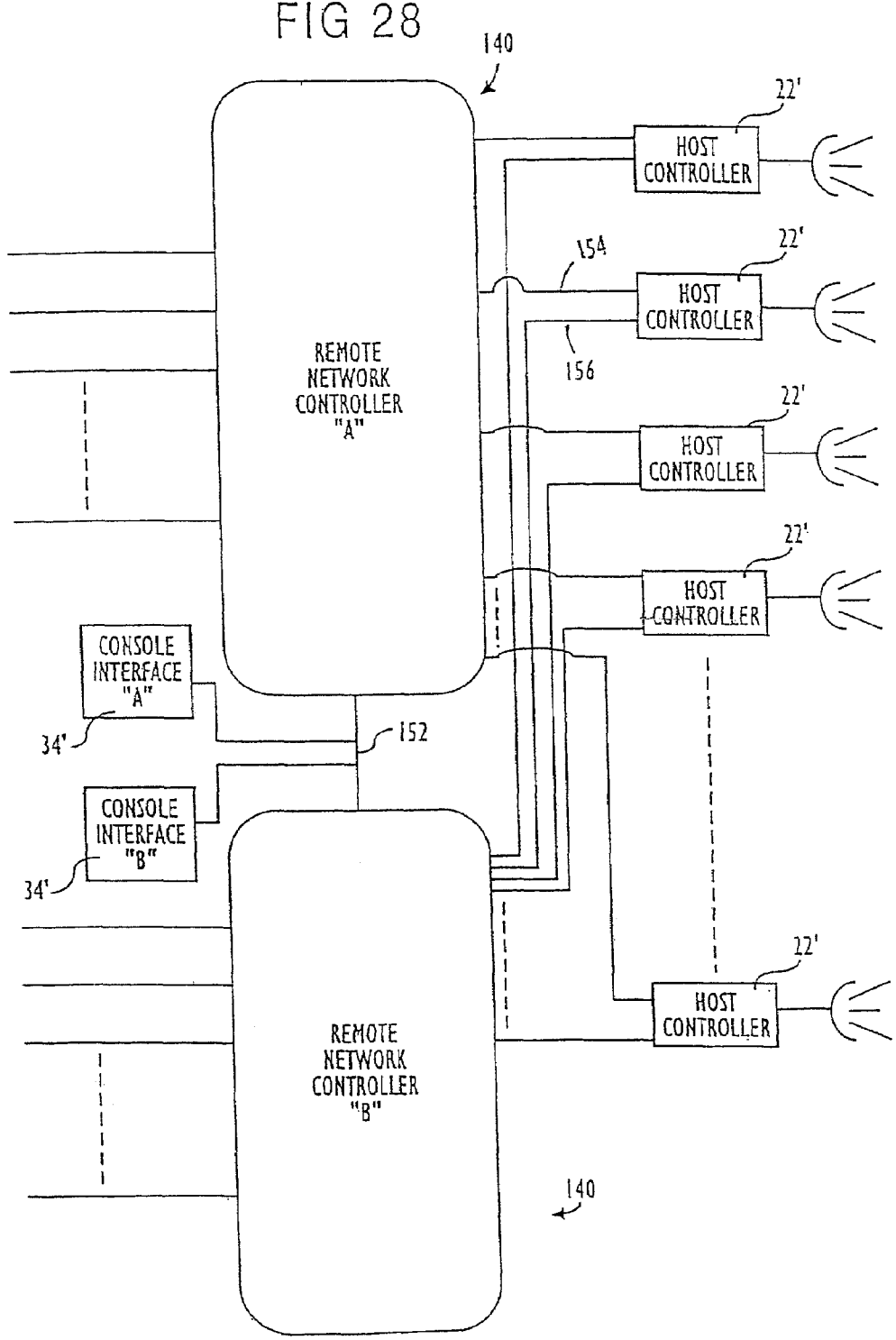

Referring now to FIGS. 27 and 28, there is illustrated a block diagram of an integrated remote network controller 140 according to another aspect of the present invention. The components of the remote network controller 140 that are similar to that discussed above with respect to FIG. 2 are designated with the same reference numeral and also with a prime ("'") added thereto.

As shown in FIG. 27, the remote network controller 140 according to another aspect of the present invention may include one or more service interfaces 30', an interprocess communications manager 28', a control process 26', one or more mobile interfaces 24', and a subsystem synchronization processor 150 which is used to link one or more remote network controllers 140 together (see FIG. 28). As further shown in FIG. 27, one or more host data controllers 22' are connected to the mobile interfaces 24' and provided externally to the remote network controller 140. The number of host data controllers 22' and mobile interfaces 24' may be dependent on the number of radio infrastructures 56 present. In addition, the number of service interfaces 30' may be dependent on the number and type of wired communications networks 10 present.

According to an aspect of the present invention, two remote network controllers 140 may be linked by a local network 152 (see FIG. 28). This configuration provides a redundant system which insures greater reliability of communication between the remote device 52 and the wired communications network 10. For example, should any particular component fail, such as a host controller 22' or an interprocess communications manager 28', the remote device 52 can still communicate with the wired communication network 10 because of the redundancy of the components of the remote network controllers 140 provided.

There are two main implementations of this system according to the present invention. With the first implementation, only one of the remote network controllers 140 is operating at any given time. Should the operational remote network controller 140 fail, the other remote network controller 140 may immediately take its place. For example, if remote network controller "A" fails, then remote network controller "B" may be activated to take its place.

Under the second implementation, a distributed processing scheme is utilized and both of the remote network controllers 140 are operated at the same time. According to the distributed processing scheme, the processing load (e.g., event handling and data transfer) may be distributed among the operational remote network controllers 140. Should a particular remote network controller 140 (e.g., controller "B") fail, the remaining operational remote network controller 140 (e.g., controller "A") will handle the entire processing load.

The above-mentioned distribution of the processing load is generally a junction of the radio infrastructure 56, and not the processing capacity of the remote network controllers 140. This is because performance increases are mainly based on the number of available communications channels, rather than the raw processing capability of the remote network controllers 140 attached to the wired communications network 10. For example, if the radio infrastructure 56 is a trunking radio network with five channels, it is possible for all five channels to be simultaneously allocated and used by the remote network controllers 140. On the other hand, if there is only one channel available in the radio infrastructure 56, then only one remote network controller 140 can access the radio infrastructure 56 at a time; as a result, no performance gain may be realized by employing multiple remote network controllers 140 when only limited channels are available.

As illustrated in FIG. 28, the local network 152 is used to connect the remote network controllers 140 together. The local network 152 may be, for example, an Ethernet local area network. Each of the remote network controllers 140 includes a subsystem synchronization process module 150 that is connected to the local network 152. Two separate console interfaces 34' may also be attached to the local network 152. Each console interface 34' may be attached to the local network 152 to allow an operator to configure and control a particular remote network controller 140.

The subsystem synchronization process module 150 may be implemented through any combination of hardware and software and is responsible for keeping track of all routing tables and health and status information associated with both of the remote network controllers 140. Each subsystem synchronization process module 150 is connected to an interprocess communications manager 28' of one of the remote network controllers 140 and may access all routing tables and health and status information with respect to the remote network controller from the interprocess communications manager. The health and status information and routing tables may be periodically updated based on the status of and events present at the remote network controller 140. The periodically updated health and status information and routing tables may then be shared with the other subsystem synchronization process module 150 via the local network 152 so that the tables and information associated with both of the remote network controllers 140 is maintained in each of the subsystem synchronization process modules 150. Since the tables and information are periodically updated, a synchronization routine may be provided so that the information and tables are sent to the respective subsystem synchronization process modules 150 at predetermined intervals. If a particular subsystem synchronization process module 150 does not send or receive the tables and information, or if a particular subsystem synchronization process module 150 sends information indicating that one of the remote network controllers 140 has malfunctioned, the other subsystem synchronization process module 150 may reroute any existing connections to the host data controllers 22' and to the wired network 10 of the malfunctioning remote network controller 140 to the remaining operational remote network controller 140.

As further shown in FIG. 28, the host data controllers 22' have two ports, 154 and 156, that are connected to a different remote network controller 140. As in FIG. 2, the remote network controller 140 communicates to the host data controller 22' and sends health and status information through the ports. If the host data controller 22' does not receive information that one of the remote network controllers 140 is operational, the host controller 22' can switch ports, e.g., from port 154 to port 156, in order to communicate with the other remote network controller 140.

While the invention has been described with references to several exemplary embodiments, it is understood that the words which have been used herein are words of description and illustration, rather than words of limitation. Changes may be made, within the purview of the appended claims, without departing from the scope and spirit of the invention in its aspects.

For example, although FIG. 28 only shows two remote network controllers 140 that are connected by a local network 152, it is possible to connect two or more remote network controllers by the local network 152 to provide increased redundancy. In addition, a plurality of local networks 152 may be provided to connect the remote network controllers. Other modifications to the present invention may include selectively processing inbound and outbound data in a different logic order and/or by different components. In accordance with such a modification, processing functions may be performed only by the control process, or in the interprocess communication manager. Another application may be combining the mobile interface with a host data controller, and placing the integrated unit within the remote network controller.

Figure 29:
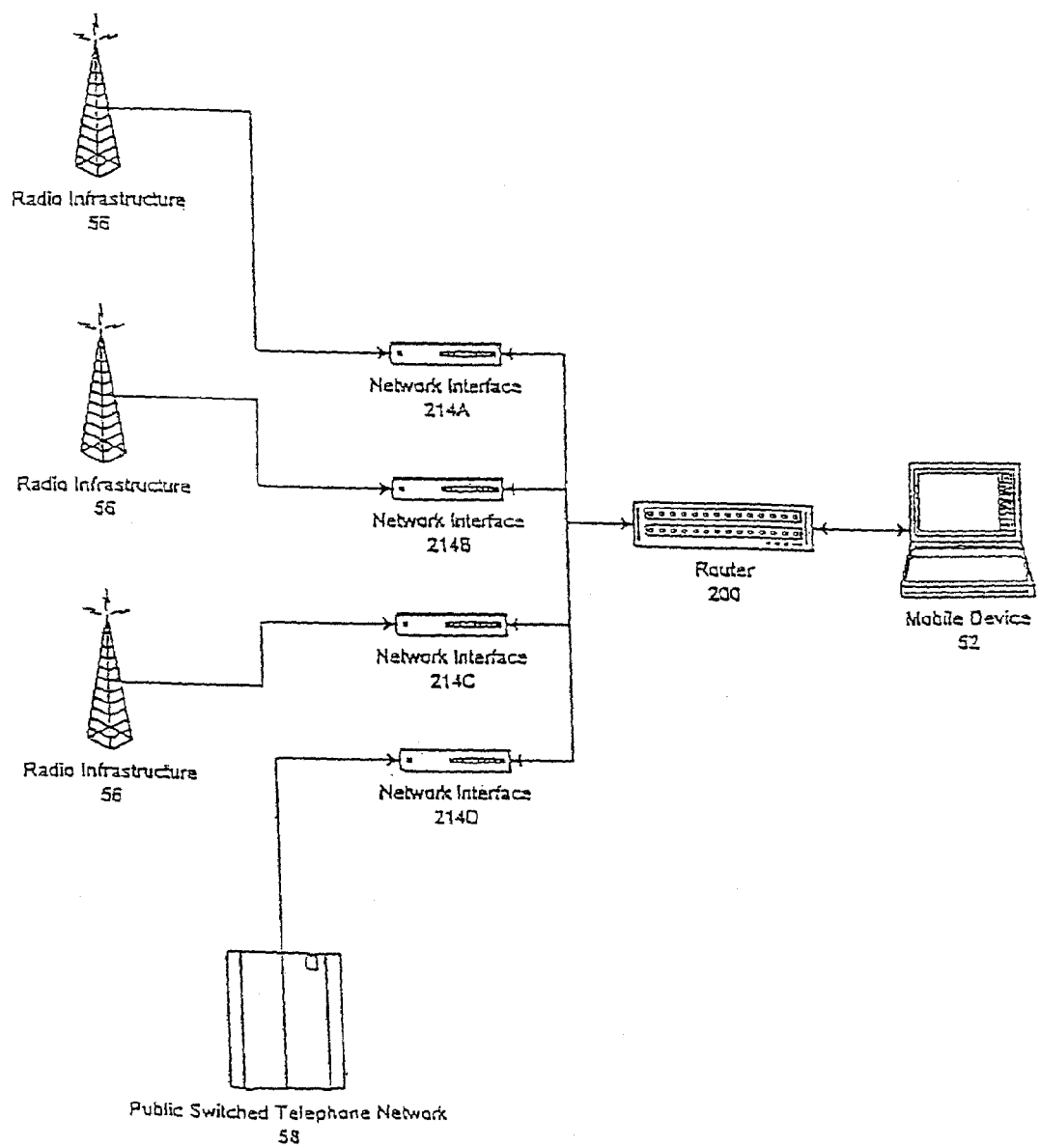
FIG. 29 illustrates a general overview of another embodiment of the present invention which includes a mobile router in accordance with an aspect of the present invention.

Referring now to FIG. 29, therein is illustrated a general overview of another embodiment of the present invention which includes a mobile Router 200 in accordance with an aspect of the present invention. The Router 200 provides the mobile application or device 52 with the capability to selectively transmit and receive data over a plurality of radio frequency infrastructures 56 and/or the public switched telephone network 58 in accordance with user configured parameters.

Figure 30:
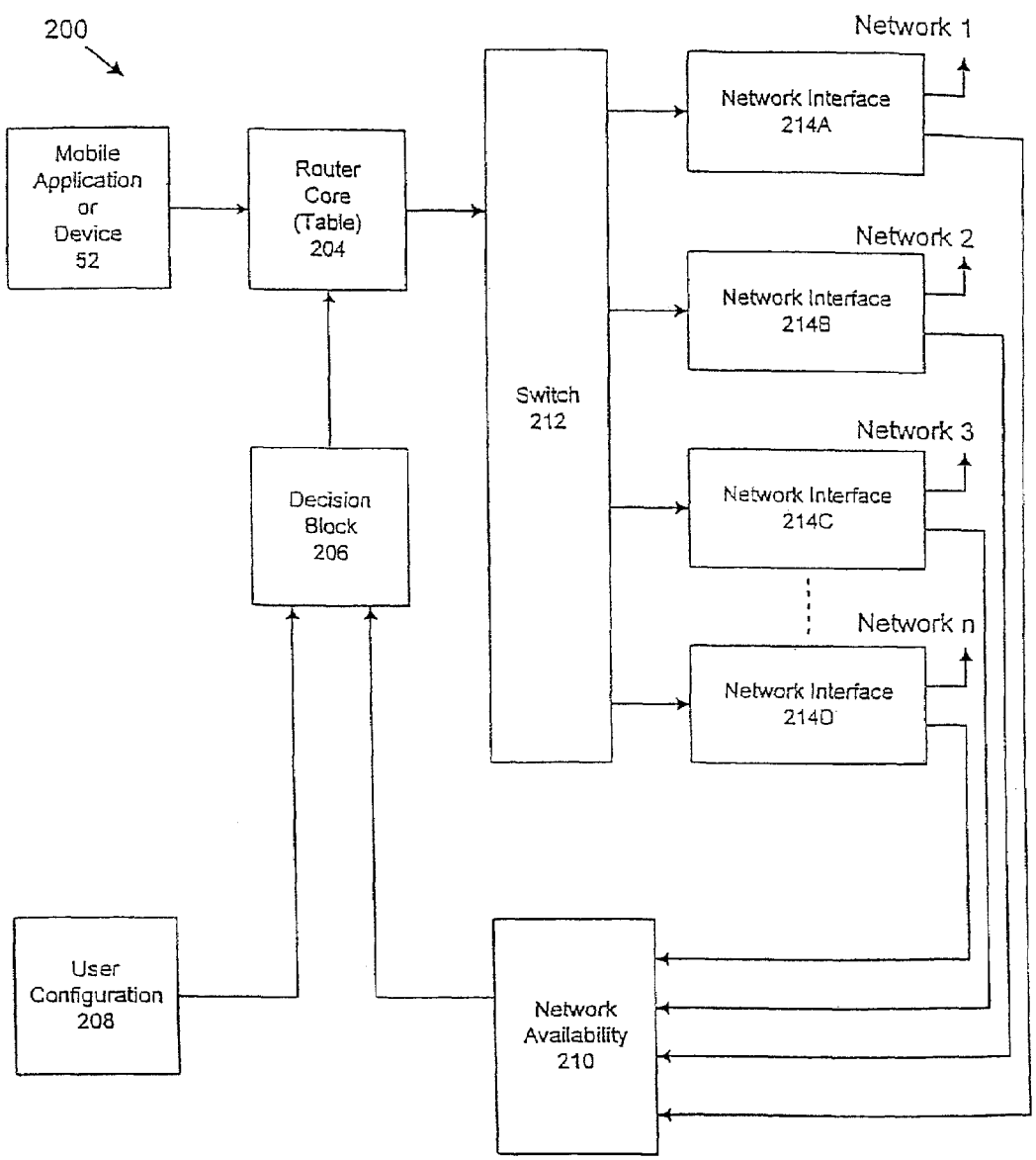
FIG. 30 illustrates a schematic block diagram of the mobile router in accordance with an aspect of the present invention.

Referring now to FIG. 30, therein is illustrated a schematic block diagram of the mobile Router 200. In the following description of the Router 200, each of the elements will be initially generally described and in greater detail thereafter. As shown in FIG. 30, the mobile application or device 52 may be attached to multiple Networks by the Router 200 through Network Interfaces 214A-D, a Router Core 204, and a Switch 212. The Network Interfaces 214A-D provide connectivity for data between the Switch 212 and the various Networks infrastructures (e.g., radio infrastructures 56 and public switch telephone network 58) through which the mobile device or application 52 connects to the communications network 10 (see FIG. 1). The Switch 212 is actuated by the Router Core 204, and sends data to a fixed host application or device (e.g., RNC 20) via the selected network. The Network Interface 214 provides information to the Network Availability process 210, which sends this information to the Decision process 206. The Decision process 206 operates in accordance with User Configured parameters 208 which specify when and through which Network the data is to be transmitted. The decision process 206 monitors the User Configuration parameters 208, and the Network Availability 210. When the Decision process 206 (in accordance with User Configuration 208 parameters) specifies that a Network (e.g., Network 3) different than the Network currently in use (e.g., Network 1) should be used, the Decision process 206 checks the Network Availability 210 for the particular Network to be switched to. If the Network is available, the Decision process 206 instructs the Router Core 204 to switch to the new Network. The Router Core 204 then updates routing tables (not shown) maintained within the Router Core 204 to reflect the new data path, and actuates the Switch 212 to connect to the new Network. Data may then flow over the new Network. In accordance with an aspect of the present invention, data may flow inbound to the fixed host through one Network, and outbound to the remote mobile Application or device 52 through the same Network, or through a different Network.

With reference to FIG. 30, the mobile application or device 52 may comprise a software application running on a portable or laptop computer performing a variety of functions as programmed by the software application (e.g., database services). The Application or device 52 may also comprise a special purpose device designed to perform a particular function, such as a credit card reader or barcode scanner. The Application or device 52 may generate a data stream which is sent to a fixed location (e.g., a host computer infrastructure 10).

An exemplary application running on the mobile device 52 is a mobile remote client application which provides the remote user with the capability to send and retrieve data from a fixed database server application. The data may consist of customer records which, for example, may be used by service personnel operating a fleet of vehicles to service customers scattered about a wide geographic area. In the exemplary application, the mobile client application may request customer records from the fixed database server, and display the records for viewing by mobile service personnel. The mobile client application may send updated records to the fixed database as the service personnel finish assigned tasks. The updated records may contain a service history, equipment upgrades, and repairs for each customer.

Another exemplary application running on the mobile device 52 may be a client application which retrieves a list of dispatched jobs to be performed by the service personnel during each day. The jobs may be uploaded to the remote mobile device 52 each morning and stored in another client application in the mobile device 52. As the service personnel change job locations, the status of each job may be updated to indicate a status, e.g., en route, arrived and finished with comments. The status may be sent from the application to the fixed home office, so a dispatcher at the home office is aware of the locations of service personnel in the field.

By way of non-limiting examples, the mobile device 52 may comprise a portable or laptop computer; a computer having an embedded Router 200; a terminal or terminal emulator; a data gathering device (e.g., a SCADA system or remote telemetry system for obtaining data from a remote location for forwarding to a central location for processing); a card-swipe reader device (e.g., credit/debit/bank cards) for use in a mobile billing application, such as a taxi or mobile food cart; a smart-card reader; a logging device, such as those used in a package delivery system or fleet; a device for reading bar codes (e.g., for inventory control); and a remote application with data to send or to receive, from a fixed application or device (e.g., remote diagnostic tool). The above-noted applications are provided merely for exemplary purpose, and other applications and mobile devices 52 may be used with the Router 200 of the present invention.

Typically the device or Application 52 sends and receives data using a variety of protocols (e.g., Internet Protocol (IP)/transparent (via MDC 54)/ack-nack, etc.). The use of a variety of protocols provides for open transport of data throughout many networks, and in particular, networks which support open standards such as IP. However, many proprietary networks which require interface and/or protocol translation remain in use. In the Router 200 of the present embodiment, the function of interfacing with networks and protocol translation may be performed by the Network Interfaces 214A-D.

According to another aspect of the invention, other types of devices may be connected to the Network Interface 214. Such devices may be used for functions other than data and voice communication. By way of non-limiting examples, these devices may include Global Positioning System (GPS) receivers and application processors.

The Router Core 204 is a function which shuttles messages between the Application or Device 52 and the various Networks. In accordance with the present embodiment, the router Core 204 may control which network of a plurality of usable network messages are to travel over, and connect access ports (described below) to each Network and the Application or Device 52.

The Router Core 204 may also comprise a list of all possible "names" or "addresses" to which data may be sent, or from which data may be received. The local "names" or "addresses" of the Router Core 204 are stored in tables within a memory (not shown) of the Router Core 204. Thus, the Router Core 204 may serve as a communications "address book" for the Router 200 of the present embodiment. The Router Core 204 also checks all messages passing through, and decides, based on the address and/or name entries in the tables, if the message is relevant to the attached Application or Device 52, or to the fixed host (e.g., RNC 20). The address of the fixed host may be stored in the Router Core table as well. In accordance with the table entries, received messages may be determined to be valid or invalid. The Router Core 204 may also actuate the Switch 212 in accordance with the output of the decision process 206. The Switch 212 is actuated such that incoming and outgoing messages can be sent through the "current" network, as determined by the decision function 206 (to be described below).

The Switch 212 may comprise a message multiplexor, i.e., the Switch 212 performs a one-to-many function for in-bound messages (to the fixed hosts), and a "many-to-one" function for outbound messages (from the fixed host). As noted above, the appropriate network selection is made by the Router Core 204 in accordance with the output of the decision process 206. Messages travel through the Switch 212, the Router Core 204, and the current Network Interface 214.

Figure 32:
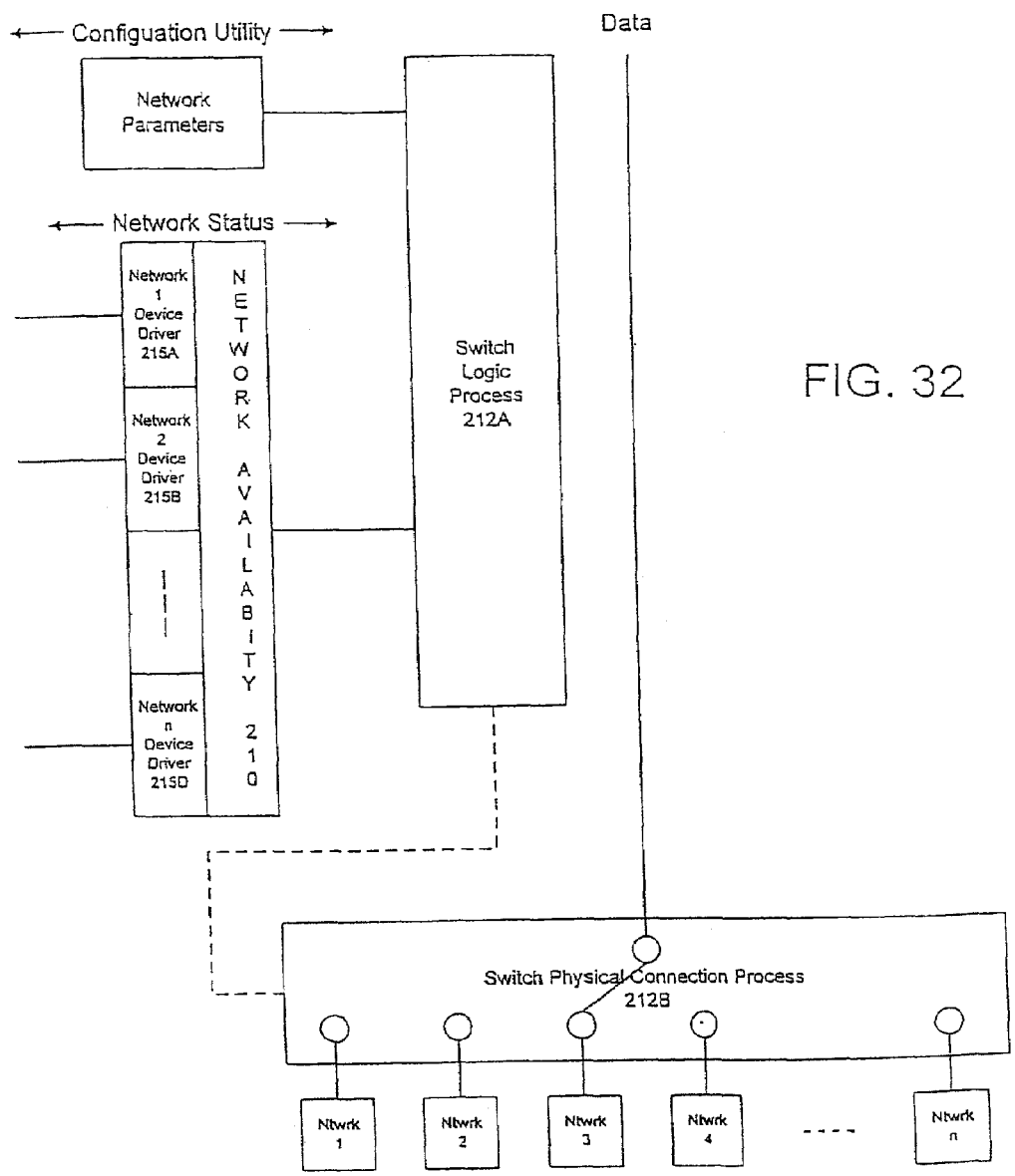
FIG. 32 is an illustration of a block diagram of the switch within the router according to the present invention.

Referring to FIG. 32, the Switch 212 may be implemented using a combination of hardware (e.g., multiple electronic ports, one per Network Interface 214) to perform the physical connection process 212B, and software (e.g., handlers which are interrupted at each character to move the character to either the Router Core 204 (outbound), or to the current Network Interface 214 (in-bound)) to perform the switch logic process 212A.

As a non-limiting exemplary hardware implementation, the Switch 212 may comprise an 80386EX microprocessor, running at 33 MHZ, 256 kilobytes of FLASH ROM, 512 kilobytes of static RAM, six asynchronous serial ports, two TTL-to-RS232 convertors interfacing with two of the six serial ports directly to compatible devices external to the Switch 212, and four internal TTL serial interfaces to internally-mounted daughter boards, which carry Network Interfaces 214A-D. Each Network Interface 214 mounted on a daughter board may include a power supply for the Network Interface, a serial interface to the 80386EX microprocessor, and an interface to the outside network. The outside network may be a radio, a LAN, an antenna (for internally-mounted radios in the Network Interface 214), or other device accepting or supplying data from/to the Router 200.

The Switching function of the Switch 212 is provided by each serial Network Interface port at the 80386EX microprocessor, and the software residing in FLASH ROM. The software logic determines which Network Interface to use for transmission and receipt of data. The decision is implemented in the Switch, by selecting a physical serial port (and therefore which Network Interface) is to be used as the current Network. The Decision software in the FLASH ROM instructs the microprocessor to send the data to a specific serial port (which is mapped to specific physical addresses within the address range of the 80386EX microprocessor). The microprocessor then constructs the next message in the message buffers in RAM, and sends the message through the specific serial port which is designated as the "current Network" Interface port. The data then goes to the Network. Interface (e.g., network interface 214A) connected to that specific serial port and on to the Network infrastructure. Received data is input to the Network Interface (e.g., network interface 214B which may be set to the "current Network" serial port) and the microprocessor, where the received data is processed by the microprocessor. In accordance with an aspect of the present invention, messages which are received through Network Interfaces which are not designated as the "current Network" are ignored.

The Network Interfaces 214A-D are devices which present data to, or obtain data from the radio operating at the various R.F. Network frequencies, bandwidths, and modulations. The Network Interfaces 214A-D may provide a port through which messages pass, to and from the Switch 212. The messages are typically in the form of a sequence of serial digital bits. The Network Interfaces 214A-D also may provide a modulator/demodulator function which transforms the digital data into an analog form which may be easily sent through the R.F. Network voicepath, based on characteristics of the assigned frequency band of the R.F. Network. The characteristics of analog transmissions are typically bandwidth (in Hertz, or cycles per second), noise present in the Network, and assigned frequency of the R.F. Network. Further, the Network Interfaces may interface with a radio, which may be included within the Network Interface 214, or may be mounted externally to the Router 200 (as shown in FIG. 29). The Network interface 214 radio interface comprises the actual physical connections to the radio for the voicepath data, the muting function (if present and/or required) and the functionality for issuing a Press-to-Talk to the radio, and for receiving the Transmit Grant signal from the radio; both are used for handshaking between the radio network and the Network Interface 214. This handshaking may be necessary for proper timing of the data out onto the RF Network. The muting function is used for silencing received signals which represent data, rather than voice traffic which enables a remote user to mute the audible noise of the data traffic, which can be annoying to the remote user.

Examples of Network Interface 214A-D include the MDC 54 and the NovaTel Wireless NRM-6812 Cellular Digital Packet Data (CDPD) modem. Where the network interface 214 comprises the MDC 54, the radio is mounted external to the MDC 54, whereas in the NovaTel example, the radio and the network interface are integrated into a single unit.

As noted above, the Network Interfaces 214 provide connections to various types of networks. These networks may be wired (for example Public Switched Telephone Network 58), or wireless (for example Cellular Digital Packet Data (CDPD)). The following non-limiting list includes networks that may be interfaced to the Router 200 by the Network Interfaces 214A-D: private voice radio including conventional and trunked radios (e.g., using MDC 54), Cellular Digital Packet Data (CDPD), Spread Spectrum (e.g., direct sequence and channel-hop), GSM, GPS receiver, satellite transponder, RDI (Ericsson) interface, AMPS, RAM Mobile (Mobitex), RS232, RS485, Angel (AT&T), Asynchronous Transfer Method (ATM), Integrated Services Digital Network (ISDN), public switched telephone network (PSTN (POTS) telephone network), Ethernet, Ardis, Personal Communications Services (PCS), and any other network which is either transparent or operates using a specific protocol.

The specific protocols to the above-listed networks are implemented in the Network Interfaces 214A-D. These protocols may be very different, and therefore incompatible with each other. Additionally, a translation device may be provided in each Network Interface 214 to translate between IP and the particular network protocol. By providing such a translation device, the Application or Device 52 can use IP data regardless of the particular network the Application or Device 52 is actually using.

Figure 31:
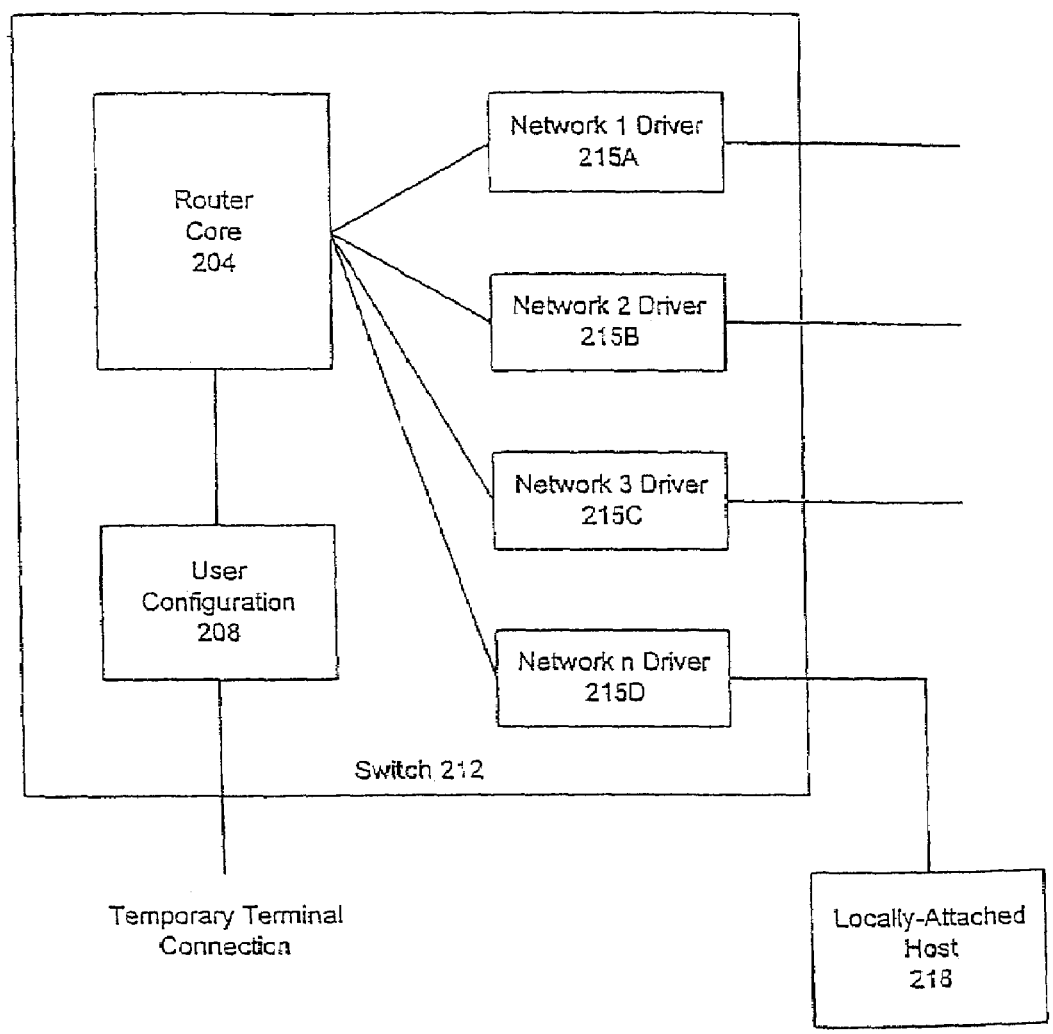
FIG. 31 is an illustration of a block diagram of the functional components of the router in accordance with an aspect of the present invention.

Referring to FIG. 31, a description of the functional components of the Router 200 will now be described. The Router 20 may be implemented as an autonomous device with multiple connections to the networks through which data is to be routed. The user Configuration Interface 208 provides a means whereby an external device such as a keyboard/terminal may be used to supply configuration information such as preferred routes, network node addresses, etc. to the router. Such information is accepted by the Configuration Interface 208 and is placed into a non-volatile store (e.g., memory)

which may be queried by other router components. In addition, capability may be provided whereby diagnostic information may be requested from the router and sent to the terminal device for evaluation by a technician.

The Router Core 204 is responsible for making all routing decisions. For a given destination network address specified within a data packet or datagram received from one of the network interface drivers 215A-D, the most-preferred path will be selected and the data packet or datagram forwarded through the preferred network interface driver 215A-D. Routing decisions are generally based upon such metrics as network speed and interface availability. Other metrics such as destination network, time of day, type of data, etc. may also be incorporated into the routing decision. Further, routing decisions may be made at the packet level such that each individual packet of data may be transmitted and/or received on different networks in accordance with the user configured parameters 208.

Exemplary Network Drivers 215A-D may include an Ethernet Driver, a Token-Ring Driver, and a Serial PPP Driver. The Ethernet Driver provides a means for sending and receiving data through an Ethernet-type network. The function of the driver is to shield the Router Core from the details of network media access. The Token-Ring Driver provides a means for sending and receiving data through a Token-Ring-type network. The function of the driver is to shield the Router Core from the details of network media access. The Serial PPP Driver provides a means for sending and receiving data through a PPP-based serial data link. The function of the driver is to shield the Router Core from the details of network media access. Other drivers 215A-D may be provided to interface with other types of networks as necessary.

The Network Availability 210 (see also FIG. 30) is a function which periodically interrogates each installed Network Interface 214 in the Router 200 and may determine if the Network Interface 214 is installed; if the Network Interface 214 is properly configured and functioning properly; if the Network Interface 214 is connected to the Network, on-line, and available for sending/receiving messages; and if the Network Interface 214 is in good health. The above interrogation process may be accomplished by monitoring a timer tick (provided by the switch microprocessor), which instructs the Network Availability 210 to query each Network Interface 214. When the timer tick occurs, the Network Availability 210 function interrogates each Network Interface 214 as noted above. The status of each Network Interface 214 is then passed to the Decision process 206, which determines what the "next Network" will be if the result of the interrogation indicates that the "current Network" is experiencing transmission problems.

The Network Availability 210 of each Network Interface 214 is determined in a manner specific to the particular interfaced Network. For example, if the Network is CDPD, the Network Availability 210 interrogates the network to determine if the Network Interface 214 is currently registered with the Network, and therefore active. Also, in the CDPD network, the Network Availability 214 determines if the Received Signal Strength Indication (RSSI) is sufficient to transmit relatively error-free data. For example, in the NovaTel CDPD Network Interface a RSSI of −100 dBm will provide for good data transmission qualities. Thus, if the Network Availability 210 function queries the NovaTel CDPD Network Interface for the RSSI, and the response is −110 dBm, then the signal is too weak for error-free transmission, and therefore cannot be used at this time. This information is passed to the Decision process 206 to determine if the "current Network" should remain the "current Network", and if not, to determine what the "next Network" should be.

The User Configuration 208 block is used to define user configurable parameters by which the Router Core 204 selects the "current Network" and the "next Network". The Router parameters may include the date and time (e.g., yr-mo-da, hh:mm:ss), and the Network Interface 214 installed in each of the internal slots of the Router 200. According to the present embodiment there are six internal slots to accommodate Network Interfaces to any of private voice radio using e.g., the MDC 54 and a variety of radios, both conventional and trunked; Cellular Digital Packet Data (CDPD), such as Sierra Wireless or NovaTel CDPD modems; spread spectrum, either direct sequence, or channel-hop, as Xetron Hummingbird spread spectrum modem; GSM, such as Ericsson serial GSM module; GPS receiver, such as Motorola VP Encore GPS receiver, or Trimble SVEE Six receiver; satellite transponder; RDI (e.g., Ericsson) interface, implemented via a software protocol module and quasi-RS232 interface to radio; AMPS; RAM Mobile (e.g., Mobitex); RS232 default and fixed for example in slots 1 and 2; RS485; Angel (e.g., AT&T); ATM; ISDN; PSTN; Ethernet; Ardis; PCS; any other network which is either transparent or operates using a specific protocol; and none. Although six slots are disclosed herein, other numbers of slots may be provided.

Other user configurable parameters include: the priority of each internal slot, (e.g., 1 to 6) where the slot with priority 1 is the default startup slot and Network; baud rate of each slot (a default rate may be set to 9600 bits per second, but may be configured to be any standard baud rate, divisible by 300, up to 115.2 kilo bits per second); cost per kilobyte per slot (e.g., $0.xx per kilobyte where the least costly slot that is available and highest priority will be default); protocol per slot (e.g., none, Point to Point (PPP), Serial Line Internet Protocol (SLIP), Hayes "AT" commands, transparent); slot mode, for example, transparent, PSTN, cellular, IP, receive only; slot name or address or phone number; slot to be used for diagnostics (e.g., default may be set to slot 2); slot muting to be used (e.g., none, PL, DIMF, other); number of retry transmissions per Network Interface (per slot) before declaration of Network Interface failure (e.g, 0-10); if slot Network Interface needs to be configured before it can operate (e.g., y,n); slot to be used for remote display (e.g., default may be set to slot 2); slot to be used for Device or Application 52 (e.g., a connection to a mobile computer; default is slot 1); and frequency at which Network Availability 210 is checked (e.g., default may be set to five seconds). Other user configurable parameters may be introduced and configured as necessary.

The User Configuration 208 function provides the user with the capability to instruct the Router 200 how to select a particular Network. These metrics may include, but are not limited to: which Network is connected to which Router port, time of day and date, priority (switching sequence) of each Network, cost per packet of each Network, and preferred default Network.

On power up, the User Configuration 208 is checked to determine if it is current. If the User Configuration 208 is determined to be out of date, the end user is requested to input a configuration. The user is notified by blinking LEDs on the front panel or by a message sent to the mobile device 52. If the User Configuration 208 is determined to be current, no user input is requested.

Further, each Network is continuously evaluated for health and connectivity status. There are a number of parameters which are examined to determine this, including, but not limited to: Received Signal Strength Indication (RSSI), Clear to Send (CTS), Channel Clear/Channel Ready, and Transmit Grant.

The Decision process 206 continuously examines the User Configured parameters in the user configuration block 208, to determine the next Network to use, in case the current Network becomes unavailable to send or receive data. Such an unavailability may arise because the remote user (and consequently the Router 200) has moved beyond coverage of the Network, or because a problem has occurred with the current Network or the Network Interface 214.

After the Decision process 206 has determined the next Network to use, the decision process 206 queries the Network Availability 210. If the next Network is available, then the Decision process 206 updates the routing tables in the Router Core 204. The Router Core 204 will then actuate the Switch 212 to physically connect the next Network as the current Network.

The Decision process 206 uses the User Configuration 208 parameters defined above to determine the specific criteria for each slot, to be used when deciding if the current Network is to remain the current Network, and if not, what the next Network shall be. Once the decision process 206 has made a tentative decision to switch to another Network (i.e., the next network is to become the current network), it checks the Network Availability 210 to ascertain if the Network is actually installed, configured, on-line, and in good health. For example, if the current Network is configured as priority #3, and the Network Availability 210 of the priority #2 Network updates to, for example, "installed, configured, on-line, and in good health", then the priority #2 Network becomes the next Network. The Decision process 206 will instruct the Switch 212 to switch the priority #2 Network to the current network, Should the Decision process 206 decide to change Networks, it conveys an instruction to the Router Core 204 by instructing the Router Core 204 what the next Network Interface 214 is to be.

The process of the Decision process 206 checking the User Configuration 208 and the Network Availability 210 continues indefinitely, and is described in detail in FIGS. 33-36. Generally, the process helps to guarantee that the mobile user always has access to a Network for sending and receiving data. This process also allows what is known now as "seamless roaming". This means that the mobile user can move between Networks and continue to have reliable data transmission on the different Networks.

Figure 33:
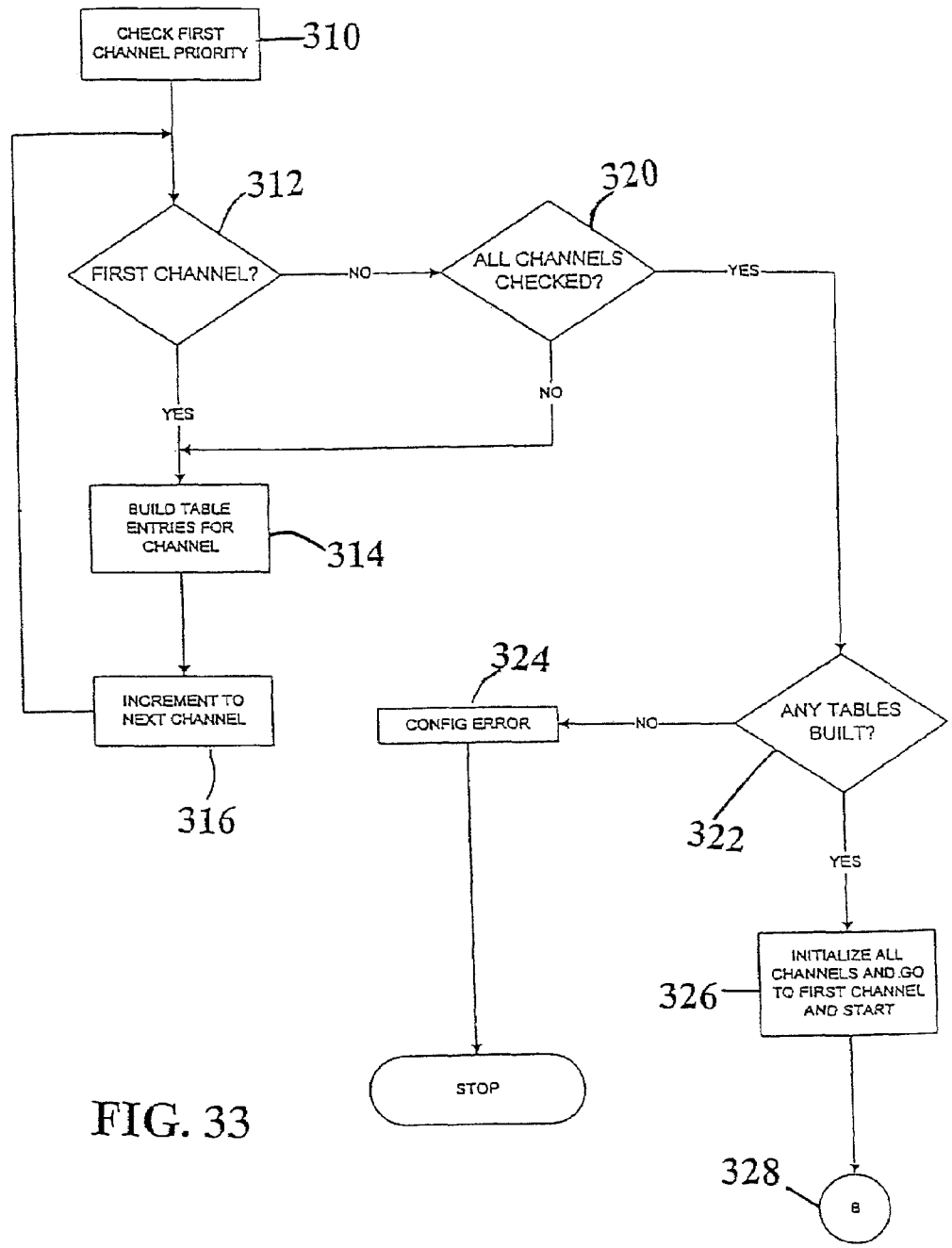
FIG. 33 is an illustration of a flow chart of the processing steps used by the router to initialize and build tables stored in the Router in accordance with an aspect of the present invention.

FIGS. 33-36 illustrate the logic of the software in the router. Referring now to FIG. 33, there is shown an exemplary initialization routine which builds the tables in the Router 200. Upon initialization of the system, at Step 310 the first channel priority is checked. At Step 312, it is determined whether or not the first channel is being examined. If it is the first channel, at Step 314, table entries for the first channel are built. Information which is included in the table may be, e.g., IP address of the destination, intervening intermediate IP addresses, the assigned port, channel priorities, and the application being used. Typically channel one is assigned the highest priority. After the tables are built, the processing increments to the next channel at step 316. From Step 316, processing returns to Step 312. If at Step 312 it is determined that the channel being checked is not the first channel, processing proceeds to Step 320 to query whether all channels have been checked. If all channels have not been checked, processing returns to Step 314 to continue building the table entries via steps 314 and 316 until all channels have been checked.

Once it has been determined that all channels have been checked, at Step 322 it is determined whether any tables have been built. If no tables have been built, at Step 324 a configuration error is recognized and the processing stops. Tables may not have been built previously, e.g., if there are problems with the IP address, i.e., there was no destination address. If at Step 322 it is determined tables were already built, processing proceeds to Step 326 where all channels are initialized and data transportation begins via the first channel.

Figure 35:
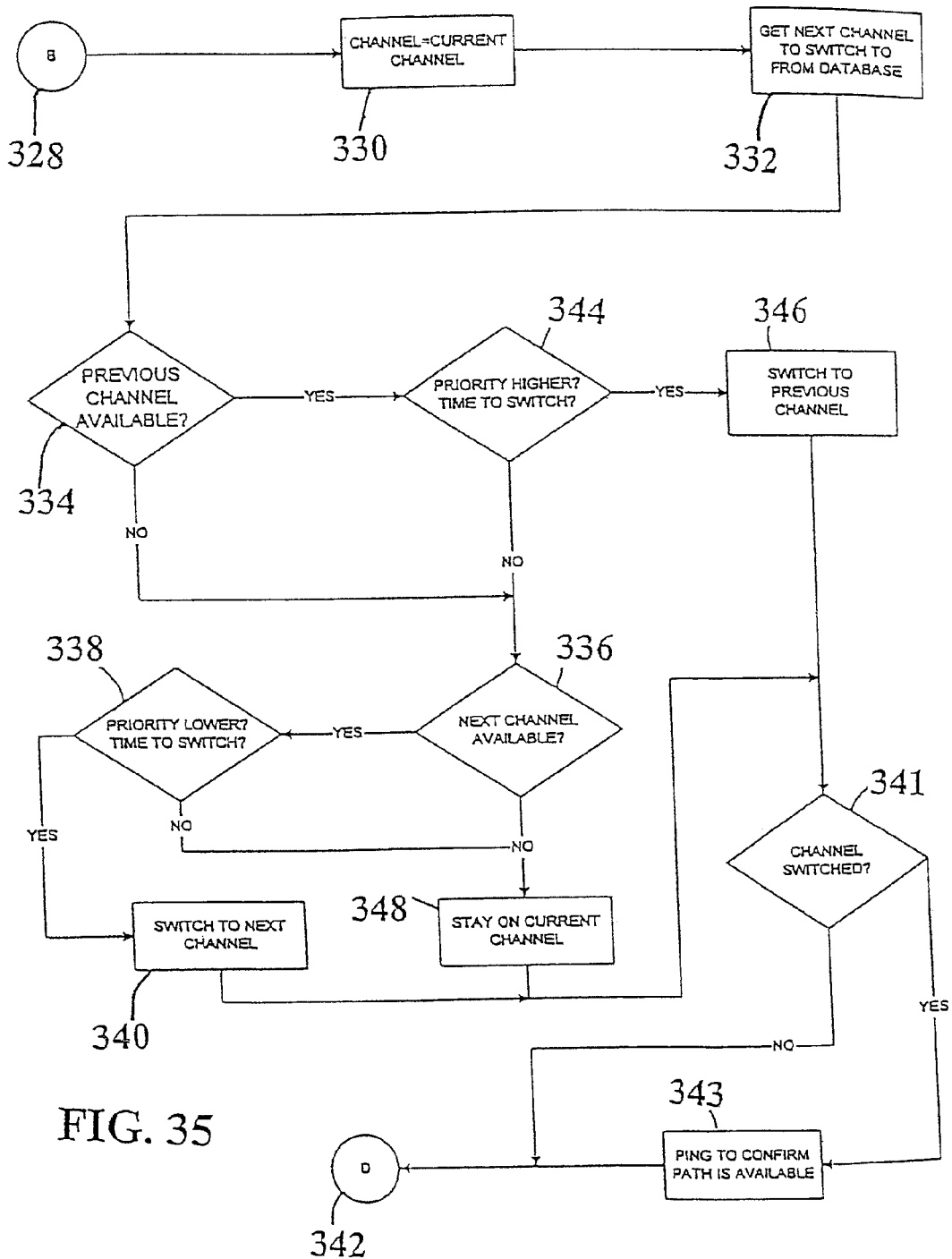
FIG. 35 is a flow chart of the processing steps used by the router to account the availability of the channels and the user's configuration in order to decide which channel to use for transporting data in accordance with an aspect of the present invention.

From Step 326 the processing proceeds to Step 328, also shown in FIG. 35, which illustrates an exemplary flow diagram of the Router 200 logic for accounting the Network Availability 210 (FIG. 30) and User Configuration 208 (FIG. 30) to decide which channels to use for data transport. Beginning at Step 328, processing proceeds to Step 330 where the channel is set to the current channel in a database which is described in more detail below. From there, processing proceeds to Step 332 to retrieve the next channel to switch to from the database. The database is stored in flash memory and contains configuration information for each channel including how each channel is set up in the Router 200 and what configuration values are for each Network Interface 214A-D. In addition, the database stores which channel is current and the history of previous current channels. The tables discussed with reference to FIG. 33 at Step 314 are also stored in the database.

At step 334 a determination is made as to whether the previous channel is available. Of course if this is the first time through, no previous channel will exist. If the previous channel is not available, at Step 336 a determination is made as to whether the next channel is available. If the next channel is available, at Step 338 a determination is made as to whether or not the priority is lower and it is time to switch. The determination is made by looking at the information in the User Configuration 208 (FIG. 30). If it is time to switch, at Step 340 a switch to the next channel is made. From there, processing continues to step 341, where it is determined if the channel was switched. If the channel was switched, processing continues to step 343 where a ping is sent to confirm the path is available. From step 343, the processing continues to Step 342, also shown in FIG. 34. If, at step 341, it is determined the channel was not switched, processing continues to step 342.

Returning to Step 334, if it is determined that a previous channel is available, at Step 344 an inquiry is made as to whether or not the previous channel has a higher priority and it is time to switch. The determination is made by consulting the information in the User Configuration 208 (FIG. 30). If it is determined the previous channel is a higher priority and it is time to switch, at Step 346 a switch to the previous channel is made. From Step 346, the processing proceeds to Step 341 as previously described.

If at Step 344 it is determined that it is not time to switch and the priority is not higher, processing proceeds to Step 336 where it is determined whether the next channel is available. If the next channel is not available, at Step 348 the current channel is not switched and the processing proceeds to Step 341 as described above. If at Step 336 the next channel is available, then at Step 338 the inquiry into priority and time to switch is made as previously described. At Step 338, if it is not time to switch and the priority of the next channel is not lower, the Router 200 stays on the current channel at Step 348.

Figure 34:
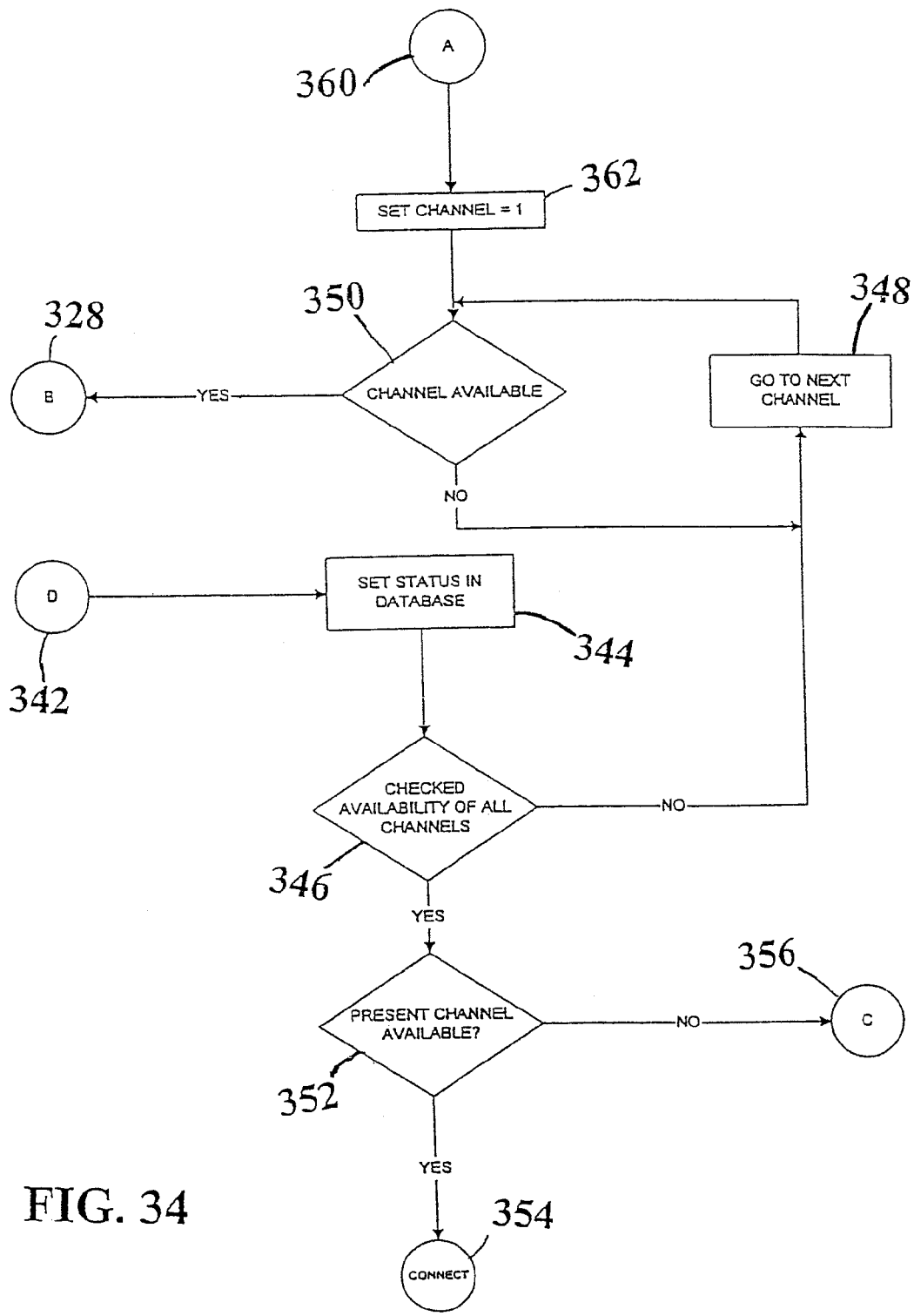
FIG. 34 is a flow chart of the processing steps used by the router for checking availability of each network interface in accordance with an aspect of the present invention.

Refer now to FIG. 34 which illustrates a flow chart of exemplary logic for checking the availability of each network interface. Starting at Step 342 processing proceeds to Step 344 where the status of the channel being used is recorded in the database. Furthermore, at Step 344, the Router 200 front panel LED's are updated. If at Step 346 it is determined the availability of all channels has not been checked, at Step 348 the next channel is identified and at Step 350 the next channel's availability is polled. A channel is not available if it is being used for a mobile device 52 i.e. the channel is already one end of the network. If the channel is not available, the processing returns to step 348. If the channel is determined to be available at step 350, processing proceeds to Step 328 also shown in FIG. 35.

If at Step 346 it is determined that the availability of all channels has been checked, at Step 352 the availability of the present channel is determined. If the present channel is available, a connection is made at Step 354. If the present channel is not available, processing proceeds to Step 356 for error handling. The error handling procedure is discussed with reference to FIG. 36 below. Upon completion of the error handling procedure, at Step 360 the channel is set equal to one at Step 362. At Step 350, the procedure continues as previously described.

Figure 36:
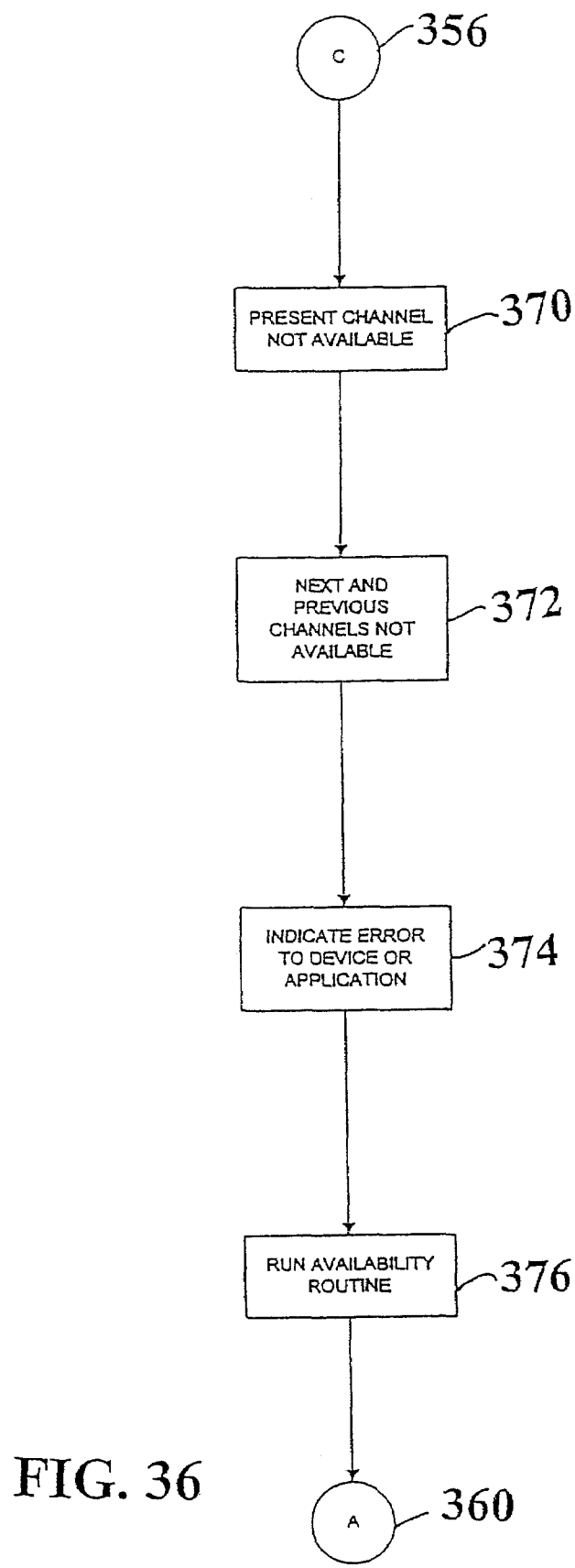
FIG. 36 is a flow chart of the processing steps used by the router for an error handler in accordance with an aspect of the present invention.

Referring now to FIG. 36, which is an exemplary flow diagram of the Router, 200 error handling logic, Step 356 continues from FIG. 34. At Step 370, the present channel is deemed to be non-available. At Step 372, the next and previous channels are also confirmed to be non-available. At Step 374 an error is indicated to the device or application. At Step 376 an availability routine is run such as that described previously. From the availability routine at Step 36, the processing continues to Step 360 as discussed with reference to FIG. 34.

The Router 200 of the present invention may be used inside a mobile vehicle, or carried by a person in a portable application. Further, the Router 200 may be provided as an external component connected to a portable device (e.g., a laptop computer) or may be implemented within the portable device, such that the portable device and the Router 200 are provided as one integrated unit. Further, the Router 200 may be used in conjunction with, or integrated into measuring and testing equipment, and transmission equipment. Such a remote device may be needed for very remote monitoring applications, such as wildlife studies, etc., necessitating the use of multiple Networks.

Figure 37:
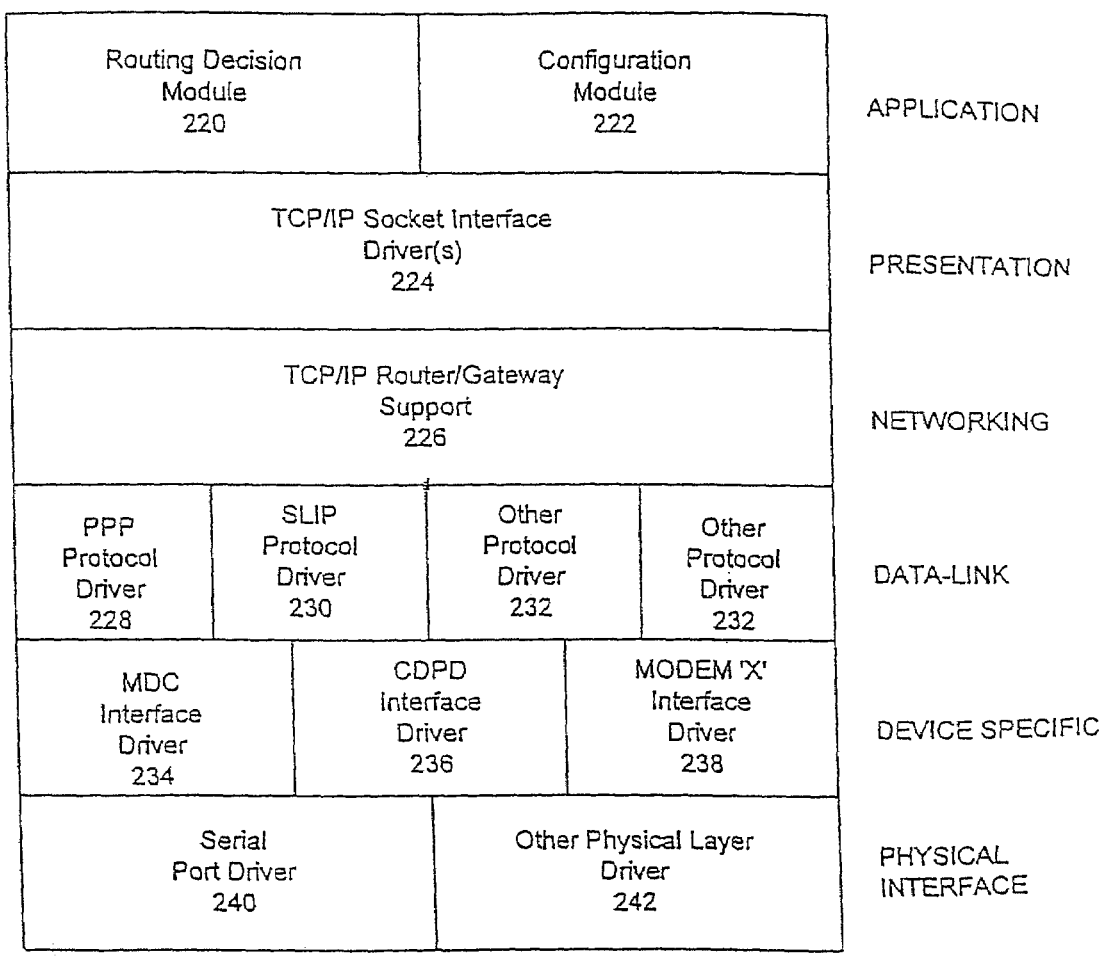
FIG. 37 is an illustration of the software architecture of the Router in accordance with an embodiment of the present invention.

Referring now to FIG. 37, there is shown the software architecture 219 of the Router 200 in accordance with an embodiment of the present invention. The architecture is strictly layered in that data flows only vertically between adjacent layers. The definition of each layer will now be described.

The Application layer consists of various processes that perform services directly related to the function(s) for which the device is defined. This includes such services as defining a device configuration, making decisions about which route to select for the transport of data and performing various diagnostic functions.

The Presentation layer consists of a protocol-independent insulating layer between the applications and the lower-level networking functions. The Presentation layer implements a Berkley sockets compliant application programming interface (API).

The Networking layer performs all processing related to handling the Internet Protocol (IP). The main function of the networking layer in this environment is the routing of data passed into the layer from either above or below back out through selected Network Interfaces to deliver that data to the intended destination. The relationship of destination and network interface is maintained by the Configuration Module and Routing Decision Module applications.

The Data-Link layer provides logical Network Interfaces through which the Networking Layer may send and receive data. One or more of these Network Interfaces may be active at any time. At least one network interface must be active for the device to function properly. The main purpose of the Data-Link layer is to insulate the Networking layer from the details of the many link-level protocols used to transport data.

The Device-Specific layer deals with the details of establishing and maintaining data communications through various types of communication devices such as radios, modems and data controllers. Each Device-Specific driver handles the vagaries of configuring and interfacing with various types of communication devices while presenting a uniform interface to the Data-Link layer.

The Physical Interface layer handles the direct interface to external components. For example: A serial port driver may handle the sending and receiving of individual data bytes through a specific type of serial controller such as an Intel 8250.

A description of the functionality supported by various module blocks as presented in FIG. 37 will now be described.

The Configuration Module 222 is an Application layer module that allows a technician to maintain a database of device configuration information. A technician may access the Configuration Module via a diagnostic serial port. Another implementation may allow a technician to access the Configuration module through any of the defined Network Interfaces via a standard socket.

The Routing Decision Module 220 selects the preferred network interface through which outbound data is transmitted. This decision is based upon a variety of metrics including: Interface availability; Time of day; Type of service required; Interface priority and others. Examples of various routing metric schemes are presented later.

The TCP/IP Socket Interface 224 supports an Application Programming Interface (API) which, for example, conforms to the standard Berkley sockets paradigm. Its purpose is to shield the Application Layer from the details of the underlying networking protocols. It allows different network implementations to be employed without the applications being required to adapt.

The TCP/IP Router/Gateway 226 implements standard IP host support with the additional capability of being able to act as a gateway between multiple networks. IP datagrams received by this layer that are not destined for a local IP host address are forwarded through the network interface that is currently designated as the preferred route for the given destination address. It is possible that the management and selection of preferred routes is implemented by the Routing Decision Module 220 in the Application layer.

The PPP Protocol Driver 228 provides a network interface whose data-link protocol conforms to the Point-To-Point protocol standard. The SLIP Protocol Driver 230 provides a network interface whose data-link protocol conforms to the Serial-Line Internet Protocol de facto standard. Other protocol drivers 230 may be implemented which provide Network Interfaces which support either existing protocols or future protocols. The intent is to convey that the underlying link-layer protocol is transparent to the upper and lower layers and that additional protocols may be easily supported.

The MDC Interface Driver 234 provides device-specific support for Mobile Data Controller 54, as described above. The CDPD Interface Driver 236 provides device-specific support for a Cellular Digital Packet Data controller. Other device-specific drivers, e.g., Modem "X" Interface Driver 238 may be implemented to support current or future devices.

The Serial Port Driver 240 deals with the hardware aspects of asynchronous serial data communications such as manipulating a Serial I/O controller or other such external interface.

Other physical layer drivers 242 may be implemented which support different external interface devices either existing or in the future.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

For example, the router of the present invention may be included as an internal component of the mobile device, proving for an integrated mobile device. Optionally, the router may be implemented entirely as a software process running on, for example, a portable personal computer. In such an implementation, the internal slot(s) of the personal computer may be provided with network interface(s) and a software program may serve as the router core. Further, data may be routed to the different networks at another level than at the packet level. For example, entire messages may be routed over various networks if such a configuration is required.

The invention claimed is:

1. A wireless device for communicating with a destination device, the communicating including transmitting and receiving at least one of a voice signal and a data signal over a plurality of wireless communications media that are autonomous and differ at a data link layer, the wireless device comprising:
   an application executable to communicate the at least on of a voice signal and a data signal to the destination device;
   a plurality of communication interfaces configured to enable communicating over the plurality of wireless communications media;
   a network availability determiner section configured to determine at least one metric;
   a user configuration processor configured to receive at least one parameter;
   a decider section configured to generate a deciding signal based on the at least one metric and the at least one parameter;
   a core section configured to generate a selecting signal based on the deciding signal;
   a selector section configured to select one of the plurality of communication interfaces based on the selecting signal, the selected one of the plurality of communication interfaces communicating over one of the plurality of wireless communications media,
   the selector section being further configured to select another one of the plurality of communication interfaces transparently to said application for communication over another one of the plurality of wireless communications media while the selected one of the plurality of communication interfaces communicates over the one of the plurality of wireless communications media.

2. A method for communicating with a destination device, including transmitting and receiving at least one of a voice signal and a data signal over a plurality of wireless communications media that are autonomous and differ at a data link layer, the method comprising:
   enabling a plurality of communication interfaces to communicate over the plurality of wireless communications media;
   communicating the at least one of a voice signal and a data signal from an application to the destination device;
   determining at least one metric;
   receiving at least one parameter;
   generating a selecting signal based on the at least one metric and the at least one parameter;
   selecting one of the plurality of communication interfaces based on the selecting signal, the selected one of the plurality of communication interfaces communicating over one of the plurality of wireless communications media; and
   selecting another one of the plurality of communication interfaces transparently to said application for communication over another one of the plurality wireless communications media while the selected one of the plurality of communication interfaces communicates over the one of the plurality of wireless communications media.

3. A computer readable medium embodying a program executable for communicating at least one of a voice signal and a data signal from an application over a plurality of wireless communications media that are autonomous and differ at a data link layer, the computer readable medium comprising:
   a communication code segment being executable to communicate the at least one of a voice signal and a data signal from the application to the destination device;
   a communication interface code segment being executable to enable communicating over the plurality of wireless communications media;
   a metric determiner code segment being executable to determine at least one metric;
   a user configuration code segment being executable to receive at least one parameter;
   a core configuration code segment being executable to generate a selecting signal based on the at least one metric and the at least one parameter;
   a selector code segment being executable to select a first interface of a plurality of communication interfaces based on the selecting signal, the selected communication interface enabling communication over a first one of the plurality of wireless communications media,
   the selector code segment being further executable to select a second interface of the plurality of communication interfaces transparently to the application for enabling communication over a second one of the plurality wireless communications media while the first communication interface continues to enable communication over the first one of the plurality of wireless communications media.

* * * * *

UNITED STATES PATENT AND TRADEMARK OFFICE
CERTIFICATE OF CORRECTION

PATENT NO. : 7,602,782 B2
APPLICATION NO. : 11/743313
DATED : October 13, 2009
INVENTOR(S) : Doviak et al.

It is certified that error appears in the above-identified patent and that said Letters Patent is hereby corrected as shown below:

At column 39, line 29 (claim 1, line 7) of the printed patent, "on" should be --one--.

Signed and Sealed this

Eighteenth Day of May, 2010

David J. Kappos
*Director of the United States Patent and Trademark Office*